US012326013B2

(12) United States Patent
Deldar

(10) Patent No.: US 12,326,013 B2
(45) Date of Patent: Jun. 10, 2025

(54) LOCKING SYSTEM

(71) Applicant: Yaser Deldar, Parsian (IR)

(72) Inventor: Yaser Deldar, Parsian (IR)

( * ) Notice: Subject to any disclaimer, the term of this patent is extended or adjusted under 35 U.S.C. 154(b) by 347 days.

(21) Appl. No.: 17/542,871

(22) Filed: Dec. 6, 2021

(65) Prior Publication Data

US 2022/0090411 A1 Mar. 24, 2022

Related U.S. Application Data

(60) Provisional application No. 63/121,929, filed on Dec. 6, 2020.

(51) Int. Cl.
*E05B 27/08* (2006.01)
*E05B 27/00* (2006.01)

(52) U.S. Cl.
CPC .......... *E05B 27/083* (2013.01); *E05B 27/005* (2013.01)

(58) Field of Classification Search
CPC ...... E05B 27/00; E05B 27/083; E05B 27/005; E05B 27/02; E05B 27/08
USPC .......................................................... 70/348
See application file for complete search history.

(56) References Cited

U.S. PATENT DOCUMENTS

| | | | | | |
|---|---|---|---|---|---|
| 3,903,720 | A * | 9/1975 | Scherbing | E05B 27/083 | 70/382 |
| 4,977,768 | A * | 12/1990 | Embry | E05B 27/083 | 70/378 |
| 4,996,856 | A * | 3/1991 | Lin | E05B 27/083 | 70/491 |
| 5,018,376 | A * | 5/1991 | Lee | E05B 27/083 | 70/419 |
| 6,038,898 | A * | 3/2000 | Cliff | E05B 27/083 | 70/404 |
| 6,550,299 | B1 * | 4/2003 | Lin | E05B 27/083 | 70/378 |
| 2007/0033975 | A1 * | 2/2007 | Liu | E05B 67/24 | 70/491 |
| 2013/0276490 | A1 * | 10/2013 | Nguyen | E05B 27/0039 | 70/358 |

* cited by examiner

*Primary Examiner* — Nathan Cumar

(57) ABSTRACT

A locking system may include a first cylinder portion may be extended along a main axis, a second cylinder portion may be extended along the main axis, a front plate may be coupled and rotatable with the first cylinder portion, a plurality of code pins, a plurality of spring-loaded driver pins, a main shaft may be disposed within a first central hole, a second central hole, and a key. The key may include an elongated key shaft and a plurality of key needles may be extended parallel with the elongated key shaft. The main shaft may be configured to be coupled to and rotatable with one of the first cylinder portion and the second cylinder.

15 Claims, 69 Drawing Sheets

200

209

211

213

217

219

400

409

413

600

800

911

917

920

1000

1100

1104

1300

1310

1312

1400

1500

1700

2100

2204

2208

2400

2600

2700

2900

| | | | |
|---|---|---|---|
| A | 400/409/413/415 | L | 900 |
| B | 800 | Y | 919/ (1320&917) |
| C | 1708 | M | (300/303)&700 |
| D | 200/209/211/213/215 | O | 1210/1200/1600/1210 |
| R | 1312&1500 | K | 1100/1104 |
| E | 500&600&700 | S | 500&1400&1500 |
| F | 219 | T | 1600&(1300/1310) |
| G | 217 | Q | 1706 |
| I | 911&1000 | W | 2404&2406&2300 |
| J | (300/303)&700 | Z | 400 |

3100

| Arrangement | First locking system | | | | | | | Second locking system | | | | | Cam part |
|---|---|---|---|---|---|---|---|---|---|---|---|---|---|
| | H1 | | | | P | | | H2PQOW | | | | | V |
| 1 | A | B | D | | L | M | O | A | D | P | Q | | S/T |
| 2 | A | B | C | D | I | J | K | G | | | p | Q | S/T |
| 3 | A | E | B | F | I | J | K | G | | | P | Q | S/T |
| 4 | A | E | B | D | L | M | O | O | | W | | | S/T |
| 5 | G | | | | L | M | O | O | | W | | | S/T |
| 6 | A | B | C | D | I | J | K | A | | C | D | P | R |
| 7 | A | B | C | D | L | M | O | A | | D | P | Q | S/T |

FIG. 31

LOCKING SYSTEM

CROSS-REFERENCE TO RELATED APPLICATION

This application claims the benefit of priority from pending U.S. Provisional Patent Application Ser. No. 63/121,929 filed on Dec. 6, 2020, and entitled "TUBULAR LOCK WITH CHANGEABLE CODE," which is incorporated herein by reference in its entirety.

TECHNICAL FIELD

The present disclosure relates to locking systems, and more particularly relates to a locking system with mechanically tunable codes.

BACKGROUND

A locking system may include a lockset and a key. A lockset is hardware that may be used to lock doors, for example, sliding doors, hinged objects, and dividers. The locking system may include a two-way lockset with two locksets from both sides of the locking system, a one-way handle lockset with a lockset from one side and a handle from the other side of the locking system, and a one-way lockset with a lockset from one side. A lockset may be a mechanical lock or an electromechanical lock.

Electromechanical locks may have fingerprint recognition and face recognition systems, utilizing artificial intelligence. Although electromechanical locks may provide a fast locking process and allow for easy usage, electromechanical locks may require high financial investments and sophisticated equipment for production. Electromechanical locks may be more likely to break down due to electrical system failure.

Mechanical locks may entail comparatively lower production costs but may suffer from low safety aspects as a key may be duplicated easily or a key may be lost. Mechanical locks may be provided with a key in a factory which make it impossible for the user to change the code of the key. There may be different strategies to enhance the safety of mechanical locks, utilizing slits on a key or a body of the lockset. Despite enhancement of safety of mechanical locks by these methods, the locking code of the lockset may not be adjustable which may be a drawback for system security.

There is, therefore, a need for a mechanical lockset with high security and low production cost. There is further a need for a lockset with mechanically tunable codes.

SUMMARY

This summary is intended to provide an overview of the subject matter of the present disclosure and is not intended to identify essential elements or key elements of the subject matter, nor is it intended to be used to determine the scope of the claimed implementations. The proper scope of the present disclosure may be ascertained from the claims set forth below in view of the detailed description and the drawings.

According to one or more exemplary embodiments, the present disclosure is directed to a locking system. In an exemplary embodiment, an exemplary locking system may include a first cylinder portion may be extended along a main axis, a second cylinder portion may be extended along an exemplary main axis, a front plate may be coupled and rotatable with an exemplary first cylinder portion, a plurality of code pins, a plurality of spring-loaded driver pins, a main shaft may be disposed within an exemplary first central hole, an exemplary second central hole, and a key. In an exemplary embodiment, an exemplary first cylinder may include a first central hole may be extended along an exemplary main axis and a first plurality of pin bores. In an exemplary embodiment, each pin bore of an exemplary first plurality of pin bores may be extended axially along an exemplary main axis. In an exemplary embodiment, an exemplary first plurality of pin bores may be annularly arranged and spaced around an exemplary first central hole. In an exemplary embodiment, an exemplary second cylinder portion may be rotatably coupled with an exemplary first cylinder portion with a common shear plane between an exemplary first cylinder and an exemplary second cylinder. In an exemplary embodiment, an exemplary common shear plane may be perpendicular to an exemplary main axis. In an exemplary embodiment, an exemplary second cylinder portion may include a second central hole may be extended along an exemplary main axis and a second plurality of pin bores. In an exemplary embodiment, an exemplary second central hole may be aligned with an exemplary first central hole. In an exemplary embodiment, each pin bore of an exemplary second plurality of pin bores may be extended axially along an exemplary main axis. In an exemplary embodiment, an exemplary second plurality of pin bores may be arranged annularly and spaced around an exemplary second central hole. In an exemplary embodiment, each pin bore of an exemplary second plurality of pin bores may be aligned with a corresponding pin bore of an exemplary first plurality of pin bores. In an exemplary embodiment, an exemplary front plate may be perpendicular to an exemplary main axis. In an exemplary embodiment, an exemplary front plate may include a third central hole may be extended along an exemplary main axis and a plurality of keyholes. In an exemplary embodiment, an exemplary third central hole may be aligned with an exemplary first central hole. In an exemplary embodiment, each keyhole of an exemplary plurality of keyholes may be extended axially along an exemplary main axis. In an exemplary embodiment, an exemplary plurality of keyholes may be arranged annularly and spaced around an exemplary third central hole. In an exemplary embodiment, each keyhole of an exemplary plurality of keyholes may be aligned with a corresponding pin bore of an exemplary first plurality of pin bores. In an exemplary embodiment, each code pin of an exemplary plurality of code pins may be slidably disposed within a corresponding pin bore of an exemplary first plurality of pin bores. In an exemplary embodiment, each spring-loaded driver pin of an exemplary plurality of spring-loaded driver pins may be mounted in a corresponding pin bore of an exemplary second plurality of pin bores. In an exemplary embodiment, each spring-loaded driver pin of an exemplary plurality of spring-loaded driver pins may be configured to contact a corresponding code pin of an exemplary plurality of code pins at a common junction. In an exemplary embodiment, each spring-loaded driver pin of an exemplary plurality of spring-loaded driver pins may be configured to push a corresponding code pin of an exemplary plurality of code pins towards a corresponding keyhole of an exemplary plurality of keyholes. In an exemplary embodiment, an exemplary main shaft may be extended along an exemplary main axis, an exemplary main shaft may be slidable within an exemplary first central hole and an exemplary second central hole along an exemplary main axis. In an exemplary embodiment, an exemplary key may include an elongated key shaft and a plurality of key needles may be extended parallel with an exemplary elongated key shaft. In an exemplary embodiment, an exemplary plurality of key needles may be arranged and spaced annularly around an exemplary elongated key shaft. In an exemplary embodiment, each key needle of an exemplary plurality of key needles may be configured to be insertable into a corresponding keyhole of an exemplary plurality of keyholes. In an exemplary embodiment, an exemplary main shaft may be configured to be coupled to and rotatable with one of an exemplary first cylinder portion and an exemplary second cylinder portion responsive to an exemplary elongated key shaft may be inserted into an exemplary first central hole via an exemplary third central hole.

In an exemplary embodiment, an exemplary spring-loaded driver pin of an exemplary plurality of spring-loaded driver pins may include a driver pin and a pin spring. In an exemplary embodiment, an exemplary driver pin may be coupled to an exemplary pin spring from one end along an exemplary main axis in which an exemplary driver pin may be coupled to an exemplary first code pin from a second opposing end of an exemplary driver pin.

In an exemplary embodiment, an exemplary key may further include a key cylinder. In an exemplary embodiment, an exemplary key cylinder may include a cylinder with a central hole and a plurality of holes around an exemplary central hole. In an exemplary embodiment, an exemplary plurality of holes may be axillary extended along an exemplary main axis. In an exemplary embodiment, an exemplary plurality of holes may be configured to hold an exemplary plurality of key needles.

In an exemplary embodiment, an exemplary locking system may further include a cover. In an exemplary embodiment, an exemplary cover may include a cylinder and a base. In an exemplary embodiment, an exemplary cylinder may be configured to hold an exemplary front plate, an exemplary first cylinder portion, and an exemplary second cylinder portion.

In an exemplary embodiment, an exemplary cover may include at least a tenon to fit into at least a slit on an exemplary key cylinder. In an exemplary embodiment, an exemplary at least a tenon may be configured to direct an exemplary plurality of key needles to fit into an exemplary first plurality of pin bores.

In an exemplary embodiment, an exemplary locking system may further include a shaft spring may be extended along an exemplary main axis of an exemplary main shaft. In an exemplary embodiment, an exemplary shaft spring may be engaged with an exemplary main shaft from one end of an exemplary main shaft. In an exemplary embodiment, an exemplary shaft spring may be placed inside an exemplary first plurality of pin bores. In an exemplary embodiment, an exemplary shaft spring may be configured to actuate a transition movement of an exemplary main shaft.

In an exemplary embodiment, an exemplary main shaft may include at least two protrusions may be extended along an exemplary main axis of an exemplary main shaft. In an exemplary embodiment, an exemplary at least two protrusions may be configured to engage one of an exemplary first cylinder portion and an exemplary second cylinder portion.

In an exemplary embodiment, an exemplary locking system may further include a cam holder plate. In an exemplary embodiment, an exemplary cam holder plate may include a plate and a cylindrical protrusion may be coupled to a first end of an exemplary plate. In an exemplary embodiment, a central hole of an exemplary plate and a central hole of an exemplary cylindrical protrusion may be aligned with a second central hole along an exemplary longitudinal axis of an exemplary second central hole. In an exemplary embodiment, an exemplary cam holder plate may be coupled with an exemplary cam from a first end of an exemplary cam holder plate. In an exemplary embodiment, an exemplary cam holder plate may be coupled with a second end of an exemplary second cylinder portion from a second opposing end of an exemplary cam holder plate. In an exemplary embodiment, an exemplary cam holder plate may be configured to hold an exemplary cam and keep an exemplary plurality of spring-loaded driver pins inside an exemplary second plurality of pin bores.

In an exemplary embodiment, an exemplary gear cam may include an external-toothed ring with at least one protrusion inside an exemplary external-toothed ring and an external-toothed plate. In an exemplary embodiment, an exemplary external-toothed ring may be configured to move a locking tab.

In an exemplary embodiment, one of an exemplary first cylinder portion and an exemplary second cylinder portion may include at least a slit along an exemplary main axis of an exemplary first cylinder portion. In an exemplary embodiment, an exemplary at least a slit may be engaged with an exemplary at least a protrusion inside an exemplary external-toothed ring to transfer rotational movement to an exemplary gear cam.

In an exemplary embodiment, an exemplary protruded cam may include an annular cylinder and at least one protrusion may be mounted on an exemplary annular cylinder perpendicular to an exemplary main axis. In an exemplary embodiment, an exemplary at least a protrusion may be configured to move a locking tab.

In an exemplary embodiment, an exemplary protruded cam may be coupled with an exemplary cam holder plate from at least one side of an exemplary annular cylinder of an exemplary protruded cam, in which an exemplary cylindrical protrusion of an exemplary cam holder plate may be placed inside an exemplary annular cylinder of an exemplary protruded cam. In an exemplary embodiment, an exemplary cam holder plate may be configured to hold an exemplary protruded cam.

In an exemplary embodiment, an exemplary locking system may further include at least a cam movement limiter. In an exemplary embodiment, an exemplary cam movement limiter may include a half plate may be mounted on an exemplary main shaft. In an exemplary embodiment, an exemplary cam movement limiter may be coupled with an exemplary second opposing end of an exemplary second cylinder portion and an exemplary cam to fill a free space between an exemplary second cylinder portion and an exemplary cam.

In an exemplary embodiment, an exemplary locking system may further include a freewheeling safety-booster cylinder may be removably coupled to an exemplary second base end of an exemplary first cylinder portion. In an exemplary embodiment, an exemplary safety-booster cylinder may include a cylinder with a fourth central hole may be extended along a main axis of an exemplary safety-booster cylinder and a fourth plurality of pin bores may be extended axillary along an exemplary main axis of an exemplary safety-booster cylinder. In an exemplary embodiment, an exemplary safety-booster cylinder may include a plurality of spring-loaded safety pins, in which each spring-loaded safety pin of the plurality of spring-loaded safety pins may be disposed within an exemplary fourth pin bore of an exemplary plurality of fourth pin bores.

In an exemplary embodiment, an exemplary spring-loaded safety pin may include a safety pin and a pin spring.

In an exemplary embodiment, an exemplary safety pin may be disposed within an exemplary pin spring, in which a length of an exemplary safety pin may be equal to a length of an exemplary third pin bore along an exemplary main axis of an exemplary safety-booster cylinder.

BRIEF DESCRIPTION OF THE DRAWINGS

The novel features which are believed to be characteristic of the present disclosure, as to its structure, organization, use and method of operation, together with further objectives and advantages thereof, will be better understood from the following drawings in which a presently preferred embodiment of the present disclosure will now be illustrated by way of example. It is expressly understood, however, that the drawings are for illustration and description only and are not intended as a definition of the limits of the present disclosure. Embodiments of the present disclosure will now be described by way of example in association with the accompanying drawings in which:

FIG. 31 illustrates seven possible structures of locking systems, consistent with one or more exemplary embodiments of the present disclosure;

DETAILED DESCRIPTION

Figure 1A:
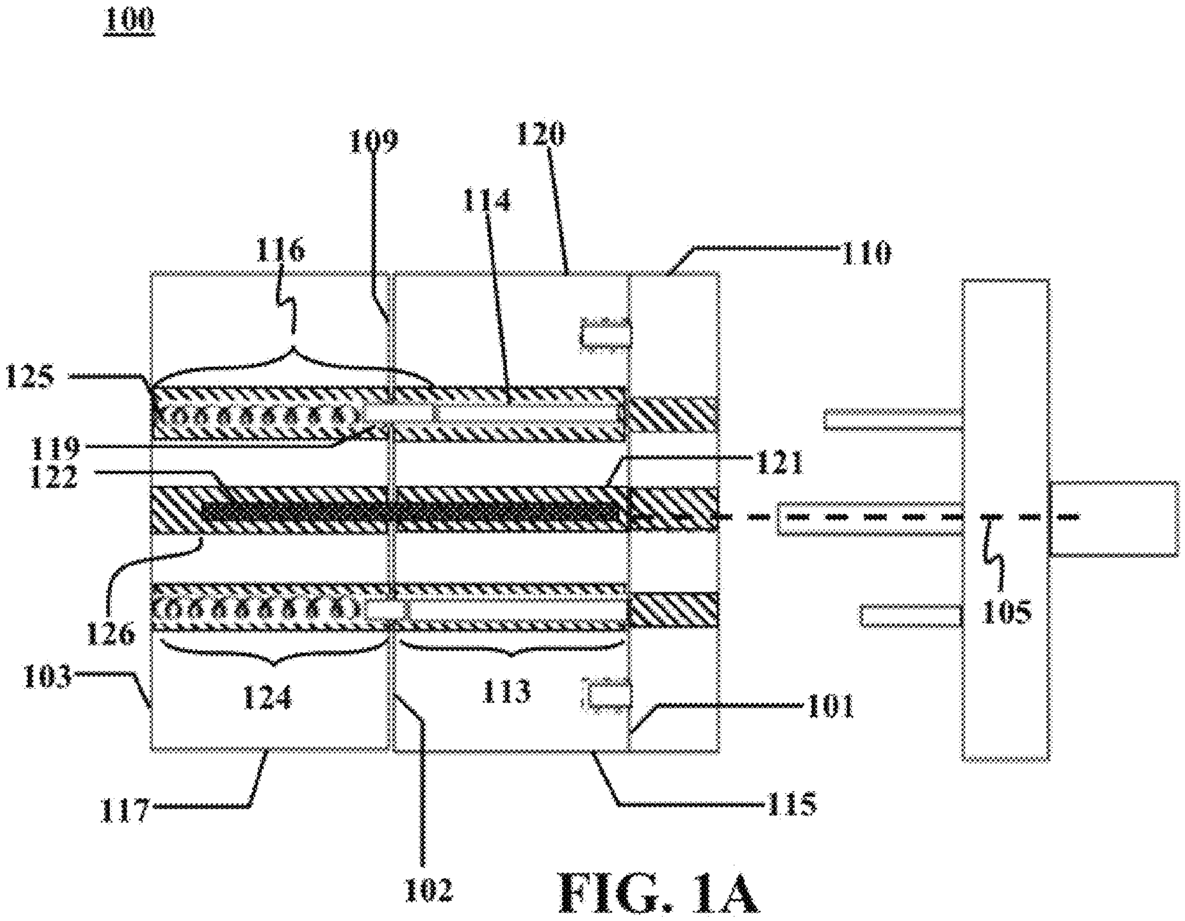
FIG. 1A illustrates a cross-sectional view of a locking system in a locked state, consistent with one or more exemplary embodiments of the present disclosure.

The novel features which are believed to be characteristic of the present disclosure, as to its structure, organization, use and method of operation, together with further objectives and advantages thereof, will be better understood from the following discussion.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be plain to one skilled in the art, and the general principles defined herein may be applied to other implementations and applications without departing from the scope of the present disclosure. The present disclosure is not intended to be limited to the implementations shown but is to be accorded the widest possible scope consistent with the principles and features disclosed herein.

The present disclosure is directed to exemplary embodiments of a locking system with mechanically tunable codes that may be utilized for locking doors, gates, drawers, and the like. An exemplary locking system may include a key, a first cylinder portion, a second cylinder portion, a main shaft, a plurality of code pins, a plurality of spring-loaded driver pins, and a front plate. An exemplary first cylinder portion may include a first central hole extended along a main axis of an exemplary first cylinder portion and at least a first plurality of pin bores placed around an exemplary first central hole extending along an exemplary main axis of an exemplary first cylinder portion. An exemplary second cylinder portion may include a second central hole extending along an exemplary main axis of an exemplary second cylinder portion and a second plurality of pin bores placed around an exemplary second central hole extended along an exemplary main axis of an exemplary second cylinder portion. Each first pin bore of an exemplary first plurality of pin bores may be aligned with a corresponding second pin bore of an exemplary second plurality of pin bores. Moreover, an exemplary first central hole may also be aligned with an exemplary second central hole. An exemplary first cylinder portion may receive an exemplary plurality of code pins with a second length inside an exemplary first plurality of pin bores. An exemplary second length may be shorter than an exemplary length of an exemplary first pin bore along the main axis of an exemplary first cylinder portion. An exemplary second cylinder portion may receive an exemplary plurality of spring-loaded driver pins inside an exemplary second plurality of pin bores. An exemplary spring-loaded driver pin may include a driver pin with a third length and a pin spring with a fourth length. An exemplary pin spring may be engaged with an exemplary driver pin along an exemplary main axis of an exemplary second cylinder portion inside an exemplary second pin bore. A sum of an exemplary third length and an exemplary fourth length may be more than a length of an exemplary second pin bore along the main axis of an exemplary second cylinder portion. In an exemplary embodiment, an exemplary second cylinder portion may include a first end and a second end. In an exemplary embodiment, a length of an exemplary second pin bore may refer to a length of an exemplary second pin bore from an exemplary first end of an exemplary second cylinder to an exemplary second end of an exemplary second cylinder along an exemplary main axis of an exemplary second cylinder.

An exemplary first cylinder portion and an exemplary second cylinder portion each may include a first end and a second end perpendicular to an exemplary main axis of an exemplary first cylinder portion. An exemplary first base end of an exemplary first cylinder portion may be coupled to an exemplary first base end of an exemplary second cylinder portion. An exemplary first cylinder portion and an exemplary second cylinder portion may include a common shear plane formed between an exemplary first end of an exemplary first cylinder portion and an exemplary first end of an exemplary second cylinder portion. In an exemplary embodiment, an exemplary common shear plane may be perpendicular to an exemplary main axis of an exemplary first cylinder portion. An exemplary second plurality of pin bores may be closed from an exemplary second opposing end of an exemplary second cylinder portion, utilizing one of a cap and a cam holder plate. Each code pin of an exemplary plurality of code pins inside an exemplary first plurality of pin bores may be engaged with a corresponding spring-loaded driver pin of an exemplary plurality of spring-loaded driver pins inside an exemplary second plurality of pin bores. An exemplary second length of an exemplary first code pin may be shorter than an exemplary longitudinal dimension of an exemplary first pin bore. Therefore, an exemplary plurality of spring-loaded driver pins inside an exemplary second plurality of pin bores may enter into an exemplary first plurality of pin bores. An exemplary engagement of an exemplary plurality of spring-loaded driver pins inside an exemplary first plurality of pin bores may prevent rotational movement of an exemplary first cylinder portion and an exemplary second cylinder portion relative to each other.

An exemplary front plate may include a third central hole and a plurality of keyholes on a cross sectional dimension of an exemplary front plate. Each keyhole of an exemplary plurality of keyholes may include a smaller diameter than an exemplary diameter of an exemplary code pin. An exemplary front plate may be coupled to an exemplary second opposing end of an exemplary first cylinder portion, utilizing, for example, at least a fixing pin on an exemplary front plate and at least a corresponding fixing hole on an exemplary first cylinder portion. An exemplary front plate may prevent an exemplary first plurality of code pins from coming out of an exemplary first plurality of pin bores. Each keyhole of an exemplary plurality of keyholes may be aligned with a corresponding first pin bore of an exemplary first plurality of pin bores. Moreover, an exemplary third central hole of an exemplary front plate may be aligned with an exemplary first central hole.

An exemplary main shaft may be inserted through an exemplary third central hole, into an exemplary first central hole, and then into an exemplary second central hole. An exemplary main shaft may include at least two protrusions elongated along an exemplary main shaft to engage one of an exemplary first cylinder portion and an exemplary second cylinder portion. An exemplary main shaft may include a handle shaft, a two-piece shaft, and a two-way shaft.

An exemplary locking system may also include a shaft spring which aids an exemplary main shaft in bouncing back when an exemplary shaft spring is restore to an unextended state. An exemplary shaft spring may be mounted on an exemplary main shaft within an exemplary first central hole. An exemplary main shaft may be protruded from an exemplary second opposing end of an exemplary second cylinder portion. An exemplary locking system may also include a cam to move a locking tab. An exemplary cam may be mounted on an exemplary protruded main shaft, utilizing for example, cam clamps. An exemplary cam may include a gear cam and a protruded cam. An exemplary main shaft may actuate a rotational movement of an exemplary cam. An exemplary rotational movement of an exemplary cam may actuate transitional movement of a locking tab which is not discussed here for simplicity. An exemplary front plate, an exemplary first cylinder portion, an exemplary second cylinder portion, an exemplary cam, and an exemplary main shaft may all be placed inside a cover.

An exemplary key may include a plurality of key needles, a key shaft, and a key cylinder. An exemplary key cylinder may include a central hole extending along a main axis of an exemplary key cylinder. An exemplary plurality of key needles may be extending along an exemplary main axis of an exemplary key cylinder. An exemplary plurality of key needles with a first length may be mounted on an exemplary key cylinder, in which an exemplary plurality of key needles may protrude from an exemplary key cylinder. An exemplary key shaft may be coupled to an exemplary central hole of an exemplary key cylinder. After inserting an exemplary key into an exemplary first cylinder portion via an exemplary front plate, an exemplary key shaft may engage one of an exemplary two-way shaft and an exemplary two-piece shaft. When using an exemplary key shaft and one of an exemplary two-way shaft and an exemplary two-piece shaft, an exemplary key shaft may actuate a transition movement of an exemplary main shaft. When one of an exemplary two-way shaft and an exemplary two-piece shaft may be driven by an exemplary key shaft, an exemplary two-way shaft and an exemplary two-piece shaft may engage one of an exemplary second cylinder portion and an exemplary first cylinder portion. An exemplary two-way shaft and an exemplary two-piece shaft may also actuate a rotational movement of an exemplary cam.

After inserting an exemplary key into an exemplary first cylinder portion, an exemplary interface of an exemplary plurality of code pins and an exemplary plurality of spring-loaded driver pins may be aligned with an exemplary common shear plane between an exemplary first cylinder portion and an exemplary second cylinder portion. Therefore, an exemplary first cylinder portion and an exemplary second cylinder portion may rotate relative to each other. An exemplary rotational movement of an exemplary first cylinder portion or an exemplary second cylinder portion may be actuated, utilizing an exemplary main shaft. An exemplary cam may also rotate in response to an exemplary rotational movement of at least one of an exemplary main shaft, an exemplary second cylinder portion, and an exemplary first cylinder portion. In an exemplary embodiment, each spring-loaded driver pin of an exemplary plurality of spring-loaded driver pins may be configured to contact a corresponding code pin of an exemplary plurality of code pins at a common junction. An exemplary common junction may be a place where an exemplary first cylinder portion and an exemplary second cylinder portion may be in contact. Each spring-loaded driver pin of an exemplary plurality of spring-loaded driver pins may be configured to push a corresponding code pin of an exemplary plurality of code pins towards a corresponding keyhole of an exemplary plurality of keyholes. Extending pin spring may actuate transitional movement of an exemplary driver pin and an exemplary corresponding code pin of an exemplary plurality of code pins towards a corresponding keyhole of an exemplary plurality of keyholes.

FIG. 1A illustrates a cross-sectional view of a locking system 100 in a locked state, consistent with one or more exemplary embodiments of the present disclosure. In an exemplary embodiment, locking system 100 may include a key 104, a first cylinder portion 115, a second cylinder portion 117, a plurality of code pins 114, a plurality of spring-loaded driver pins 116, a front plate 110, and a main shaft 122. In an exemplary embodiment, first cylinder portion 115 may include a first plurality of pin bores 113 and a first central hole 121 extending along a main axis 105. In an exemplary embodiment, each pin bore of first plurality of pin bores 113 may be axillary extended along main axis 105. In an exemplary embodiment, plurality of code pins 114 may be disposed within first plurality of pin bores 113. In an exemplary embodiment, each pin bore of first plurality of pin bores 113 may be annularly arranged around first central hole 121. In an exemplary embodiment, first cylinder portion 115 may include a first end 102 and a second end 101 perpendicular to main axis 105 of first cylinder portion 115. In an exemplary embodiment, first plurality of pin bores 113 may be open from both ends of first cylinder portion 115.

Figure 1B:
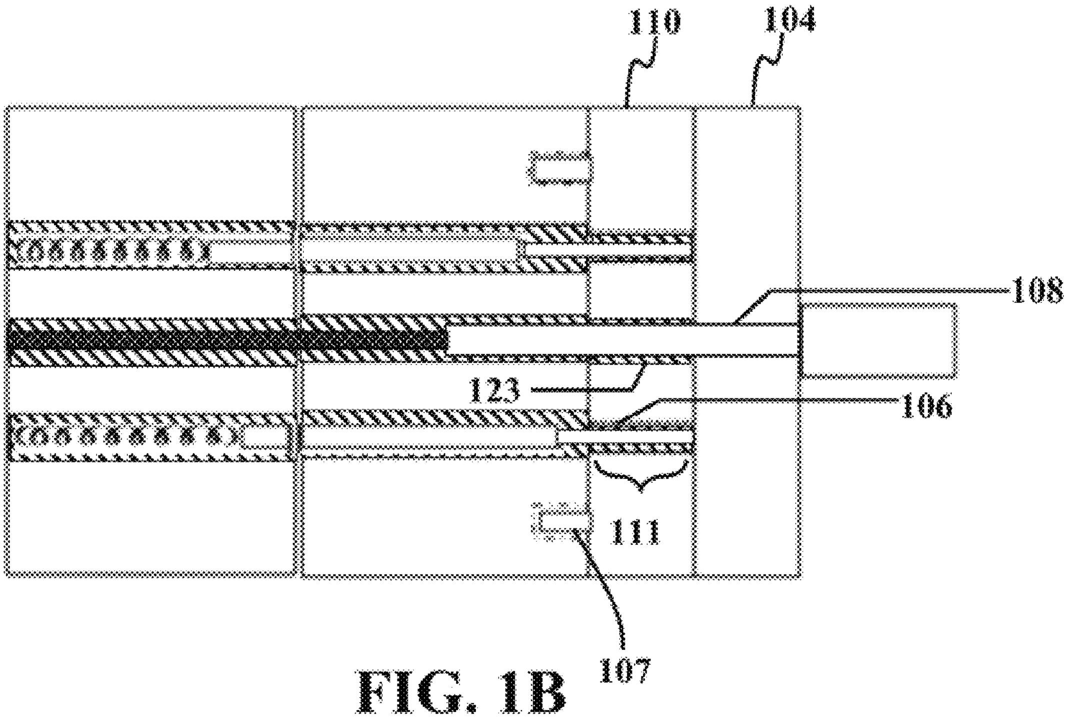
FIG. 1B illustrates a cross-sectional view of a locking system in an unlocked state, consistent with one or more exemplary embodiments of the present disclosure.

In an exemplary embodiment, second cylinder portion 117 may include a second plurality of pin bores 124 and a second central hole 126 extending along main axis 105. In an exemplary embodiment, second central hole 126 may be aligned with first central hole 121 along main axis 105. In an exemplary embodiment, an exemplary align may refer to having common axis for first central hole 121 and second central hole 126, such that first central hole 121 and second central hole 126 may form a continuous hole. In an exemplary embodiment, each pin bore of second plurality of pin bores 124 may be aligned with each pin bore of first plurality of pin bores 113 along main axis 105. In an exemplary embodiment, second cylinder portion 117 may also include a first end 109 and a second end 103 perpendicular to main axis 105 of second cylinder portion 117. In an exemplary embodiment, first end 109 of second cylinder portion 117 may be coupled to first end 102 of first cylinder portion 115. In an exemplary embodiment, first cylinder portion 115 and second cylinder portion 117 may include a common shear plane 120 formed between first cylinder portion 115 and second cylinder portion 117. In an exemplary embodiment, common shear plane 120 may be perpendicular to main axis 105 of first cylinder portion 115. In an exemplary embodiment, plurality of spring-loaded driver pins 116 may be disposed within second plurality of pin bores 124. In an exemplary embodiment, spring-loaded driver pin 116 may include a pin spring and a driver pin which an exemplary pin spring and an exemplary driver pin may be arranged longitudinally along main axis 105. In an exemplary embodiment, plurality of spring-loaded driver pins 116 may protrude from second plurality of pin bores 124 into first plurality of pin bores 113, thereby preventing first cylinder portion 115 and second cylinder portion 117 from rotating with respect to each other FIG. 1B illustrates a cross-sectional view of a locking system 100 in an unlocked state, consistent with one or more exemplary embodiments of the present disclosure. In an exemplary embodiment, key 104 may include a plurality of key needles 106 and a key shaft 108. In an exemplary embodiment, key 104 may be used to unlock locking system 100. In an exemplary embodiment, front plate 110 may be coupled with first cylinder portion 115. In an exemplary embodiment, front plate 110 may include a third central hole 123 aligned with first central hole 121 along main axis 105 and fixing pin 107. In an exemplary embodiment, an exemplary align may refer to having common axis for first central hole 121 and third central hole 123, such that first central hole 121 and third central hole 123 may form a continuous hole. In an exemplary embodiment, front plate 110 may also include a plurality of keyholes 111 extending along main axis 105. In an exemplary embodiment, plurality of keyholes 111 may be annularly placed around third central hole 123. In an exemplary embodiment, each keyhole of plurality of keyholes 111 may be aligned with a corresponding first pin bore of first plurality of pin bores 113. In an exemplary embodiment, plurality of key needles 106 may pass through plurality of keyholes 111 and first plurality of pin bores 113. In an exemplary embodiment, plurality of key needles 106 may push an exemplary plurality of code pins inward.

In an exemplary embodiment, after inserting key 104, an exemplary interface of plurality of code pins 114 and plurality of spring-loaded driver pins 116 may be aligned with common shear plane 120 between first cylinder portion 115 and second cylinder portion 117. In an exemplary embodiment, key shaft 108 may pass through third central hole 123 and first central hole 121, respectively. In an exemplary embodiment, key shaft 108 may push main shaft 122 into first central hole 121 and second central hole 126 to engage with front plate 110. In an exemplary embodiment, main shaft 122 may engage one of first cylinder portion 115 and second cylinder portion 117. Therefore, first cylinder portion 115 and second cylinder portion 117 may rotate relative to each other in response to an exemplary rotation of key 104.

Figure 2A:
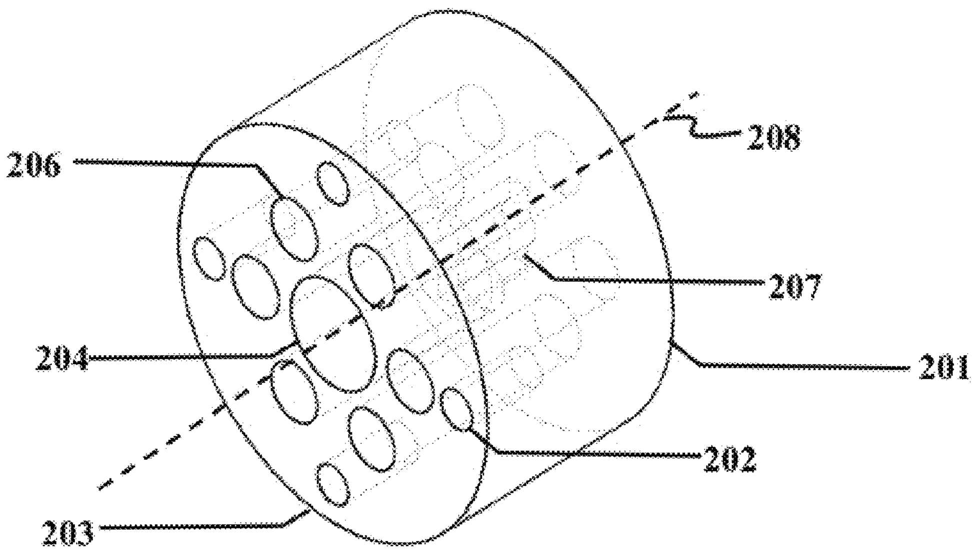
FIGS. 2A-2G illustrate schematic views of a first cylinder portion, consistent with one or more exemplary embodiments of the present disclosure.

FIG. 2A illustrates a schematic view of a first cylinder portion 200, consistent with one or more exemplary embodiments of the present disclosure. In an exemplary embodiment, first cylinder portion 200 may include a main axis 208. In an exemplary embodiment, a first plurality of pin bores 206 may be used to receive an exemplary plurality of first code pins, a first central hole 204 may be a passage hole for an exemplary main shaft, a fixing hole 202 may be an exemplary place of entrance for fixing pin 107 of front plate 110. In an exemplary embodiment, a slit 207 may be a place where an exemplary first cylinder portion 200 may be engaged with an exemplary protrusion along an exemplary main shaft.

Figure 2B:
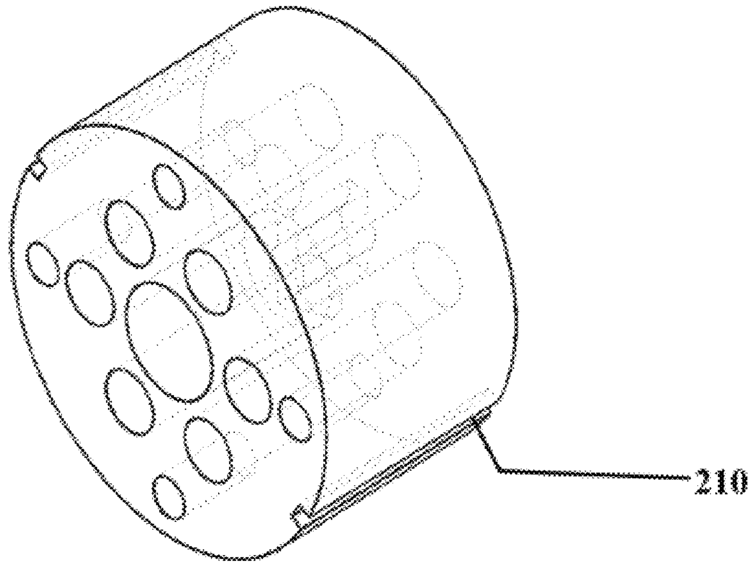
Figure 2C:
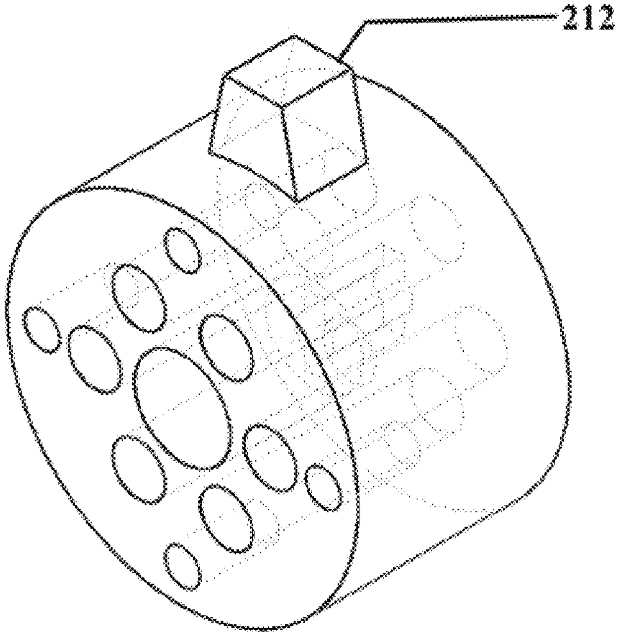
Figure 2D:
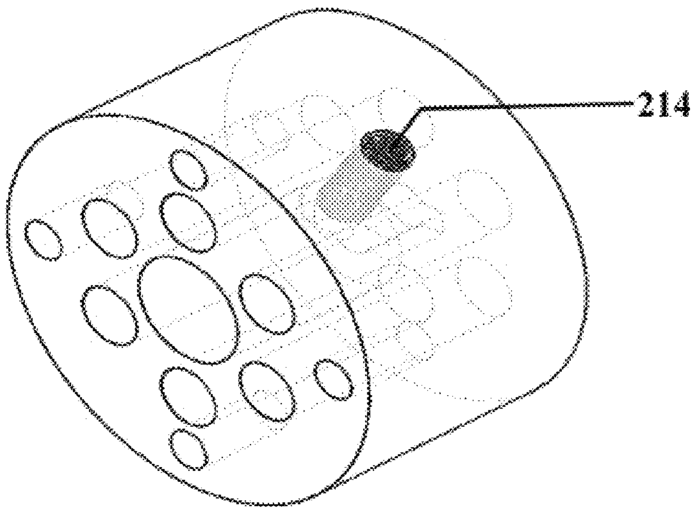

FIG. 2B illustrates a schematic view of a first cylinder portion 209, consistent with one or more exemplary embodiments of the present disclosure. In an exemplary embodiment, first cylinder portion 209 may include a slit 210 which may be responsible for engagement of first cylinder portion 209 with a protrusion 1324 of external-toothed ring 1322. In an exemplary embodiment, an exemplary engagement of first cylinder portion 209 with a protrusion 1324 of external-toothed ring 1322 may transfer rotational movement of first cylinder portion 209 to the gear cam. FIG. 2C illustrates a schematic view of a first cylinder portion 211, consistent with one or more exemplary embodiments of the present disclosure. In an exemplary embodiment, a protrusion 212 may be used for an exemplary one-way lockset FIG. 2D illustrates a schematic view of a first cylinder portion 213, consistent with one or more exemplary embodiments of the present disclosure. In an exemplary embodiment, first cylinder portion 213 may be similar to first cylinder portion 200. In an exemplary embodiment, a threaded hole 214 on first cylinder portion 213 may make first cylinder portion 213 applicable for an exemplary one-way lockset. In an exemplary embodiment, a threaded protrusion may be fastened into threaded hole 214. In an exemplary embodiment, threaded hole 214 and protrusion 212 may be used as an exemplary cam to move a locking tab. In an exemplary embodiment, first cylinder portion 211 and first cylinder portion 213 may be used when an exemplary first cylinder portion may rotate and an exemplary second cylinder portion may be fixed.

Figure 2E:
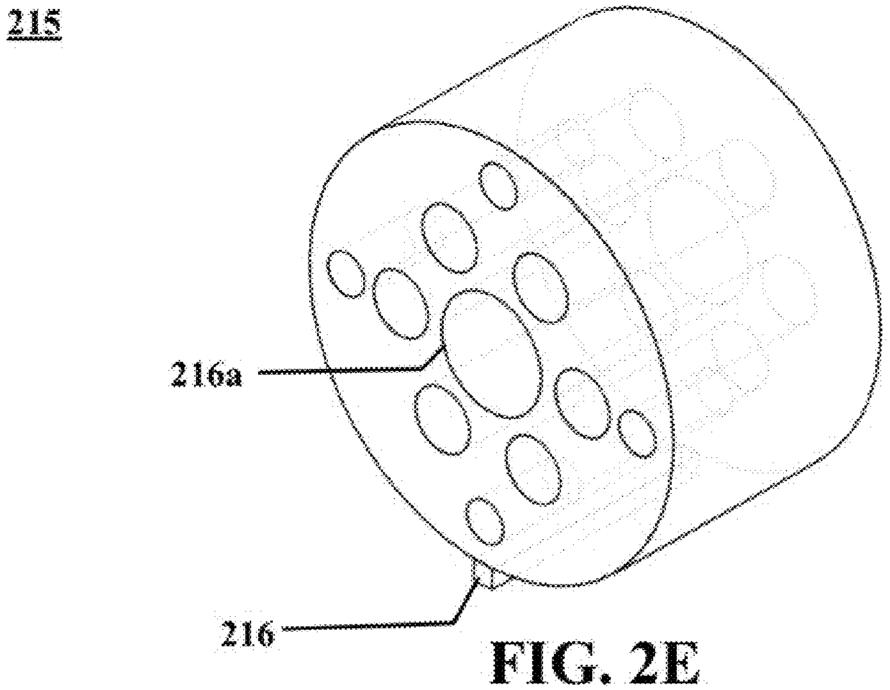

FIG. 2E illustrates a schematic view of a first cylinder portion 215, consistent with one or more exemplary embodiments of the present disclosure. In an exemplary embodiment, first cylinder portion 215 may be similar to first cylinder portion 200. In an exemplary embodiment, first cylinder portion 215 may include a first central hole **216*a* with no engagement parts. In an exemplary embodiment, in a case when an exemplary second cylinder portion may rotate and an exemplary first cylinder portion may remain fixed, an annular central hole may be created so key shaft may not engage with a first cylinder portion 215. In an exemplary embodiment, to fix first cylinder portion 215, a protrusion 216 may be placed in a slit 2202 of cover 2200 and a slit 2206 of cover 2204**.

Figure 2F:
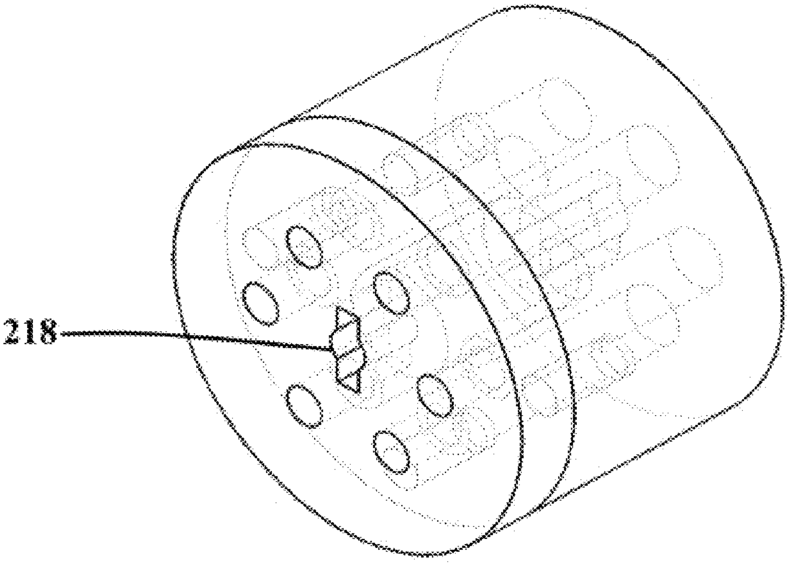

FIG. 2F illustrates a schematic view of a first cylinder portion 217, consistent with one or more exemplary embodiments of the present disclosure. In an exemplary embodiment, first cylinder portion 217 may include a first central hole 218. In an exemplary embodiment, first cylinder portion 217 may be prepared by welding front plate 110 to first cylinder portion 200.

Figure 2G:
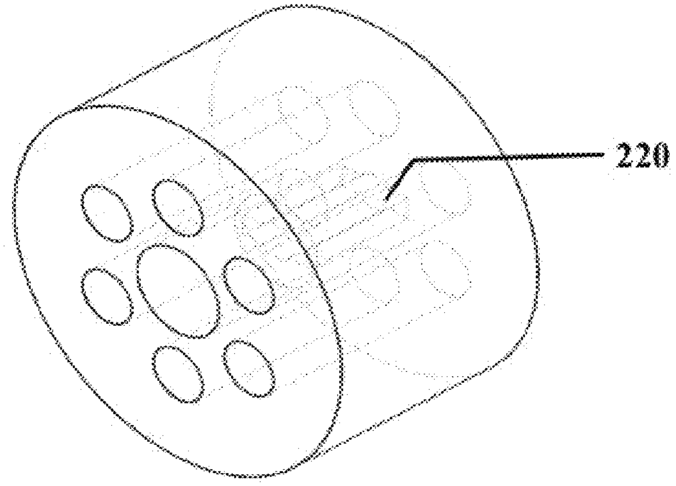

FIG. 2G illustrates a schematic view of a first cylinder portion 219, consistent with one or more exemplary embodiments of the present disclosure. In an exemplary embodiment, first cylinder portion 219 may be similar to first cylinder portion 200 without fixing hole 202. In an exemplary embodiment, first cylinder portion 219 may include an engagement part 220 to engage main shaft 122. In an exemplary embodiment, first cylinder portion 120 may include at least one of first cylinder portion 200, first cylinder portion 209, first cylinder portion 211, first cylinder portion 213, first cylinder portion 215, first cylinder portion 217, and first cylinder portion 219.

Figure 3A:
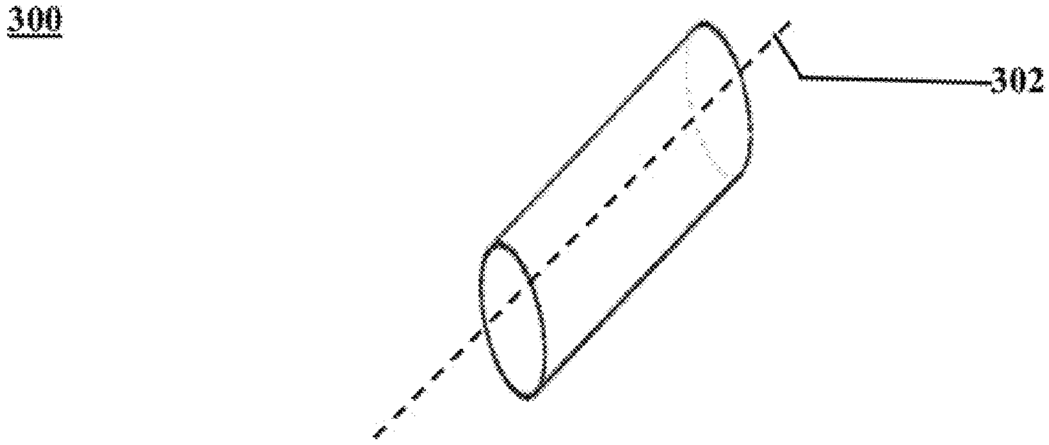
FIGS. 3A-3B illustrate schematic views of a code pin, consistent with one or more exemplary embodiments of the present disclosure.
Figure 3B:
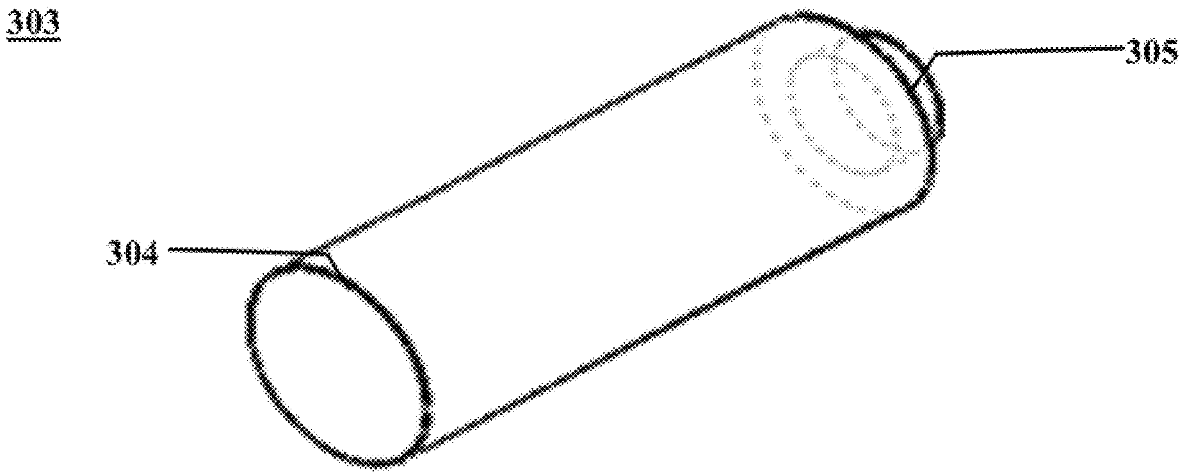

FIG. 3A illustrates a schematic view of a code pin 300, consistent with one or more exemplary embodiments of the present disclosure. In an exemplary embodiment, code pin 300 may be disposed within first plurality of pin bores 113 of first cylinder portion 120. In an exemplary embodiment, spring-loaded driver pin 116 may include a pin spring 125 and a driver pin 119. In an exemplary embodiment, driver pin 119 may be similar to code pin 300. In an exemplary embodiment, main axis 302 of code pin 300 may be parallel to main axis 208 of first cylinder portion 200. FIG. 3B illustrates a schematic view of a code pin 303, consistent with one or more exemplary embodiments of the present disclosure. In an exemplary embodiment, code pin 303 may be similar to code pin 300. In an exemplary embodiment, code pin 303 may include a round head 304 which may facilitate transitional movement of code pin 303 when an exemplary first cylinder portion or an exemplary second cylinder portion rotates. In an exemplary embodiment, code pin 303 may be placed inside first plurality of pin bores 206, in which round head 304 of code pin 303 may be towards first end 201 of first cylinder portion 200. In an exemplary embodiment, code pin 303 may also include a protrusion 305 to engage with exemplary holes of front plate 110 when implanted in first cylinder 115. In an exemplary embodiment, protrusion 305 may also engage with pin spring 125 when implanted in second cylinder 217. In an exemplary embodiment, spring-loaded driver pin 116 may include a pin spring 125 and a driver pin 119. In an exemplary embodiment, driver pin 119 may be similar to code pin 303. In an exemplary embodiment, code pin 303 may also be disposed within an exemplary second plurality of pin bores, such that round head 304 may be placed in a direction to an exemplary first end of an exemplary second cylinder portion.

Figure 4A:
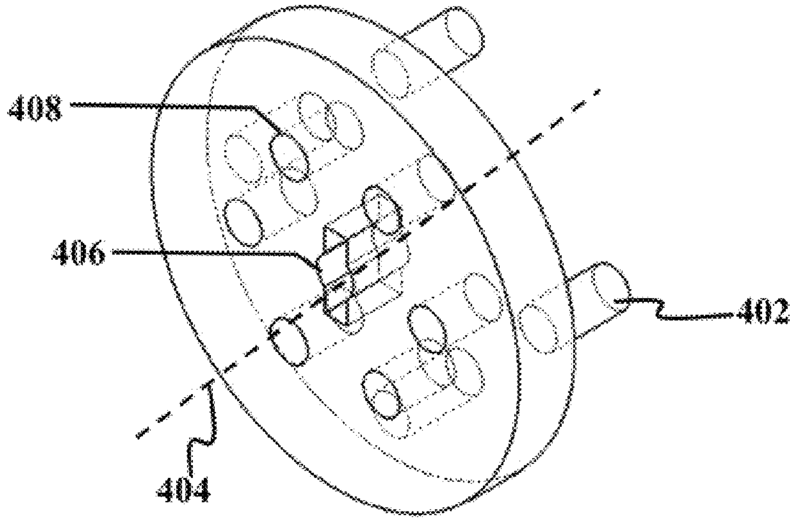
FIGS. 4A-4D illustrate schematic views of a front plate, consistent with one or more exemplary embodiments of the present disclosure.

FIG. 4A illustrates a schematic view of a front plate 400, consistent with one or more exemplary embodiments of the present disclosure. In an exemplary embodiment, front plate 400 may be used to enhance security and keep an exemplary plurality of code pins inside an exemplary first plurality of pin bores. For example, front plate 400 may be used to enhance security and keep plurality of code pins 114 inside first plurality of pin bores. In an exemplary embodiment, adding front plate 400 may restrict access to an exemplary head of exemplary code pins. In an exemplary embodiment, main axis 404 of front plate 400 may be in a same direction with main axis 208 of first cylinder portion 200. In an exemplary embodiment, fixing pin 402 may be coupled to fixing hole 202 of first cylinder portion 200. In an exemplary embodiment, fixing pin 402 and fixing hole 202 may be used to fix front plate 400 to first cylinder portion 200.

Figure 4B:
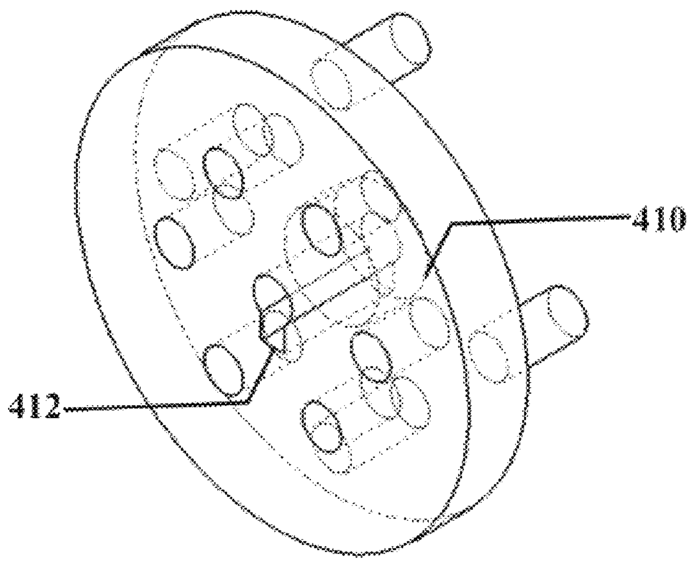
Figure 4C:
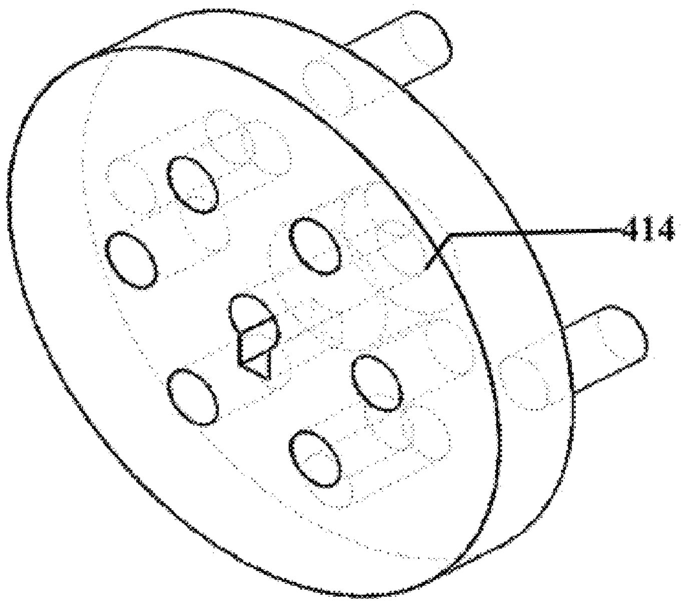
Figure 4D:
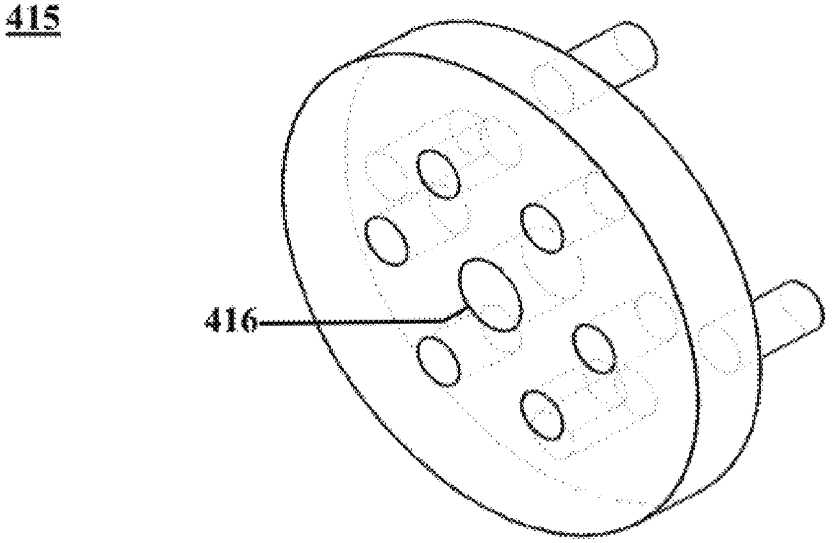

FIG. 4B illustrates a schematic view of a front plate 409, consistent with one or more exemplary embodiments of the present disclosure. In an exemplary embodiment, front plate 409 may be similar to front plate 400. In an exemplary embodiment, front plate 409 may include a blocked shaft entrance 412 which may enhance security of an exemplary upper part of an exemplary front plate 409. In an exemplary embodiment, an exemplary security enhancement may help to restrict access to exemplary first code pins. In an exemplary embodiment, front plate 409 may include a circular end cylinder 410 to block access to shaft entrance 412. In an exemplary embodiment, circular end cylinder 410 may be entered into an exemplary first central hole of an exemplary first cylinder portion. FIG. 4C illustrates a schematic view of a front plate 413, consistent with one or more exemplary embodiments of the present disclosure. In an exemplary embodiment, front plate 413 may be similar to front plate 400. In an exemplary embodiment, front plate 413 may include a circular end cylinder 414 to block access to exemplary protrusions on an exemplary shaft entrance from the top and from the bottom. FIG. 4D illustrates a schematic view of a front plate 415, consistent with one or more exemplary embodiments of the present disclosure. In an exemplary embodiment, front plate 415 may be similar to front plate 400. In an exemplary embodiment, front plate 415 may be used when an exemplary second cylinder portion may rotate In an exemplary embodiment, an exemplary front plate 110 may include at least one of front plate 400, front plate 409, front plate 413, and front plate 415.

Figure 5:
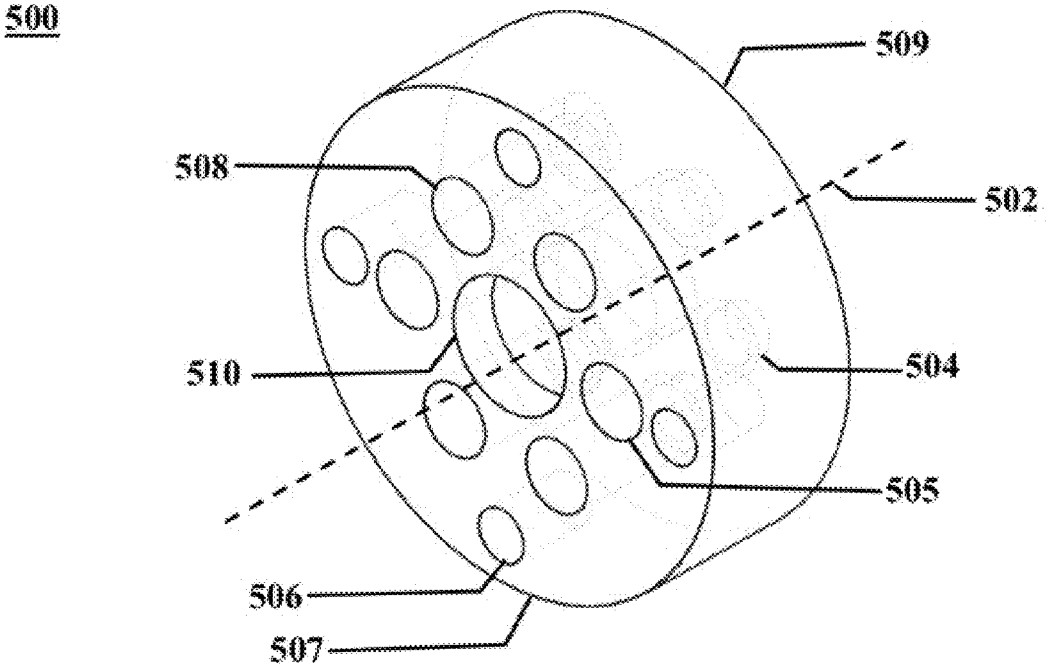
FIG. 5 illustrates a schematic view of a safety-booster cylinder, consistent with one or more exemplary embodiments of the present disclosure.

FIG. 5 illustrates a schematic view of a safety-booster cylinder 500, consistent with one or more exemplary embodiments of the present disclosure. In an exemplary embodiment, safety-booster cylinder 500 may be required for an exemplary super safe locking system. In an exemplary embodiment, at least a fixing hole 506 may be provided for fixing pin 402 of front plate 400. In an exemplary embodiment, a fourth central hole 510 may be provided to place circular end cylinder 410 and circular end cylinder 414. In an exemplary embodiment, to use safety-booster cylinder 500, an exemplary plurality of spring-loaded safety pins may be required. In an exemplary embodiment, an exemplary spring-loaded safety pin may include a safety pin 600 and a pin spring 700. In an exemplary embodiment, safety pin 600 may be disposed within pin spring 700. In an exemplary embodiment, an exemplary plurality of spring-loaded safety pins may be disposed within a fourth plurality of pin bores 508 of safety-booster cylinder 500. In an exemplary embodiment, third pin bore 508 of safety-booster cylinder 500 may include smaller diameter on an exemplary first end of fourth pin bore 508 in comparison to an exemplary second end of fourth pin bore 508. In an exemplary embodiment, an exemplary plurality of spring-loaded safety pins may be disposed within plurality of fourth pin bores 508 from a hole entrance 505. In an exemplary embodiment, safety pin 600 may include a cap 604 to be fixed inside pin spring 700. In an exemplary embodiment, when safety pin 600 may be disposed within pin spring 700 from a rod part 606, cap 604 of safety pin 600 may fix safety pin 600 inside pin spring 700. In an exemplary embodiment, an end point 504 may include a smaller diameter in comparison to hole entrance 505. In an exemplary embodiment, smaller diameter of end point 504 of fourth pin bore 508 may trap pin spring 700 inside fourth pin bore 508. In an exemplary embodiment, a fourth central hole 510 may be blocked in a middle of fourth central hole 510 to limit access to main shaft 122. In an exemplary embodiment, a main axis 502 of safety-booster cylinder 500 may be aligned with main axis 208 of first cylinder portion 200. In an exemplary embodiment, first cylinder portion 219 may be used for an exemplary lockset with safety-booster cylinder 500. In an exemplary embodiment, when using safety-booster cylinder 500, front plate 400 may be coupled to an exemplary safety-booster cylinder 500. Therefore, there may be no requirement for fixing hole 202 to fix an exemplary front plate on first cylinder portion 219.

Figure 6:
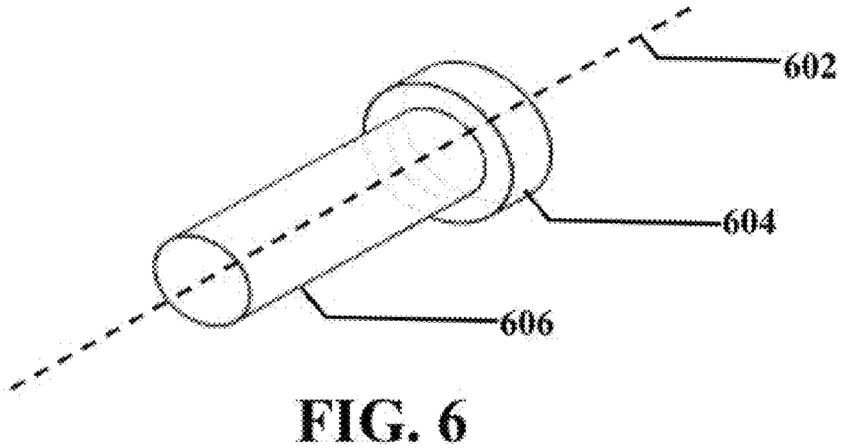
FIG. 6 illustrates a schematic view of a safety pin, consistent with one or more exemplary embodiments of the present disclosure.
Figure 7:
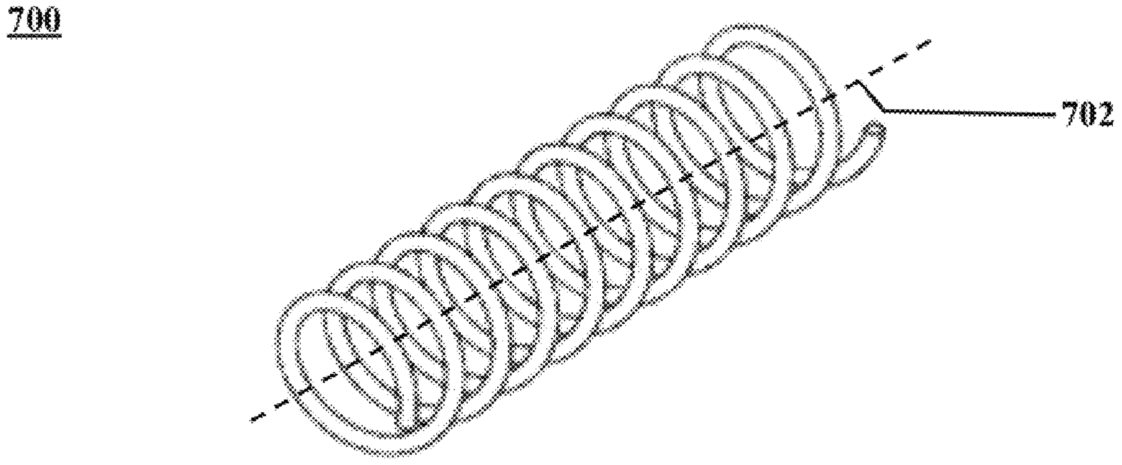
FIG. 7 illustrates a schematic view of a pin spring, consistent with one or more exemplary embodiments of the present disclosure.

FIG. 6 illustrates a schematic view of a safety pin 600, consistent with one or more exemplary embodiments of the present disclosure. In an exemplary embodiment, safety pin 600 may include a cap 604 and a rod 606. In an exemplary embodiment, a main axis 602 of safety pin 600 may be parallel to main axis 502 of safety-booster cylinder 500. In an exemplary embodiment, all exemplary safety pins may include a same size. FIG. 7 illustrates a schematic view of a pin spring 700, consistent with one or more exemplary embodiments of the present disclosure. In an exemplary embodiment, a main axis 702 of pin spring 700 may be parallel to main axis 502 of safety-booster cylinder 500. In an exemplary embodiment, safety pin 600 may be disposed within pin spring 700.

In an exemplary embodiment, an exemplary locking system may also include a safety-booster cylinder 500 to form a super safe locking system. In an exemplary embodiment, safety-booster cylinder 500 may include a fourth central hole 510 extended along an exemplary main axis 105 of safety-booster cylinder 500. In an exemplary embodiment, safety-booster cylinder 500 may also include a plurality of fourth pin bores 508 arranged around an exemplary fourth central hole 510 in which an exemplary plurality of fourth pin bores 508 may be extended along main axis 502. In an exemplary embodiment, safety-booster cylinder 500 may include a first end 507 and a second end 509 perpendicular to main axis 502 of safety-booster cylinder 500. In an exemplary embodiment, an exemplary first base end 507 safety-booster cylinder 500 may be coupled to second opposing end 203 of first cylinder portion 200. In an exemplary embodiment, an exemplary front plate 400 may be coupled to second opposing end 509 of safety-booster cylinder 500, utilizing at least a fixing pin 402 on an exemplary front plate 400 extended along an exemplary main axis 502 of safety-booster cylinder 500 and at least a fixing hole 506 on safety-booster cylinder 500 extended along main axis 502 of safety-booster cylinder 500.

In an exemplary embodiment, safety-booster cylinder 500 may include a plurality of spring-loaded safety pins with a fifth length. In an exemplary embodiment, an exemplary plurality of spring-loaded safety pins may include a plurality of safety pins 600 and pin springs 700. In an exemplary embodiment, each safety pin 600 of an example plurality of safety pins 600 may be disposed within pin spring 700 of an exemplary plurality of pin springs 700. In an exemplary embodiment, exemplary safety pins 600 may include a same size. Furthermore, in an exemplary embodiment, pin springs 700 may include a same size and a same compressive strength. As used herein, compressive strength may refer to a capacity of pin spring 700 to withstand loads which exemplary loads tend to reduce an exemplary size of pin spring 700. In an exemplary embodiment, each spring-loaded safety pin of an exemplary plurality of spring-loaded safety pins may be disposed within a fourth pin bore 508 of an exemplary plurality of fourth pin bores 508. In an exemplary embodiment, safety pin 600 may include a cap 604 and a rod 606, in which an exemplary cap 604 may help an exemplary safety pin 600 to be engaged with an exemplary pin spring 700. In an exemplary embodiment, an exemplary first end 504 of fourth pin bore 508 may include a smaller diameter in comparison to pin spring 700. Therefore, in an exemplary embodiment, pin spring 700 may be trapped inside fourth pin bore 508 when safety pin 600 may be ejected from first end 508 of fourth pin bore 508. In an exemplary embodiment, safety pin 600 may be ejected from first end 508 of pin bore 508 when a pressure from key needles 106 may be applied. In an exemplary embodiment, each safety pin 600 of plurality of safety pins 600 may be coupled to a corresponding first code pin 114 of plurality of first code pins 114 from rod 606 of safety pin 600. In an exemplary embodiment, safety-booster cylinder 500 may include a freewheeling state that may help enhancing safety and may also make finding an exemplary code of an exemplary super safe locking system harder.

In an exemplary embodiment, in an exemplary locking system with no safety-booster cylinder 500, a sum of an exemplary second length and an exemplary first length may be equal to an exemplary length of first pin bore 113 along an exemplary main axis 105 of first cylinder portion 120. In an exemplary embodiment, when an exemplary front plate 110 may be attached to first cylinder portion 120, a sum of an exemplary second length and an exemplary first length may be equal to a sum of a length of first pin bore 113 along main axis 105 and a length of keyhole 111 along main axis 105. In an exemplary embodiment, in an exemplary locking system with safety-booster cylinder 500, a sum of an exemplary fifth length, an exemplary second length, and an exemplary first length may be equal to a sum of an exemplary length of an exemplary first pin bore 113, an exemplary length of third pin bore 508, and an exemplary length of keyhole 111 along an exemplary main axis 105.

In an exemplary embodiment, when using an exemplary locking system with safety-booster cylinder 500, key needles 106 may get entered into plurality of keyhole 111 and an exemplary plurality of third pin bore 508. In an exemplary embodiment, exemplary key needles 106 may each include a different length which may determine a code. In an exemplary embodiment, when an exemplary plurality of key needles 106 may be inserted into an exemplary plurality of third pin bores 508, plurality of code pins 114 and plurality of spring-loaded driver pins 116 may get organized such that an exemplary boundary between plurality of code pins 114 and plurality of spring-loaded driver pins 116 may be aligned with an exemplary common shear plane of first cylinder portion 120 and second cylinder portion 117. In an exemplary embodiment, plurality of code pins 114 may include code pins 300 and code pin 303. Therefore, an exemplary first cylinder portion 120 and an exemplary second cylinder portion 117 may rotate relative to each other.

Figure 8:
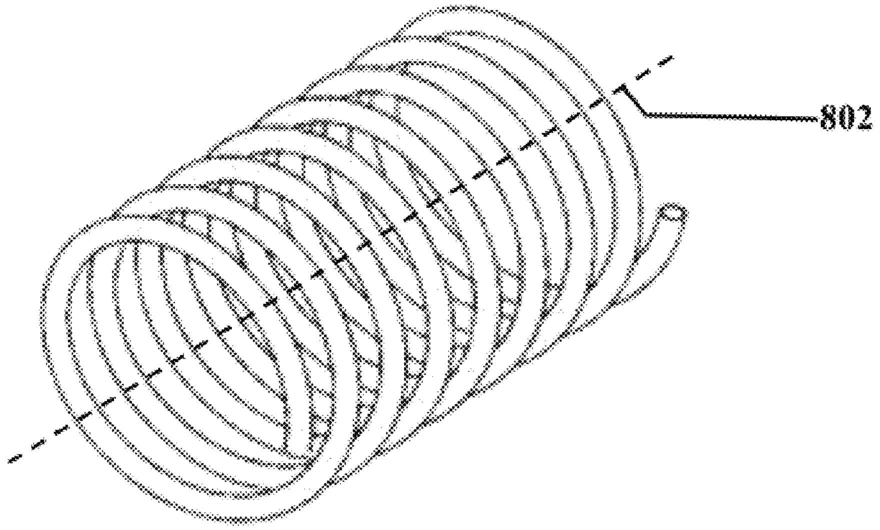
FIG. 8 illustrates a schematic view of a shaft spring, consistent with one or more exemplary embodiments of the present disclosure.

FIG. 8 illustrates a schematic view of a shaft spring 800, consistent with one or more exemplary embodiments of the present disclosure. In an exemplary embodiment, a main axis 802 of shaft spring 800 may be in a same direction of main axis 208 of first cylinder portion 200 and main axis 502 of safety-booster cylinder 500. In an exemplary embodiment, shaft spring 800 may include two modes. In an exemplary embodiment, exemplary two modes may include an extended mode and an unextended mode. In an exemplary embodiment, when shaft spring 800 may change from an unextended mode to an extended mode, main shaft 122 may be moved. In an exemplary embodiment, shaft spring 800 may be used to bring back main shaft 122 to an exemplary first position when main shaft 122 may be free of an engagement. In an exemplary embodiment, shaft spring 800 may actuate transitional movement of main shaft 122 when a compressive energy from key shaft 108 may be removed from unextended shaft spring 800.

In an exemplary embodiment, first cylinder portion 217 may be prepared by removing a protrusion 402 of a front plate 400 and welding a front plate 400 to first cylinder portion 200. In an exemplary embodiment, when a shaft spring may be required then a shaft spring 800 may be placed inside first central hole 218 of first cylinder portion 217 before welding.

Figure 9A:
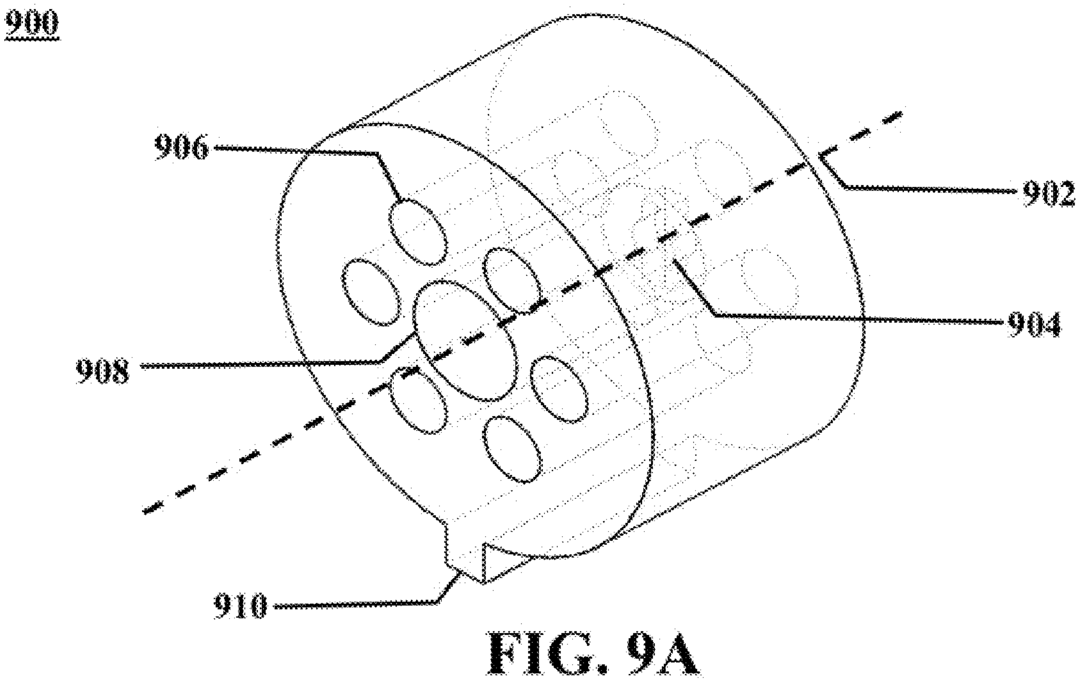
FIGS. 9A-9D illustrate schematic views of a second cylinder portion, consistent with one or more exemplary embodiments of the present disclosure.

FIG. 9A illustrates a schematic view of a second cylinder portion 900, consistent with one or more exemplary embodiments of the present disclosure. In an exemplary embodiment, a second plurality of pin bores 906 may be a place for code pin 300 and code pin 303. In an exemplary embodiment, a second central hole 908 may be a passage for main shaft 122. In an exemplary embodiment, a slit 904 may be a place where second cylinder portion 900 may be engaged with main shaft 122. In an exemplary embodiment, a main axis 902 of second cylinder portion 900 may be in a same direction with main axis 208 of first cylinder portion 200.

Figure 9B:
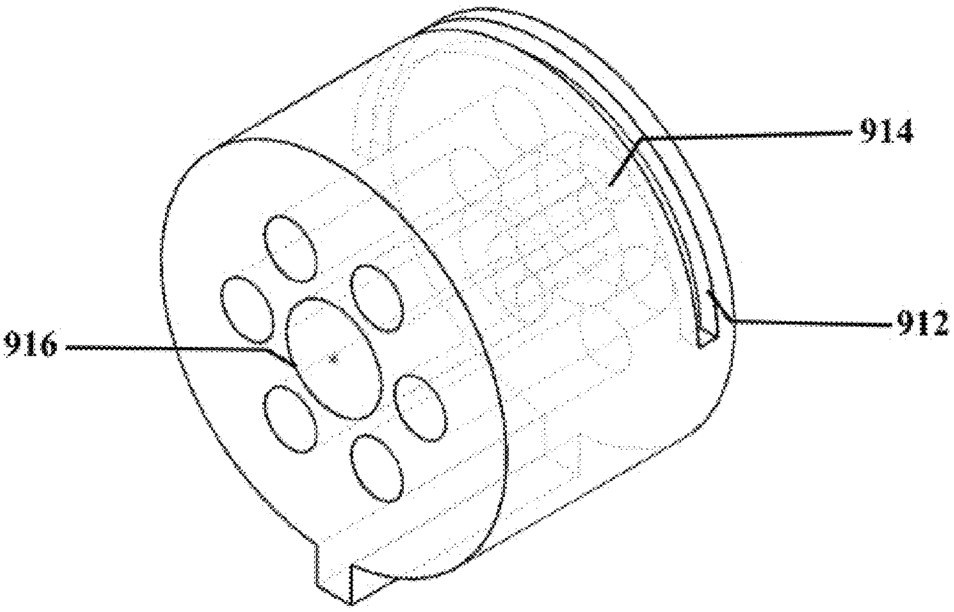

FIG. 9B illustrates a schematic view of a second cylinder portion 911, consistent with one or more exemplary embodiments of the present disclosure. In an exemplary embodiment, second cylinder portion 911 may be similar to second cylinder portion 900. In an exemplary embodiment, second cylinder portion 911 may include a second central hole 916 for an exemplary main shaft passage. In an exemplary embodiment, a cylindrical protrusion 914 may be used to hold an exemplary cam. In an exemplary embodiment, a slit 912 may be a place to fit half ring 1000. In an exemplary embodiment, half ring 1000 may fix second cylinder portion 911 in a cover.

Figure 9C:
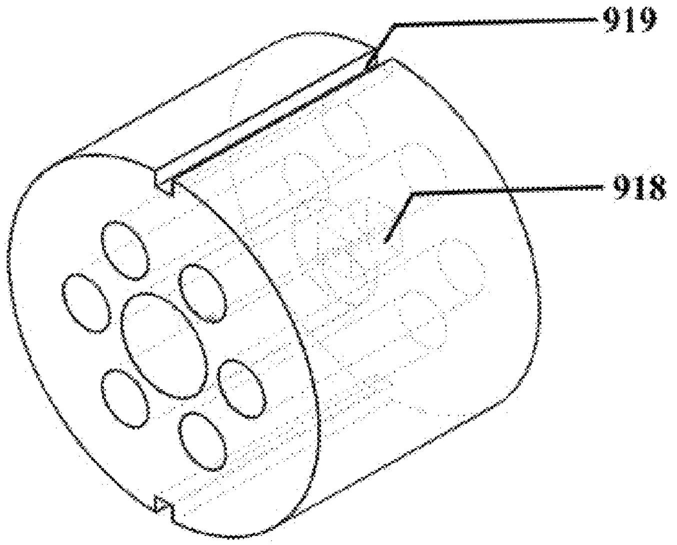
Figure 9D:
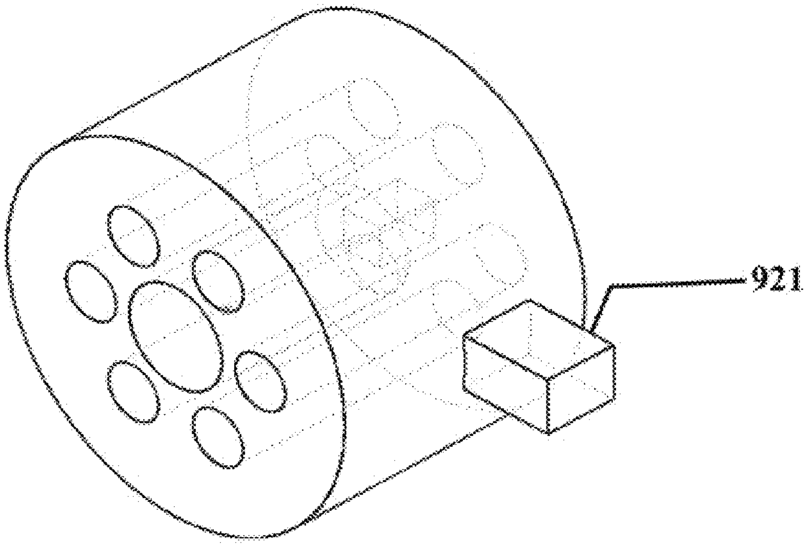

FIG. 9C illustrates a schematic view of a second cylinder portion 917, consistent with one or more exemplary embodiments of the present disclosure. In an exemplary embodiment, second cylinder portion 917 may be similar to second cylinder portion 900. In an exemplary embodiment, second cylinder portion 917 may be used when second cylinder portion 117 may rotate. FIG. 9D illustrates a schematic view of a second cylinder portion 920, consistent with one or more exemplary embodiments of the present disclosure. In an exemplary embodiment, second cylinder portion 920 may be similar to second cylinder portion 900. In an exemplary embodiment, a protrusion 921 may be provided for an exemplary one-way lockset.

In an exemplary embodiment, after placing an exemplary second cylinder portion in an exemplary cover, code pin 300 and code pin 303 may be used for an exemplary second cylinder pin bore of an exemplary second cylinder portion. In an exemplary embodiment, an exemplary code pin may determine a code. In an exemplary embodiment, after inserting exemplary code pins inside an exemplary second plurality of pin bores, pin spring 700 may be placed into an exemplary second plurality of pin bores. In an exemplary embodiment, pin spring 700 may include a smaller diameter than code pin 300 and code pin 303. In an exemplary embodiment, code pin 303 may include a round head 304 which may make an exemplary rotation of code pin 303 easier. In an exemplary embodiment, when an exemplary first cylinder portion or an exemplary second cylinder portion may rotate, code pins 303 may pass each other. Therefore, round head 304 of first code pin 303 and an exemplary spring-loaded driver pin may facilitate movement of an exemplary first cylinder portion and an exemplary second cylinder portion. In an exemplary embodiment, round head 304 of an exemplary first code pin and an exemplary spring-loaded driver pin may be next to each other in a boundary of an exemplary first cylinder portion and an exemplary second cylinder portion. In an exemplary embodiment, code pin 300 may be cheaper than code pin 303.

Figure 10:
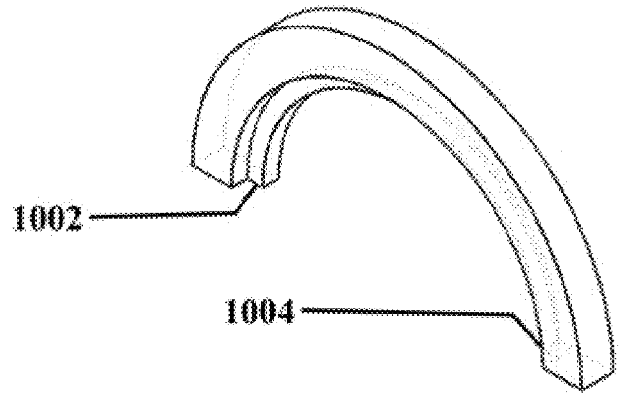
FIG. 10 illustrates a schematic view of a half ring, consistent with one or more exemplary embodiments of the present disclosure.

FIG. 10 illustrates a schematic view of a half ring 1000, consistent with one or more exemplary embodiments of the present disclosure. In an exemplary embodiment, half ring 1000 may be used to fix second cylinder portion 911 in for example, cover 2218. In an exemplary embodiment, a part 1004 of half ring 1000 may be placed on edge 2224 of cover 2218. In an exemplary embodiment, a protrusion 1002 may be placed on slit 912.

Figure 11A:
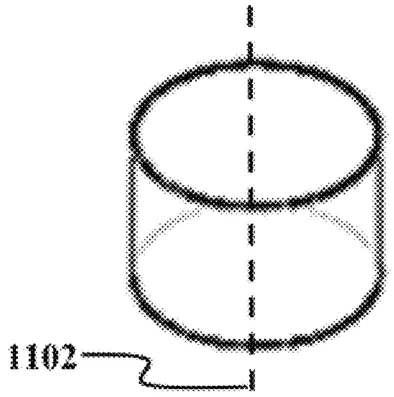
FIG. 11A illustrates a schematic view of a cap, consistent with one or more exemplary embodiments of the present disclosure.

FIG. 11A illustrates a schematic view of a cap 1100, consistent with one or more exemplary embodiments of the present disclosure. In an exemplary embodiment, when second cylinder portion 900, second cylinder portion 911, and second cylinder portion 919 may be used, cap 1100 may be required. In an exemplary embodiment, cap 1100 may be fixed on an exemplary second end of each of an exemplary second pin bore of an exemplary second plurality of pin bores. In an exemplary embodiment, gear 1320 may be used with second cylinder portion 917, in which gear 1320 may work as an obstacle to trap exemplary spring-loaded driver pins inside second cylinder portion 917. In an exemplary embodiment, main axis 1102 of cap 1100 may be parallel to main axis 902 of second cylinder portion 900.

Figure 11B:
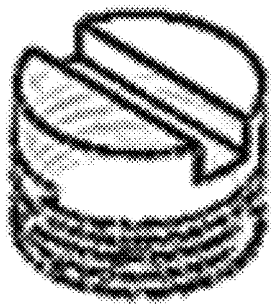
FIG. 11B illustrates a schematic view of a threaded cap, consistent with one or more exemplary embodiments of the present disclosure.

FIG. 11B illustrates a schematic view of a threaded cap 1104, consistent with one or more exemplary embodiments of the present disclosure. In an exemplary embodiment, threaded cap 1104 may be similar to cap 1100. In an exemplary embodiment, when second cylinder portion 900, second cylinder portion 911, and second cylinder portion 919 may be used, cap 1104 may be required. In an exemplary embodiment, cap 1104 may be fixed on an exemplary second end of each of an exemplary second pin bore of an exemplary second plurality of pin bores.

Figure 12A:
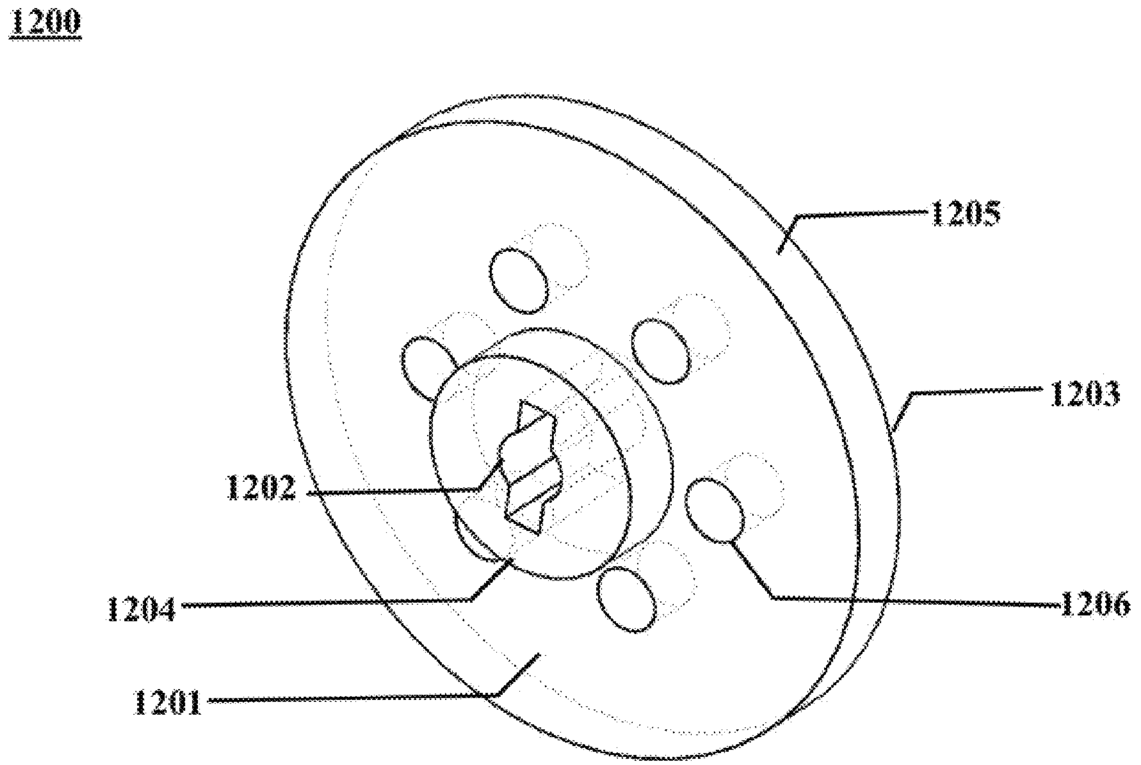
FIG. 12A illustrates a schematic view of a cam holder plate, consistent with one or more exemplary embodiments of the present disclosure.

FIG. 12A illustrates a schematic view of a cam holder plate 1200, consistent with one or more exemplary embodiments of the present disclosure. In an exemplary embodiment, an exemplary locking system may also include cam holder plate 1200 to fix an exemplary cam. In an exemplary embodiment, cam holder plate 1200 may prevent exemplary pin springs from exiting an exemplary second pin bore. In an exemplary embodiment, cam holder plate 1200 may be used when a two-piece cam 1312 may be mounted on main shaft 122. In an exemplary embodiment, cam holder plate 1200 may include a central hole 1202 which may work as a passage for main shaft 122. In an exemplary embodiment, cam holder plate 1200 may also include a cylindrical protrusion 1204 which may be a holder for an exemplary two-piece cam.

In an exemplary embodiment, a hole 1206 may be used to change exemplary code pins by inserting a rod into hole 1206. In an exemplary embodiment, after inserting an exemplary rod, exemplary code pins may be ejected when an exemplary front plate may be removed. In an exemplary embodiment, an exemplary protruded cam may be coupled with cylindrical protrusion 1204 of cam holder plate 1200 from at least one side of for example, annular cylinder 1306 of protruded cam 1300. In an exemplary embodiment, cylindrical protrusion 1204 of cam holder plate 1200 may be placed inside annular cylinder 1306 of protruded cam 1300. In an exemplary embodiment, cam holder plate 1200 may be configured to hold protruded cam 1300.

Figure 12B:
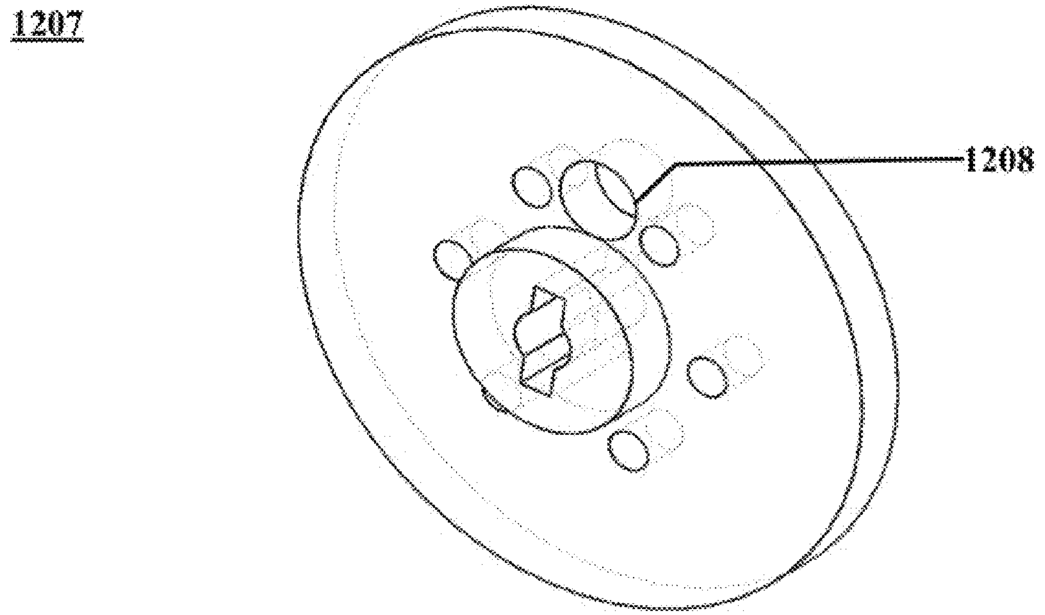
FIG. 12B illustrates a schematic view of a cam holder plate, consistent with one or more exemplary embodiments of the present disclosure.
Figure 12C:
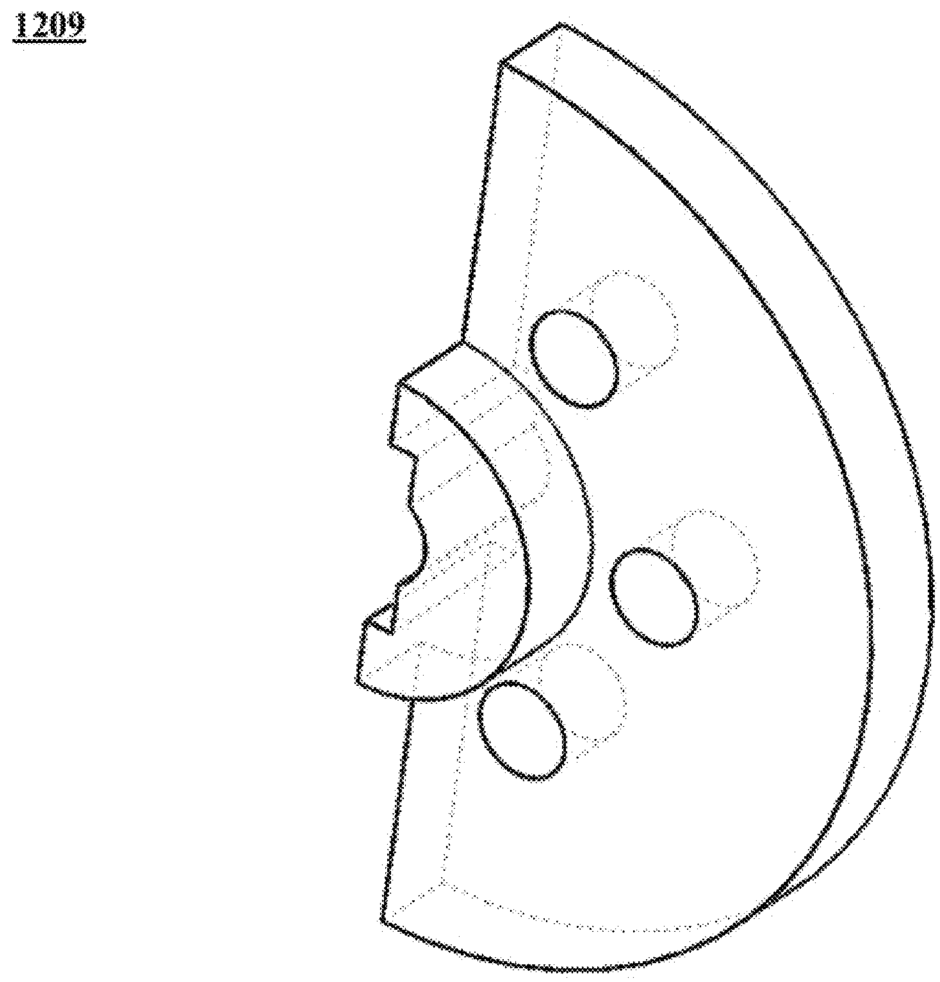
FIG. 12C illustrates a schematic view of a half cam holder plate, consistent with one or more exemplary embodiments of the present disclosure.

FIG. 12B illustrates a schematic view of a cam holder plate 1207, consistent with one or more exemplary embodiments of the present disclosure. In an exemplary embodiment, cam holder plate 1207 may be similar to cam holder plate 1200. In an exemplary embodiment, cam holder plate 1207 may include a code replacement hole 1208. In an exemplary embodiment, when code replacement hole 1208 may be placed in front of an exemplary second pin bore, exemplary spring-loaded driver pins may come out by inserting a rod into an exemplary hole of an exemplary front plate. In an exemplary embodiment, cam holder plate 1207 may not be applicable for an exemplary super safe locking system. FIG. 12C illustrates a schematic view of a half cam holder plate 1209, consistent with one or more exemplary embodiments of the present disclosure. In an exemplary embodiment, half cam holder plate 1209 may be similar to cam holder plate 1200. In an exemplary embodiment, changing a half of exemplary code pins may be applicable when using half cam holder plate 1209. In an exemplary embodiment, half cam holder plate 1209 may not be applicable for an exemplary super safe locking system.

Figure 12D:
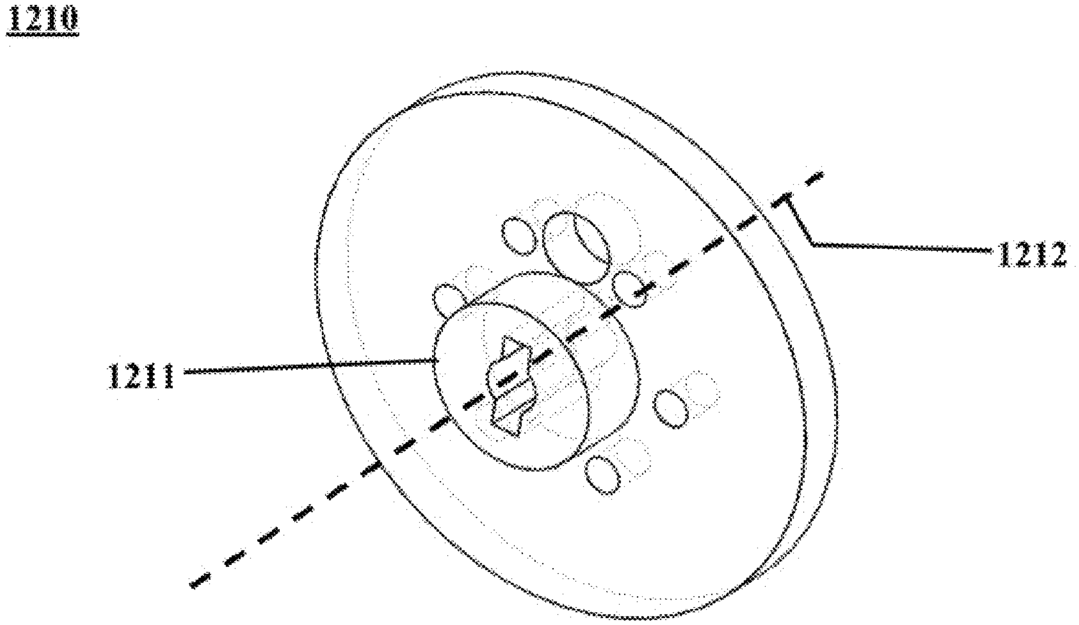
FIG. 12D illustrates a schematic view of a cam holder plate, consistent with one or more exemplary embodiments of the present disclosure.

FIG. 12D illustrates a schematic view of a cam holder plate 1210, consistent with one or more exemplary embodiments of the present disclosure. In an exemplary embodiment, cam holder plate 1210 may be similar to cam holder plate 1207. In an exemplary embodiment, cam holder plate 1210 may include a longer cylindrical protrusion 1211 along main axis 1312 in comparison to cylindrical protrusion 1204. In an exemplary embodiment, cam holder plate 1210 may be used for an integrated cam 1300 and an integrated cam 1310. In an exemplary embodiment, after inserting cam holder plate 1210, to fix main shaft 122, cam holder plate 1210 may be rotated. In an exemplary embodiment, rotating cam holder plate 1210 may enhance safety because after rotating cam holder plate 1210, exemplary protrusions on main shaft 122 may be engaged with cam holder plate 1210. In an exemplary embodiment, main shaft 122 may be fixed in an exemplary lockset and may not exit an exemplary lockset by applying pressure.

Figure 13A:
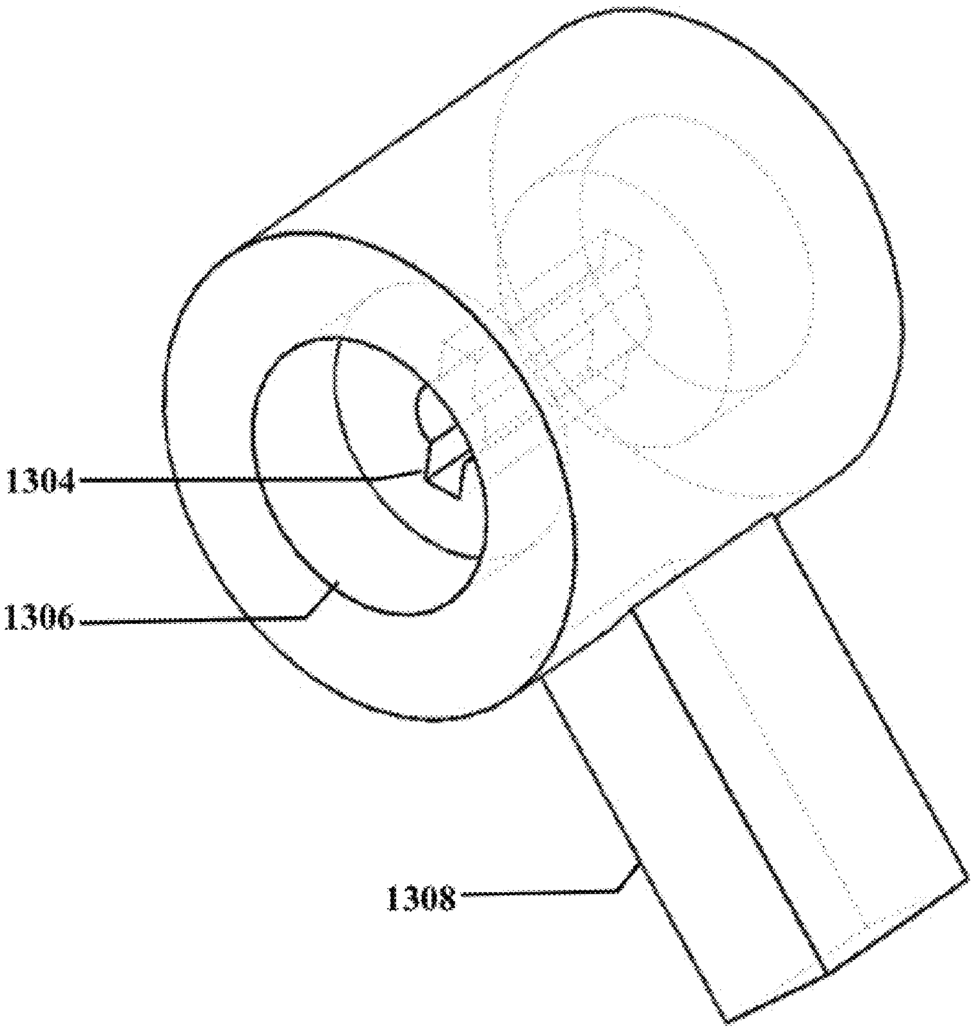
FIG. 13A illustrates a schematic view of an integrated cam, consistent with one or more exemplary embodiments of the present disclosure.

FIG. 13A illustrates a schematic view of an integrated cam 1300, consistent with one or more exemplary embodiments of the present disclosure. In an exemplary embodiment, integrated cam 1300 may include a slit 1304 to engage with main shaft 122. In an exemplary embodiment, integrated cam 1300 may also include an annular cylinder 1306 to be engaged with protrusion 1211 of cam holder plate 1210. In an exemplary embodiment, protrusion 1211 of cam holder plate 1210 may be inserted into annular cylinder 1306 of integrated cam 1300. In an exemplary embodiment, a protrusion 1308 may be used to engage a locking tab of a door.

Figure 13B:
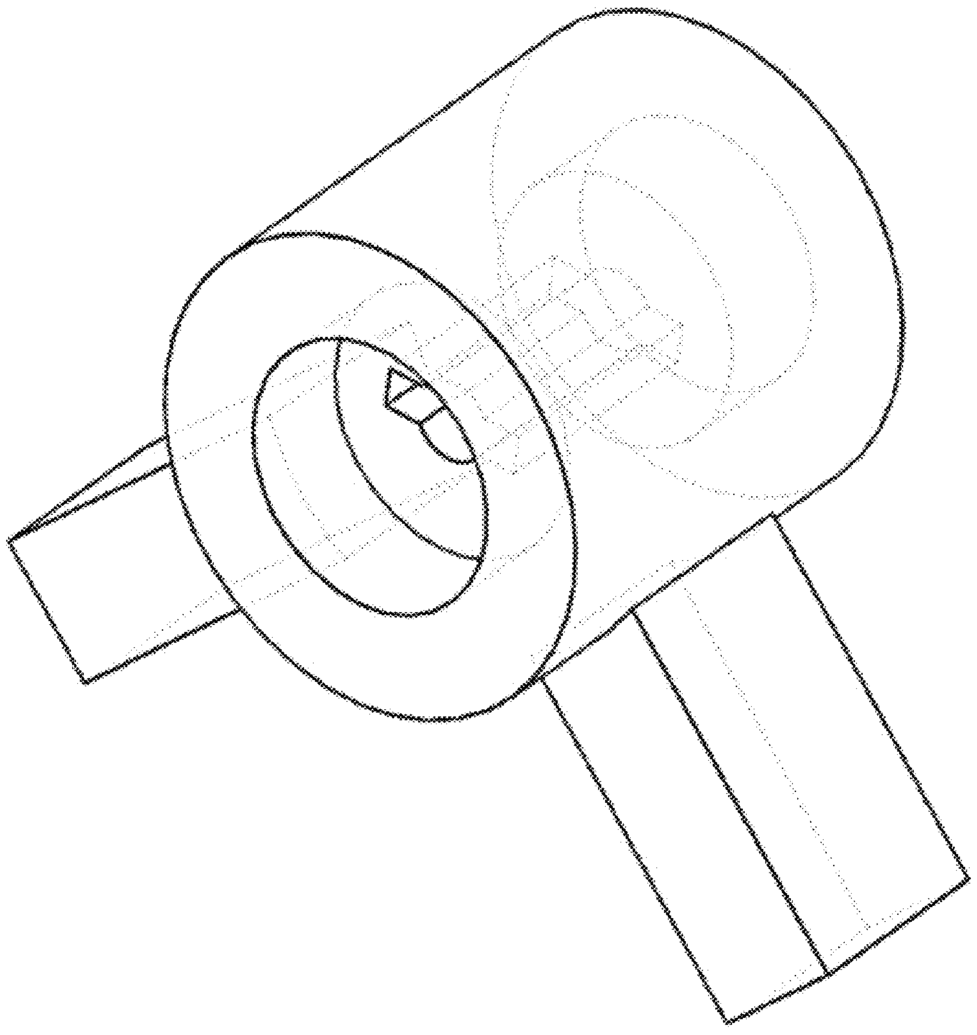
FIG. 13B illustrates a schematic view of an integrated cam, consistent with one or more exemplary embodiments of the present disclosure.

FIG. 13B illustrates a schematic view of an integrated cam 1310, consistent with one or more exemplary embodiments of the present disclosure. In an exemplary embodiment, integrated cam 1310 may be similar to integrated cam 1300. In an exemplary embodiment, two exemplary protrusions of integrated cam 1310 with 90-degree angle to each other may be applicable for two movements of an exemplary locking tab. In an exemplary embodiment, an exemplary locking system with integrated cam 1310 may be more firm than an exemplary locking system with integrated cam 1300. In an exemplary embodiment, due to having two protrusions, integrated cam 1310 may not require a slit 2226 of cover 2220 to move.

Figure 13C:
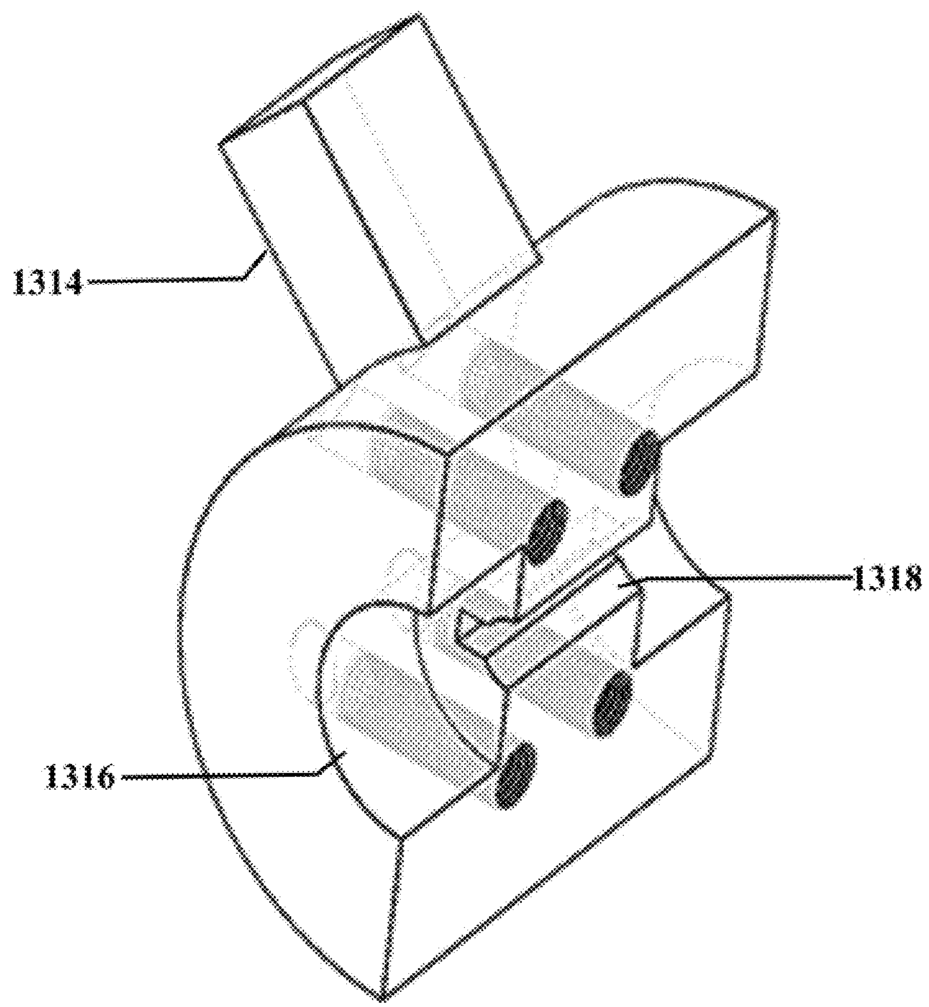
FIG. 13C illustrates a schematic view of a two-piece cam, consistent with one or more exemplary embodiments of the present disclosure.

FIG. 13C illustrates a schematic view of a two-piece cam 1312, consistent with one or more exemplary embodiments of the present disclosure. In an exemplary embodiment, a protrusion 1314 on a two-piece cam 1312 may transfer a rotational energy to a locking tab. In an exemplary embodiment, a free part 1316 of two-piece cam 1312 may be a place for cam clamps 1400 and an exemplary cam holder plate. In an exemplary embodiment, two-piece cam 1312 may be tightened utilizing at least a screw 1500. In an exemplary embodiment, screw 1500 may be fastened utilizing a wrench 2112 which may be embedded in an exemplary key.

Figure 13D:
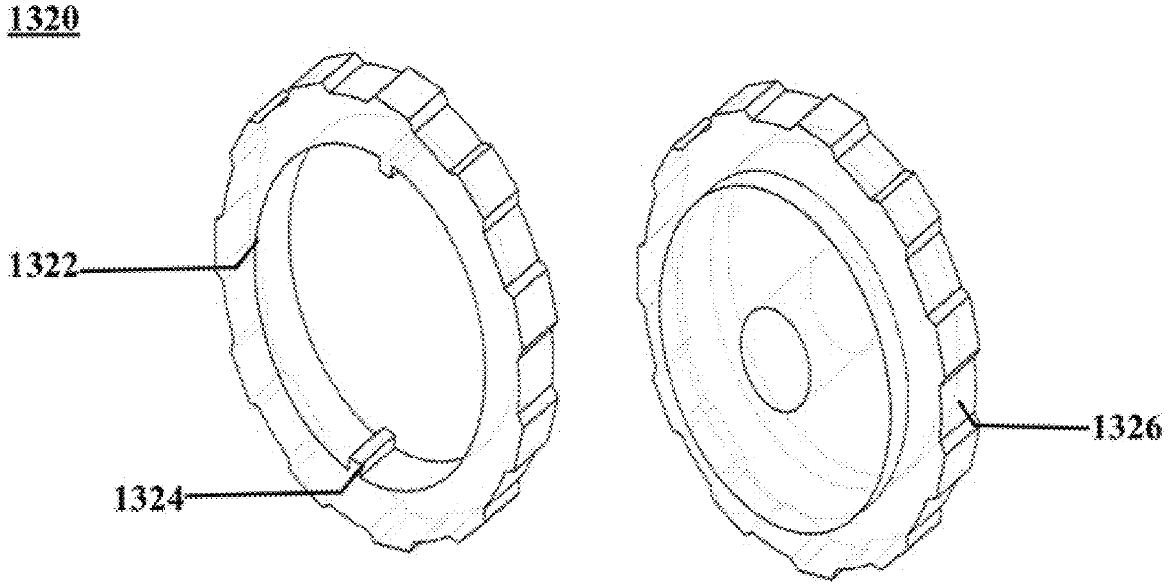
FIG. 13D illustrates a schematic view of a gear cam, consistent with one or more exemplary embodiments of the present disclosure.

FIG. 13D illustrates a schematic view of a gear cam 1320, consistent with one or more exemplary embodiments of the present disclosure. In an exemplary embodiment, to transfer rotational movement of main shaft 122, gear cam 1320 may be used. In an exemplary embodiment, external-toothed ring 1322 may be engaged with first cylinder portion 209 and second cylinder portion 917. In an exemplary embodiment, first cylinder portion 209 and second cylinder portion 917 may include slits which may be an engagement part for protrusion 1324 of external-toothed ring 1322. In an exemplary embodiment, an exemplary design of gear cam 1320 may cost less and may be easier to make in comparison to other exemplary cams. In an exemplary embodiment, an external-toothed plate 1326 may be mounted on external-toothed ring 1322 to transfer rotational movement of main shaft 122 to an exemplary locking tab.

Figure 14:
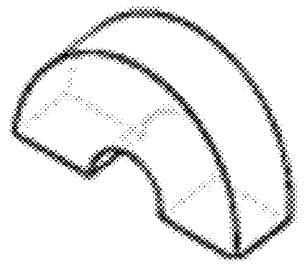
FIG. 14 illustrates a schematic view of cam clamps, consistent with one or more exemplary embodiments of the present disclosure.
Figure 15:
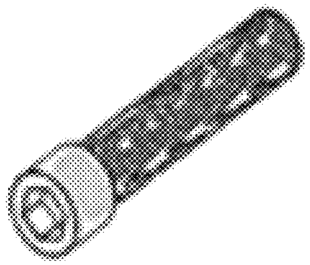
FIG. 15 illustrates a schematic view of a screw, consistent with one or more exemplary embodiments of the present disclosure.

FIG. 14 illustrates a schematic view of a cam clamps 1400, consistent with one or more exemplary embodiments of the present disclosure. In an exemplary embodiment, cam clamps 1400 may be placed in free part 1316 of two-piece cam 1312. In an exemplary embodiment, cam clamps 1400 may be used to limit movement of main shaft 122 by pushing main shaft 122 from outside. FIG. 15 illustrates a schematic view of a screw 1500, consistent with one or more exemplary embodiments of the present disclosure. In an exemplary embodiment, screw 1500 may be used to fasten two-piece cam 1312.

Figure 16:
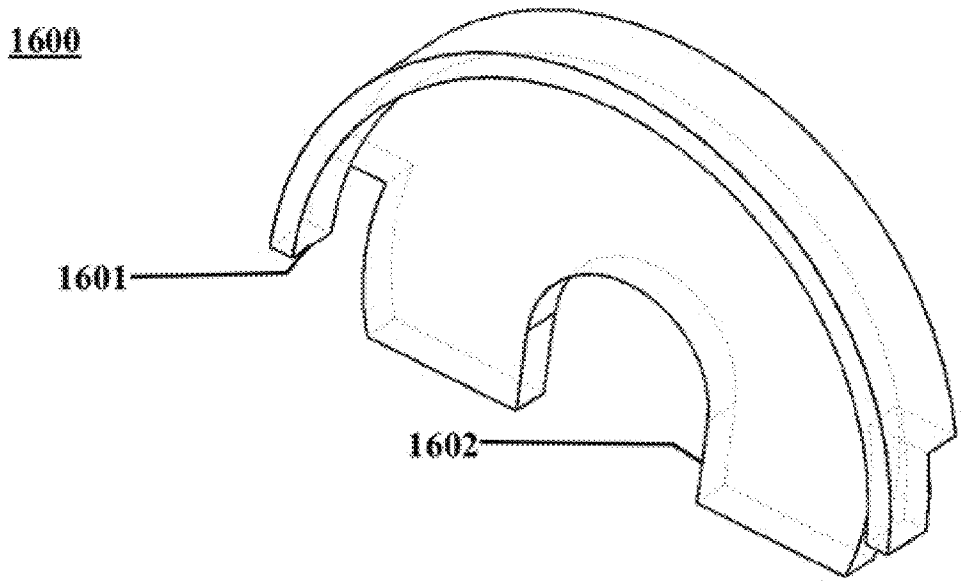
FIG. 16 illustrates a schematic view of a cam movement limiter, consistent with one or more exemplary embodiments of the present disclosure.

FIG. 16 illustrates a schematic view of a cam movement limiter 1600, consistent with one or more exemplary embodiments of the present disclosure. In an exemplary embodiment, cam movement limiter 1600 may include a half plate mounted on main shaft 122. In an exemplary embodiment, cam movement limiter 1600 may be coupled with second opposing end 103 of second cylinder portion 117 and two-piece cam 1312 to fill a free space between second cylinder portion 117 and two-piece cam 1312. In an exemplary embodiment, cam movement limiter 1600 may be used to fix an exemplary cam on main shaft 122. In an exemplary embodiment, part 1601 of cam movement limiter 1600 may be placed on an edge 2220 of cover 2218. In an exemplary embodiment, an edge 1602 may be next to cylindrical protrusion 1211 of cam holder plate 1210. In an exemplary embodiment, cam movement limiter 1600 may be placed on both sides of cam 1300.

In an exemplary embodiment, locking system 100 may also include a cam holder plate 1200 and a cap. In an exemplary embodiment, an exemplary cap may include cap 1100 and cap 1104. In an exemplary embodiment, to prevent spring-loaded driver pins 116 from coming out of second plurality of pin bores 124, one of exemplary caps and cam holder plate 1200 may be used. In an exemplary embodiment, one of exemplary caps and cam holder plate 1200 may be used when second cylinder portion 117 may be rotated to protect shaft spring 800 from damage. In an exemplary embodiment, to trap spring-loaded driver pins 116 inside second plurality of pin bores 124, an exemplary cap may be mounted on second end 103 of second pin bore 124.

In an exemplary embodiment, cam holder plate 1200 may be used to prevent plurality of spring-loaded driver pins 116 from coming out of second plurality of pin bores 124 by placing cam holder plate 1200 in contact to second end 103 of second cylinder portion 117. In an exemplary embodiment, cam holder plate 1200 may include a plate 1205. In an exemplary embodiment, an exemplary cam holder plate may include a first end 1201 and a second end 1203 perpendicular to main axis 105. In an exemplary embodiment, an exemplary cam holder plate may include a cylindrical protrusion 1204 on first end 1201 of cam holder plate 1200. In an exemplary embodiment, cylindrical protrusion 1204 may be a cylinder with a central hole 1202 for an exemplary main shaft passage, such as main shaft 122. In an exemplary embodiment, second end 1203 of cam holder plate 1200 may be connected to second cylinder portion 117. In an exemplary embodiment, an exemplary cam holder plate 1200 may comprise of a plurality of holes aligned with second plurality of pin bores 124 of second cylinder portion 117. In an exemplary embodiment, each hole of an exemplary plurality of holes may include a smaller diameter than a diameter of an exemplary spring-loaded driver pin of plurality of spring-loaded driver pins 116.

Figure 17A:
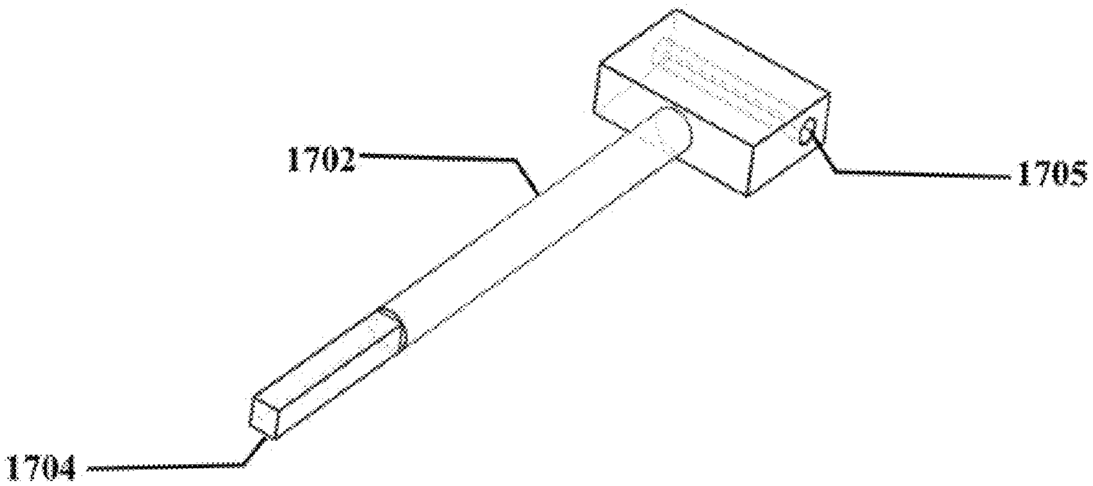
FIG. 17A illustrates a schematic view of a key shaft, consistent with one or more exemplary embodiments of the present disclosure.

FIG. 17A illustrates a schematic view of a key shaft 1700, consistent with one or more exemplary embodiments of the present disclosure. In an exemplary embodiment, key shaft 1700 may include a multi-faceted part 1704 on an exemplary end of key shaft 1700 which may engage second cylinder portion 917 and a slit 918. In an exemplary embodiment, front plate 415 and first cylinder portion 215 may be implemented when key shaft 1700 may be used. In an exemplary embodiment, first cylinder portion 215 may not be engaged when key shaft 1700 may be moved rotationally due to an annular part 1702 of key shaft 1700 in an exemplary beginning part of key shaft 1700. In an exemplary embodiment, a hole 1705 may be used to place a tail 2116 of wrench 2112. In an exemplary embodiment, a central hole 416 of front plate 415 may be used to insert key shaft 1700. In an exemplary embodiment, to prevent engagement of key shaft 1700, central hole 416 may be annular. In an exemplary embodiment, a slit 919 may be a place to fit protrusion 1324. In an exemplary embodiment, a slit 918 may a place to engage with multi-faceted part 1704 of key shaft 1700.

Figure 17B:
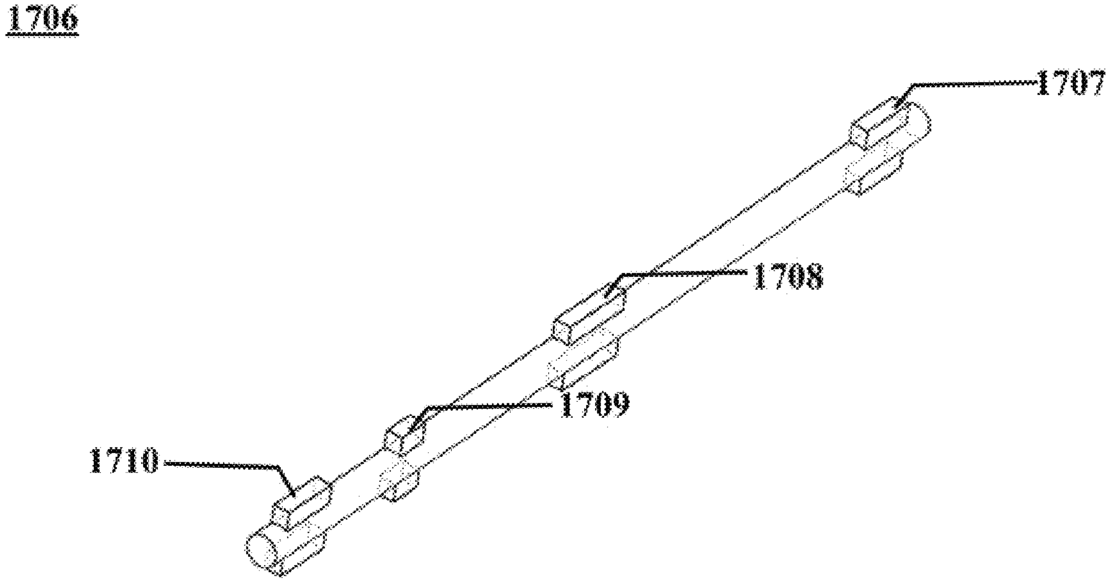
FIG. 17B illustrates a schematic view of a two-way shaft, consistent with one or more exemplary embodiments of the present disclosure.

FIG. 17B illustrates a schematic view of a two-way shaft 1706, consistent with one or more exemplary embodiments of the present disclosure. In an exemplary embodiment, two-way shaft 1706 may be used for an exemplary two-way lockset. In an exemplary embodiment, two-way shaft 1706 may include at least three protrusions extended along an exemplary two-way shaft 1706. In an exemplary embodiment, a protrusion 1707 may be used to engage an exemplary first cylinder portion in an opposite side of an exemplary lockset, a protrusion 1708 may be used to engage an exemplary cam, and a protrusion 1710 may be used to engage an exemplary first cylinder portion. In an exemplary embodiment, a protrusion 1709 may be used to guide two-way shaft 1706 through an exemplary lockset for easier installation. In an exemplary embodiment, when main shaft 122 may be pushed from outside, protrusion 1709 may engage with second cylinder portion 117. In an exemplary embodiment, exemplary protrusions may engage an exemplary cam and one of an exemplary first cylinder portion and an exemplary second cylinder portion. In an exemplary embodiment, front plate 409 may include a circular end cylinder 410 to block access to shaft entrance 412 and protrusion 1707.

Figure 17C:
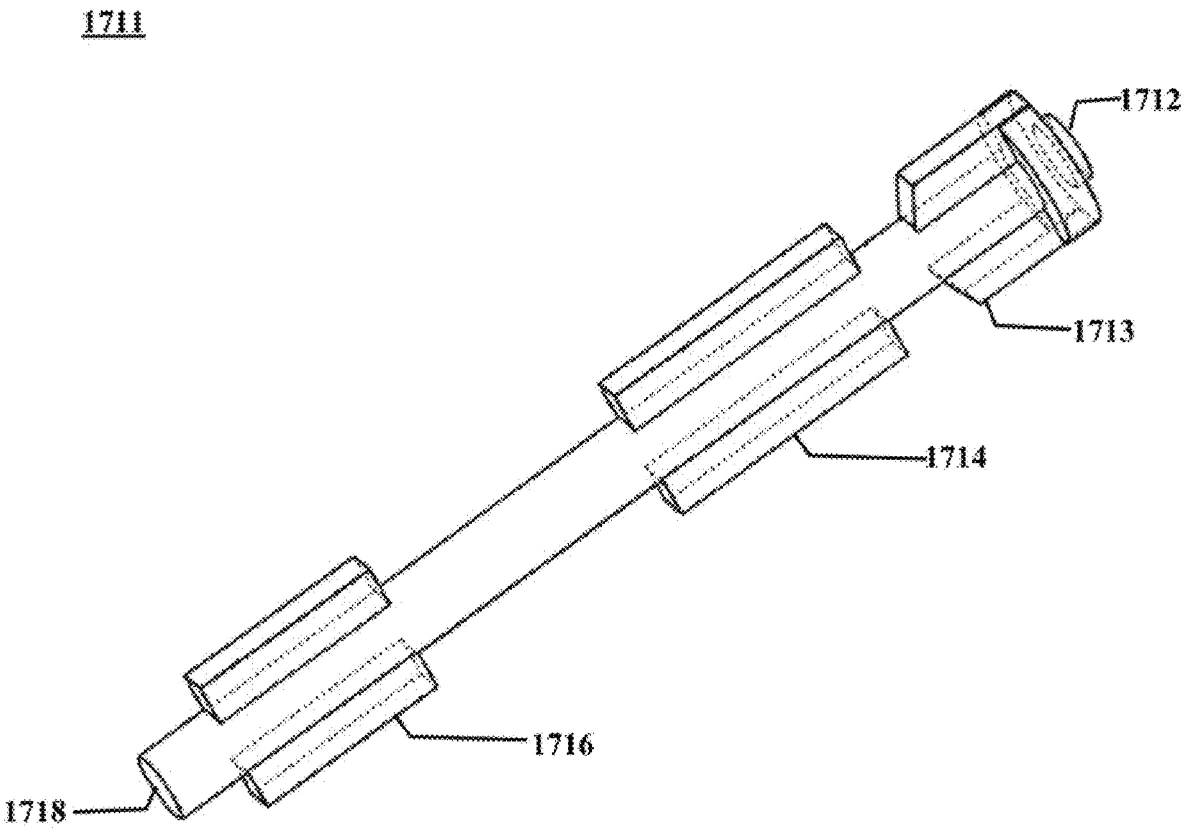
FIG. 17C illustrates a schematic view of a two-piece shaft, consistent with one or more exemplary embodiments of the present disclosure.

FIG. 17C illustrates a schematic view of a two-piece shaft 1711, consistent with one or more exemplary embodiments of the present disclosure. In an exemplary embodiment, two-piece shaft 1706 may include a plate 1712 to protect two-piece shaft 1711 against damage and also to protect shaft spring 800. In an exemplary embodiment, two-piece shaft 1711 may include a protrusion 1713 to engage an exemplary first cylinder portion. In an exemplary embodiment, two-piece shaft 1711 may also include a protrusion 1714 to engage two-piece shaft 1711 with second cylinder portion 117. In an exemplary embodiment, when using two-piece shaft 1711, an exemplary key shaft may apply pressure on one half of two-piece shaft 1711 and therefore, an exemplary other half may be pushed back. In an exemplary embodiment, rotational movement may be transferred to an exemplary cam when an exemplary key may rotate. In an exemplary embodiment, a protrusion 1716 may be engaged in a protrusion 1318 of cam 1312. In an exemplary embodiment, after entering an exemplary key, two-piece shaft 1711 may be moved, utilizing key shaft 2100. In an exemplary embodiment, when two-piece shaft 1711 may be used, a protrusion 1718 of first two-piece shaft 1711 may squeeze a protrusion 1718 of second two-piece shaft 1711. In an exemplary embodiment, second two-piece shaft 1711 may be free of engagement with an exemplary cam and first two-piece shaft 1711 may be engaged with an exemplary cam. In an exemplary embodiment, an exemplary two-piece shaft 1711 may return to an exemplary first position after removing an exemplary key.

Figure 18A:
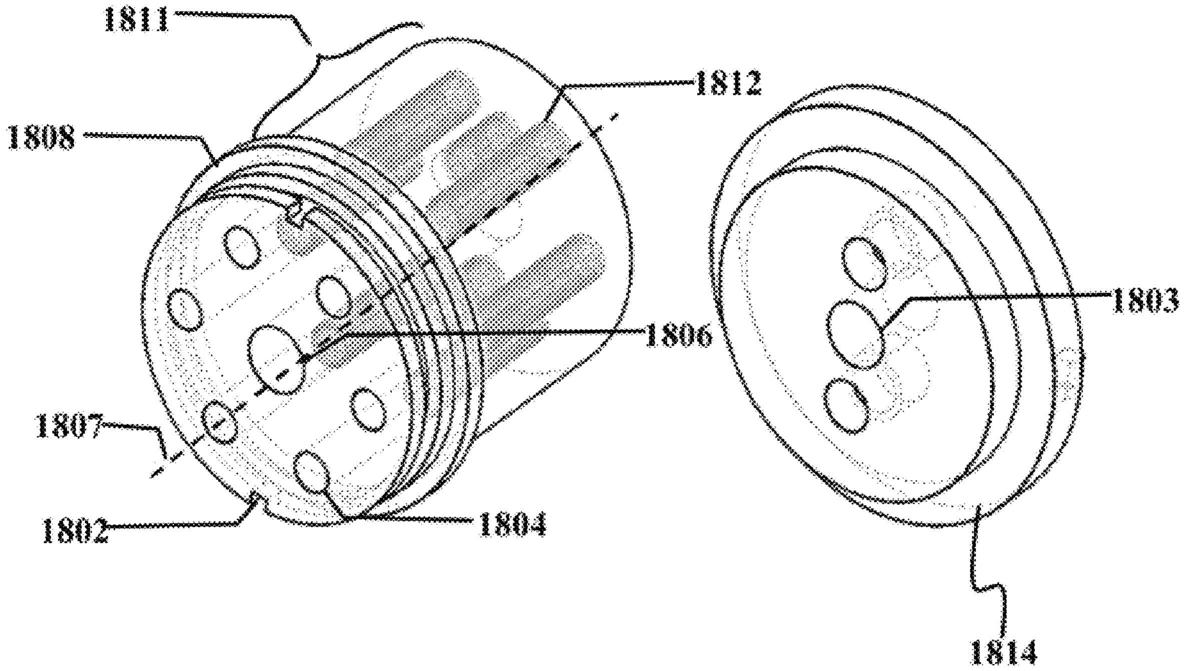
FIG. 18A illustrates a schematic view of a key cylinder, consistent with one or more exemplary embodiments of the present disclosure.

FIG. 18A illustrates a schematic view of a key cylinder 1800, consistent with one or more exemplary embodiments of the present disclosure. In an exemplary embodiment, key cylinder 1800 may include a plurality of holes 1804 to receive a plurality of key needles. In an exemplary embodiment, key cylinder 1800 may also include a central hole 1806 for key shaft 1700. In an exemplary embodiment, annular design of central hole 1806 may let key shaft 1700 to rotate inside key cylinder 1800. In an exemplary embodiment, a slit 1802 may be a passage for engaging exemplary tenons of a cover for example, a tenon 2219 of cover 2218. In an exemplary embodiment, an edge 1808 may be used to hold a key cover edge 2001 of a key cover 2000. In an exemplary embodiment, a hole 1804 for receiving exemplary key needles may include a threaded end 1812 for a threaded key needle. In an exemplary embodiment, key cylinder 1800 may include a main axis 1807. In an exemplary embodiment, key cylinder 1800 may also include a plate 1814 which may be a construction option for preparing key cylinder 1800. In an exemplary embodiment, plate 1814 may be a removable part for being attached to key body 1811. In an exemplary embodiment, preparing key body 1811 and plate 1814 may be cheaper than preparing integrated key cylinder 1800. In an exemplary embodiment, plate 1814 may include a hole 1803 with a magnet.

Figure 18B:
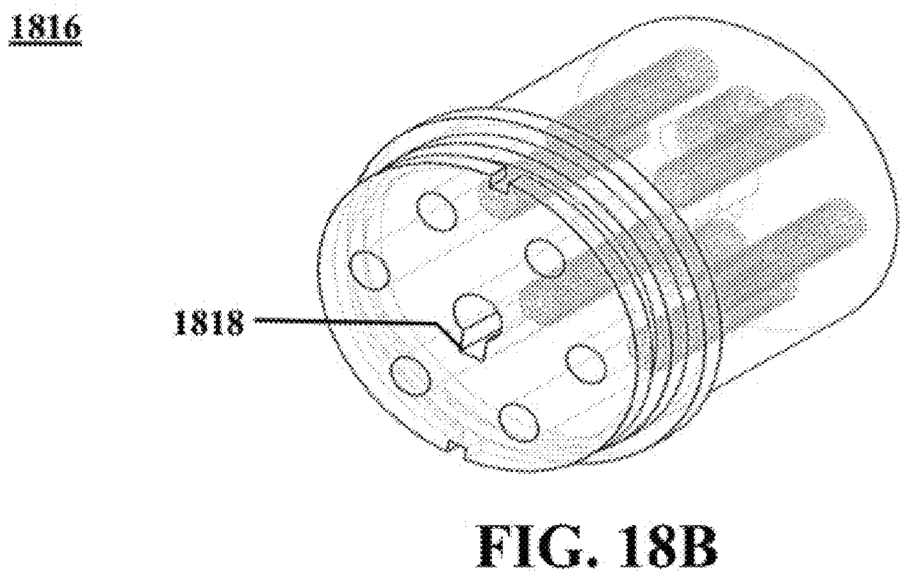
FIG. 18B illustrates a schematic view of a key cylinder, consistent with one or more exemplary embodiments of the present disclosure.

FIG. 18B illustrates a schematic view of a key cylinder 1816, consistent with one or more exemplary embodiments of the present disclosure. In an exemplary embodiment, key cylinder 1816 may be similar to key cylinder 1800. In an exemplary embodiment, hole 1818 may be a hole for key shaft 2100. In an exemplary embodiment, when using key shaft 2100, an exemplary two-piece shaft or an exemplary two-way shaft may be required to engage one of an exemplary first cylinder portion and an exemplary second cylinder portion.

Figure 19A:
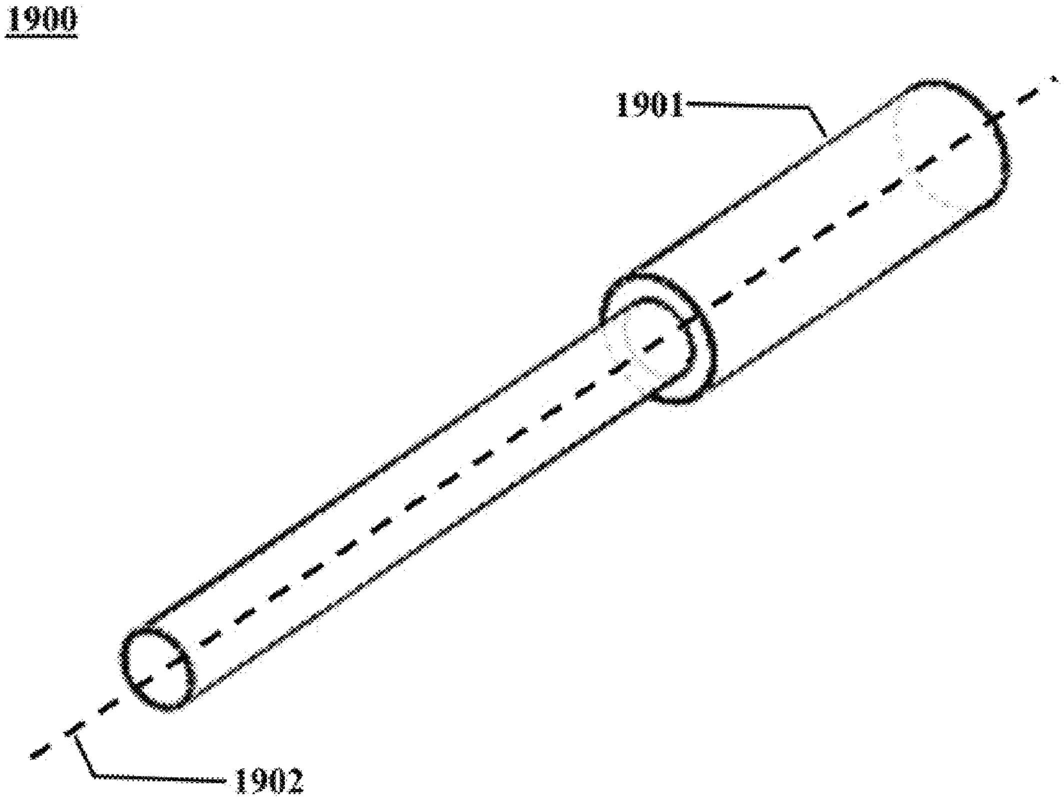
FIG. 19A illustrates a schematic view of a key needle, consistent with one or more exemplary embodiments of the present disclosure.

FIG. 19A illustrates a schematic view of a key needle 1900, consistent with one or more exemplary embodiments of the present disclosure. In an exemplary embodiment, key needle 1900 may be disposed within pinhole 1804 of key cylinder 1800. In an exemplary embodiment, key needle 1900 may include a cap 1901. In an exemplary embodiment, key needle 1900 may be disposed within hole 1804. In an exemplary embodiment, key needle 1900 may protrude from key cylinder 1800. In an exemplary embodiment, key needle 1900 may include a first length which an exemplary first length may determine a code. In an exemplary embodiment, after inserting an exemplary key into an exemplary lock, a main axis 1902 of key needle 1900 may be aligned with main axis 208 of first cylinder portion 200.

Figure 19B:
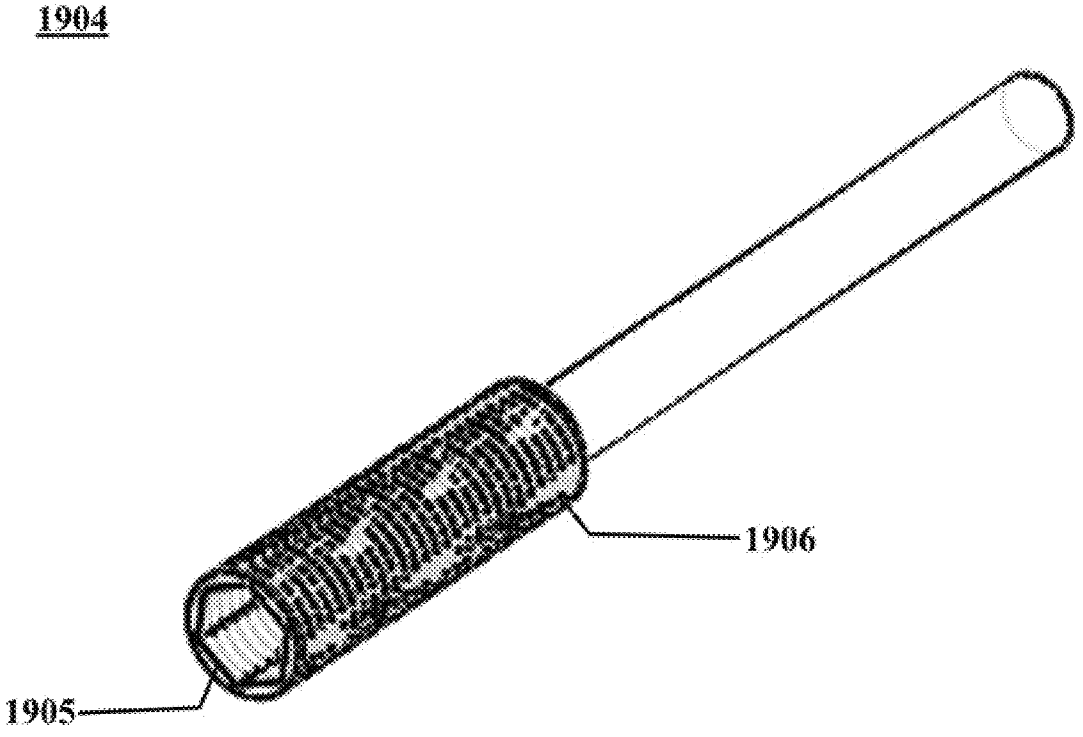
FIG. 19B illustrates a schematic view of a threaded key needle, consistent with one or more exemplary embodiments of the present disclosure.

FIG. 19B illustrates a schematic view of a threaded key needle 1904, consistent with one or more exemplary embodiments of the present disclosure. In an exemplary embodiment, threaded key needle 1904 may be similar to key needle 1900. In an exemplary embodiment, key needle 1904 may include a threaded part 1906 which may fit into hole 1812 of key cylinder 1800. In an exemplary embodiment, threaded part 1906 of threaded key needle 1904 may be used to change an exemplary length of threaded key needle 1904. In an exemplary embodiment, threaded key needle 1904 may also include a head 1905 to be fastened, utilizing wrench 2112.

Figure 20:
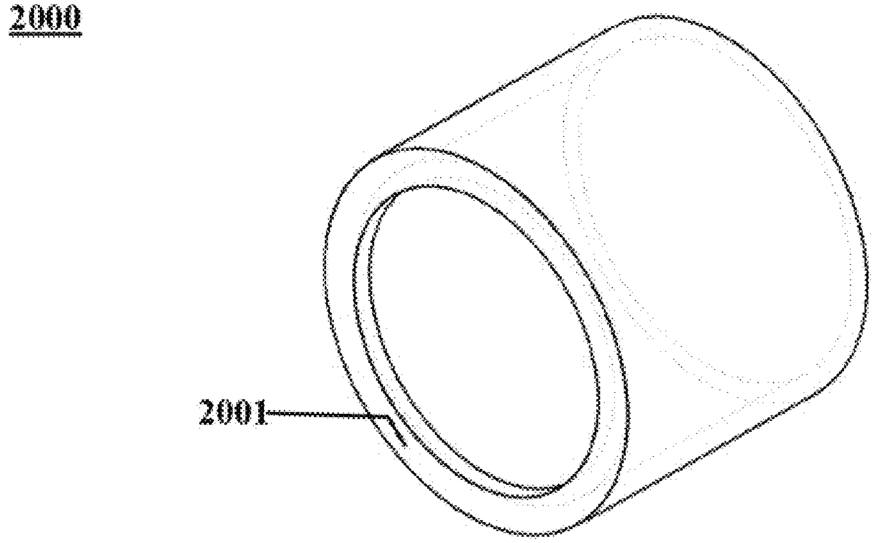
FIG. 20 illustrates a schematic view of a key cover, consistent with one or more exemplary embodiments of the present disclosure.

FIG. 20 illustrates a schematic view of a key cover 2000, consistent with one or more exemplary embodiments of the present disclosure. In an exemplary embodiment, key cover 2000 may be used as a protector to enhance safety by keeping exemplary key needles hidden. In an exemplary embodiment, key cover 2000 may include at least a spring in key cover edge 2001. In an exemplary embodiment, an exemplary spring may keep exemplary key needles hidden before inserting an exemplary key into an exemplary first cylinder portion. In an exemplary embodiment, key cover 2000 may be pushed back after inserting an exemplary key into an exemplary first cylinder portion.

Figure 21A:
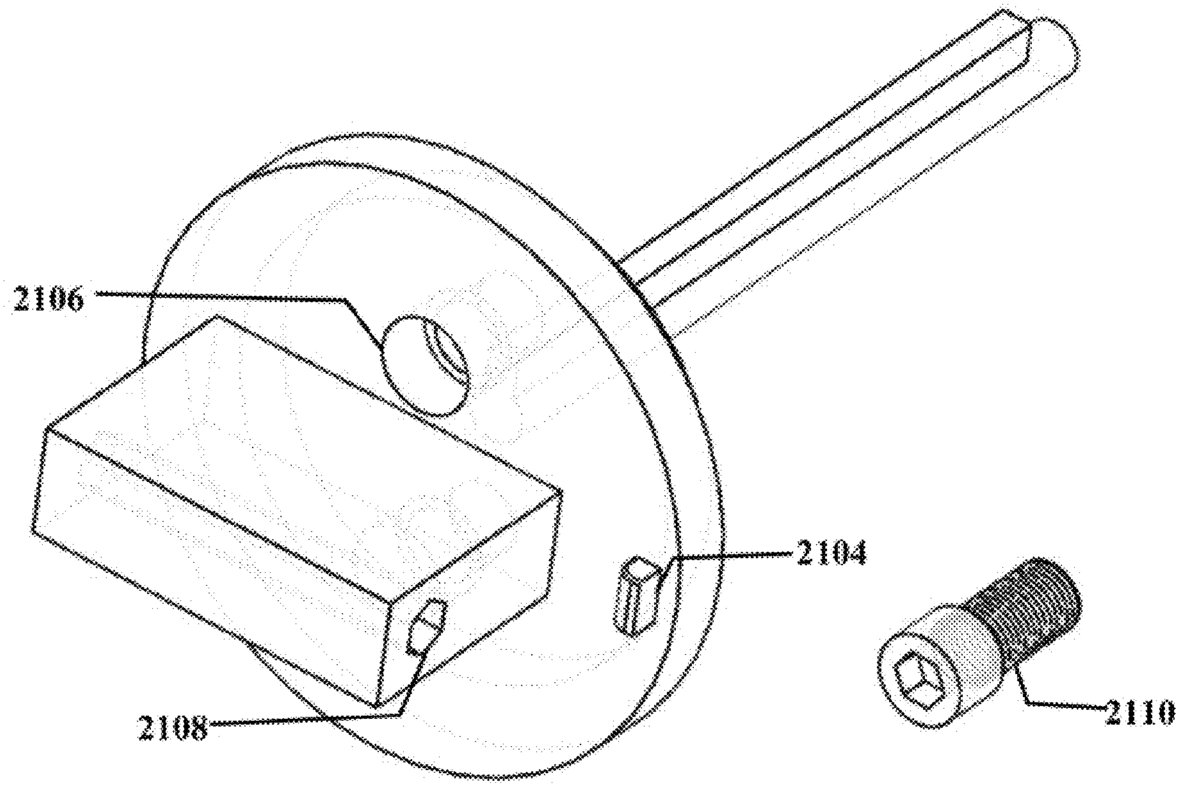
FIG. 21A illustrates a schematic view of a key shaft, consistent with one or more exemplary embodiments of the present disclosure.

FIG. 21A illustrates a schematic view of a key shaft 2100, consistent with one or more exemplary embodiments of the present disclosure. In an exemplary embodiment, hole 2106 may be used to fix key shaft 2100 to key cylinder 1816, utilizing screw 2110. In an exemplary embodiment, a protrusion 2104 and a hole 2108 may be used to fix wrench 2112 inside key shaft 2100.

Figure 21B:
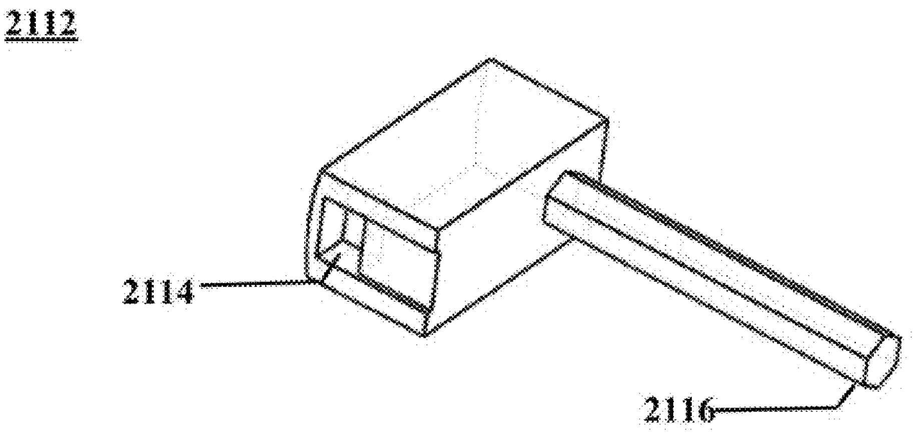
FIG. 21B illustrates a schematic view of a wrench, consistent with one or more exemplary embodiments of the present disclosure.

FIG. 21B illustrates a schematic view of a wrench 2112, consistent with one or more exemplary embodiments of the present disclosure. In an exemplary embodiment, wrench 2112 may be used to fasten screw 2110. In an exemplary embodiment, wrench 2112 may also be used to change an exemplary length of threaded key needle 1904. In an exemplary embodiment, to change an exemplary length of threaded key needle 1904, a tail 2116 of wrench 2112 may be inserted into head 1905 of threaded key needle 1904. In an exemplary embodiment, by turning wrench 2112, threaded key needle 1904 may be moved inside hole 1812 of key cylinder 1800. In an exemplary embodiment, tail 2116 of wrench 2112 may be placed in a hole 2108 of key shaft 2100. In an exemplary embodiment, when wrench 2112 may be inserted into key shaft 2100, a protrusion 2104 may be placed in a hole 2114 to fix wrench 2112 in key shaft 2100. In an exemplary embodiment, screw 2110 may attach key shaft 2100 from hole 2106 to key cylinder 1816.

Figure 22A:
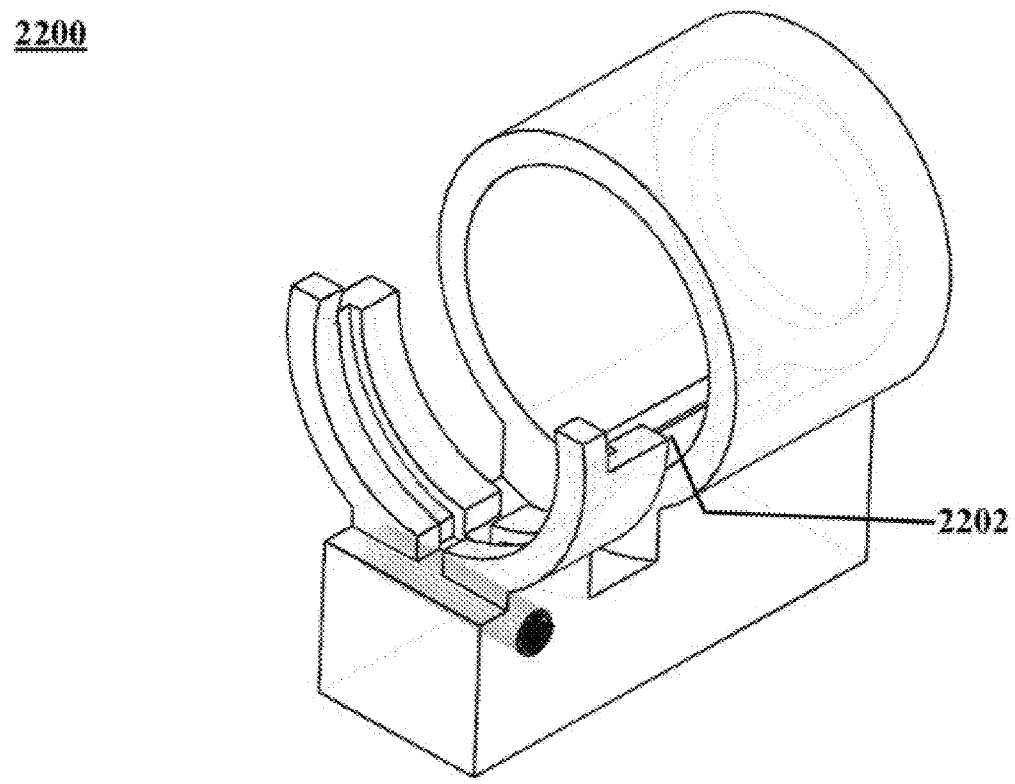
FIGS. 22A-22G illustrate schematic views of a cover, consistent with one or more exemplary embodiments of the present disclosure.

FIG. 22A illustrates a schematic view of a cover 2200, consistent with one or more exemplary embodiments of the present disclosure. In an exemplary embodiment, cover 2200 may be used for an exemplary one-way lockset and implementation of gear cam 1320 and second cylinder portion 920. In an exemplary embodiment, a slit 2202 of cover 2200 may be used for easier installation of exemplary components. In an exemplary embodiment, cover 2200 may be used for exemplary rotatable second cylinder portion models.

Figure 22B:
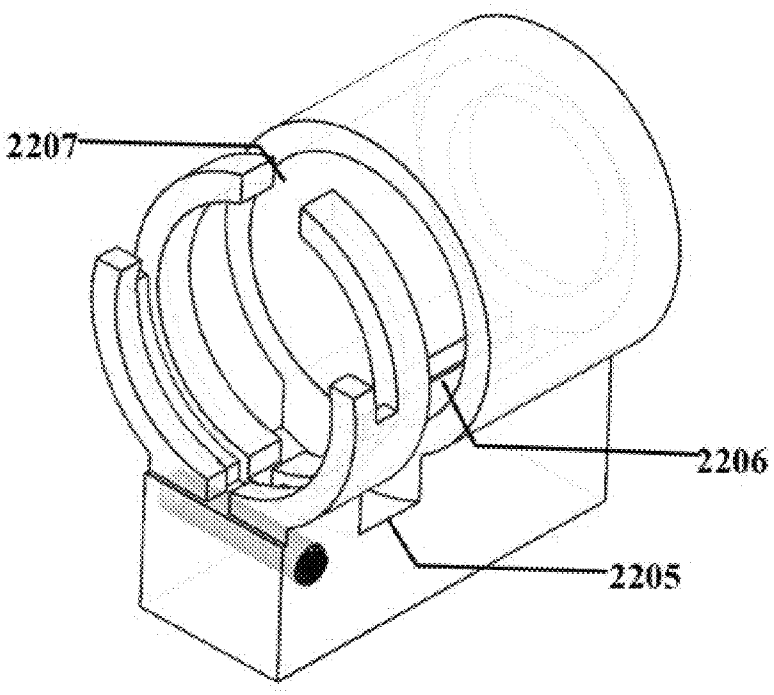

FIG. 22B illustrates a schematic view of a cover 2204, consistent with one or more exemplary embodiments of the present disclosure. In an exemplary embodiment, cover 2204 may be similar to cover 2200. In an exemplary embodiment, cover 2204 may be used for an exemplary one-way lockset. In an exemplary embodiment, cover 2204 may be used for exemplary rotatable second cylinder portion models. In an exemplary embodiment, a slit 2205 may be a passing slit for an exemplary cam. In an exemplary embodiment, a slit 2206 may be a place where protrusion 216 may be located. In an exemplary embodiment, to assemble second cylinder portion 920, protrusion 921 may be placed in a slit 2207 of cover 2204 and a slit 2205 of cover 2204.

Figure 22C:
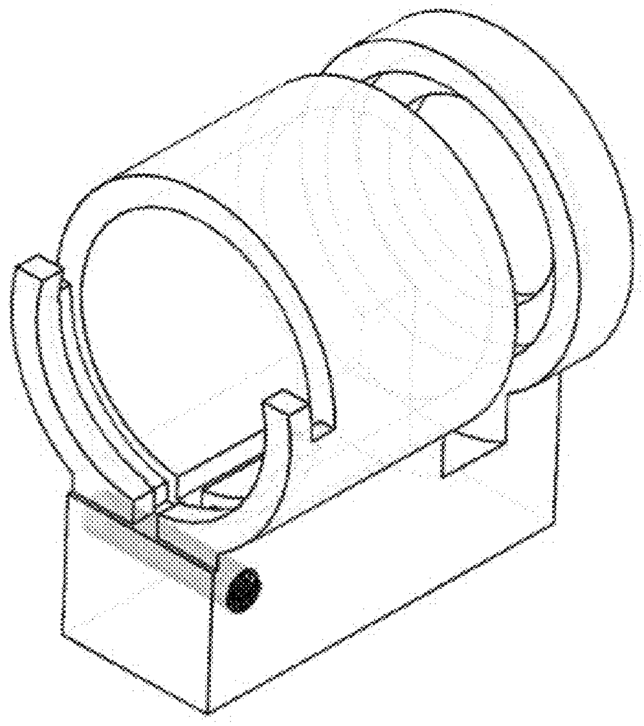

FIG. 22C illustrates a schematic view of a cover 2208, consistent with one or more exemplary embodiments of the present disclosure. In an exemplary embodiment, cover 2208 may be similar to cover 2200. In an exemplary embodiment, cover 2208 may be used for an exemplary one-way lockset. In an exemplary embodiment, cover 2208 may be used when first cylinder portion 209 and gear cam 1320 and first cylinder portion 213 may be implemented.

Figure 22D:
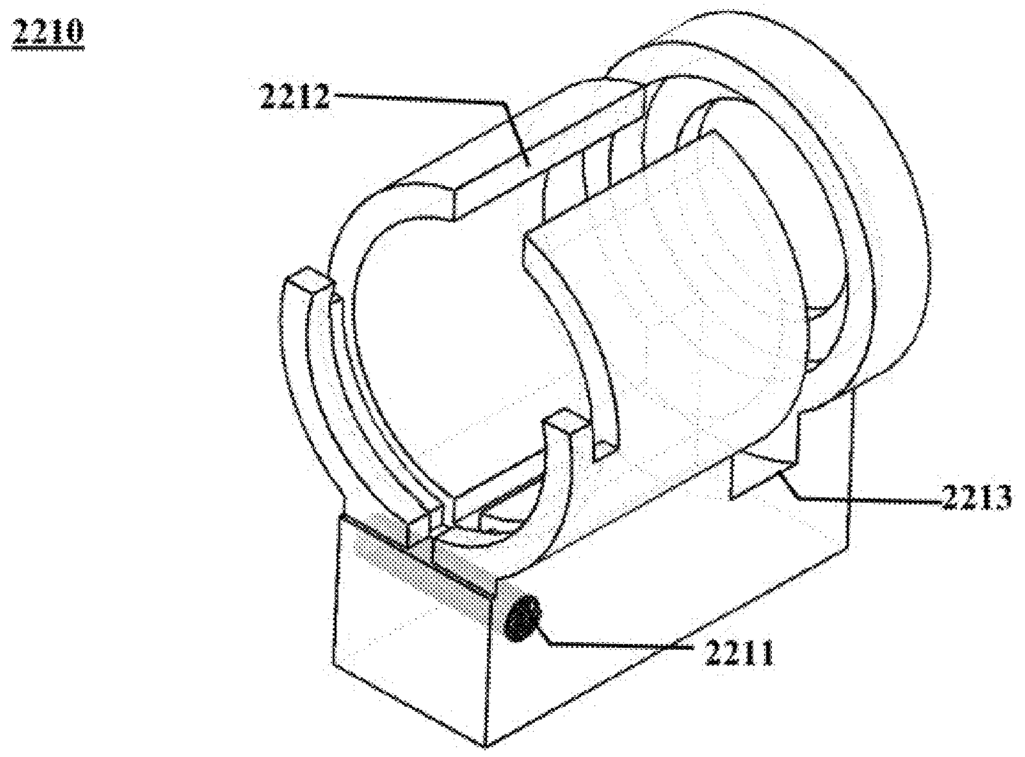

FIG. 22D illustrates a schematic view of a cover 2210, consistent with one or more exemplary embodiments of the present disclosure. In an exemplary embodiment, cover 2210 may be similar to cover 2200. In an exemplary embodiment, cover 2210 may be used for an exemplary one-way lockset. In an exemplary embodiment, cover 2210 may include a threaded hole 2211 to fix cover 2210 to a door. In an exemplary embodiment, cover 2210 may also include a passage slit 2213 for an exemplary cam and a slit 2212 for protrusion 212 and first cylinder portion 209 with gear cam 1320. In an exemplary embodiment, first cylinder portion 211 and first cylinder portion 213 may be placed in a cover 2210. In an exemplary embodiment, protrusion 212 and threaded hole 214 may pass a slit 2212 and may be placed in a slit 2213 of cover 2210. In an exemplary embodiment, placing first cylinder portion 211 and first cylinder portion 213 in cover 2210 may facilitate assembling an exemplary one-way lockset.

Figure 22E:
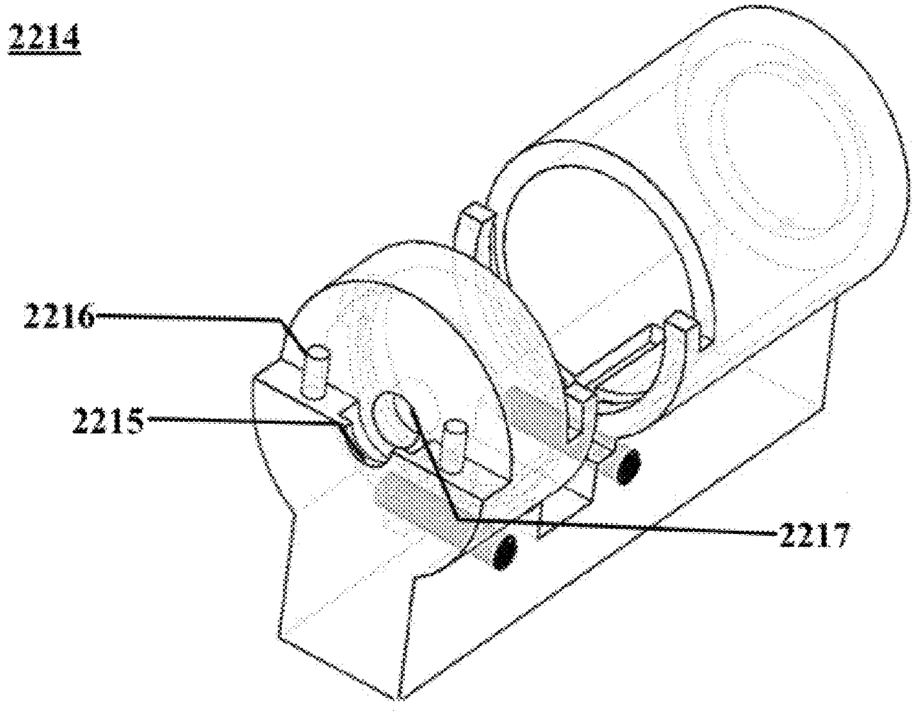

FIG. 22E illustrates a schematic view of a cover 2214, consistent with one or more exemplary embodiments of the present disclosure. In an exemplary embodiment, cover 2214 may be similar to cover 2200. In an exemplary embodiment, cover 2214 may be used for an exemplary two-way handle lockset. In an exemplary embodiment, half ring 2406 may be placed on cover 2214 above a half ring 2404. In an exemplary embodiment, a hole 2217 may be a passage where handle shaft 2300 may be entered. In an exemplary embodiment, to fix half ring 2406, tenons 2216 may fit into a mortise 2407 of half ring 2406. In an exemplary embodiment, a slit 2215 may be a place to fix half ring 2404.

Figure 22F:
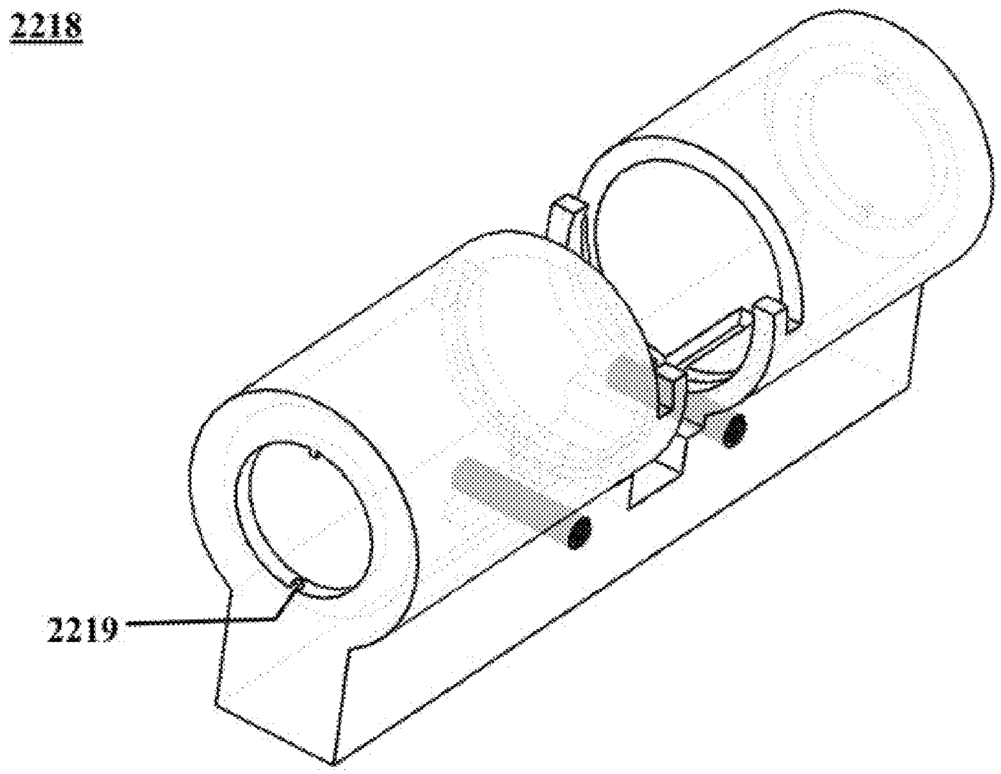

FIG. 22F illustrates a schematic view of a cover 2218, consistent with one or more exemplary embodiments of the present disclosure. In an exemplary embodiment, cover 2218 may be similar to cover 2200. In an exemplary embodiment, cover 2218 may be used for an exemplary two-way super safe locking system. In an exemplary embodiment, due to implementing an exemplary safety-booster cylinder, one side of cover 2218 may be longer than the other side. In an exemplary embodiment, cover 2218 may include protrusion 2219 to fit into an exemplary slit of an exemplary key cylinder.

Figure 22G:
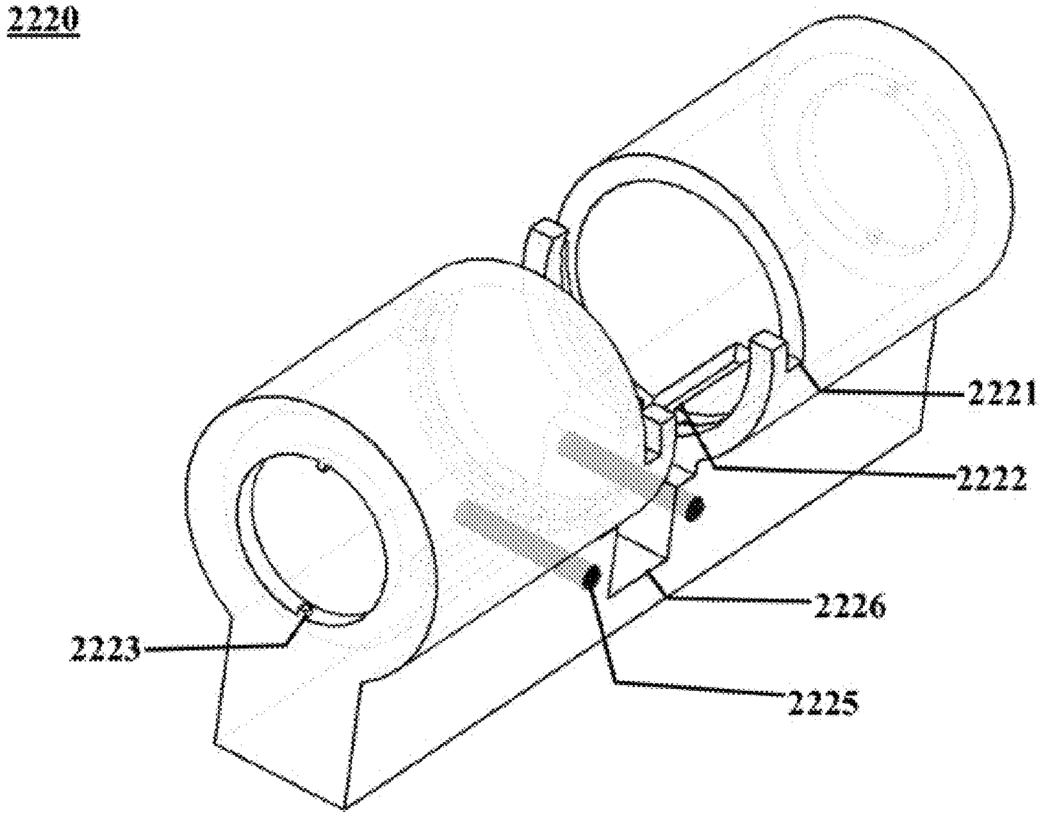

FIG. 22G illustrates a schematic view of a cover 2220, consistent with one or more exemplary embodiments of the present disclosure. In an exemplary embodiment, cover 2220 may be similar to cover 2200. In an exemplary embodiment, cover 2220 may be used for an exemplary two-way lockset with two similar locking systems. In an exemplary embodiment, protrusion 2223 may be inserted into slit 1802 which may cause an exemplary key to enter and exit exemplary locksets in a correct position. In an exemplary embodiment, threaded hole 2225 may attach cover 2220 to a door. In an exemplary embodiment, a slit 2226 may be a passage for an exemplary two-piece cam. In an exemplary embodiment, a slit 2222 may be a place to fix protrusion 910 of second cylinder portion 900. In an exemplary embodiment, a slit 2221 may hold cam holder plate 1200 and cam movement limiter 1600. In an exemplary embodiment, to fix second cylinder portion 900 inside a cover, at least one of cover 2218, cover 2208, cover 2210, cover 2214, and cover 2220, a protrusion 910 may fit into for example a slit 2222.

Figure 23:
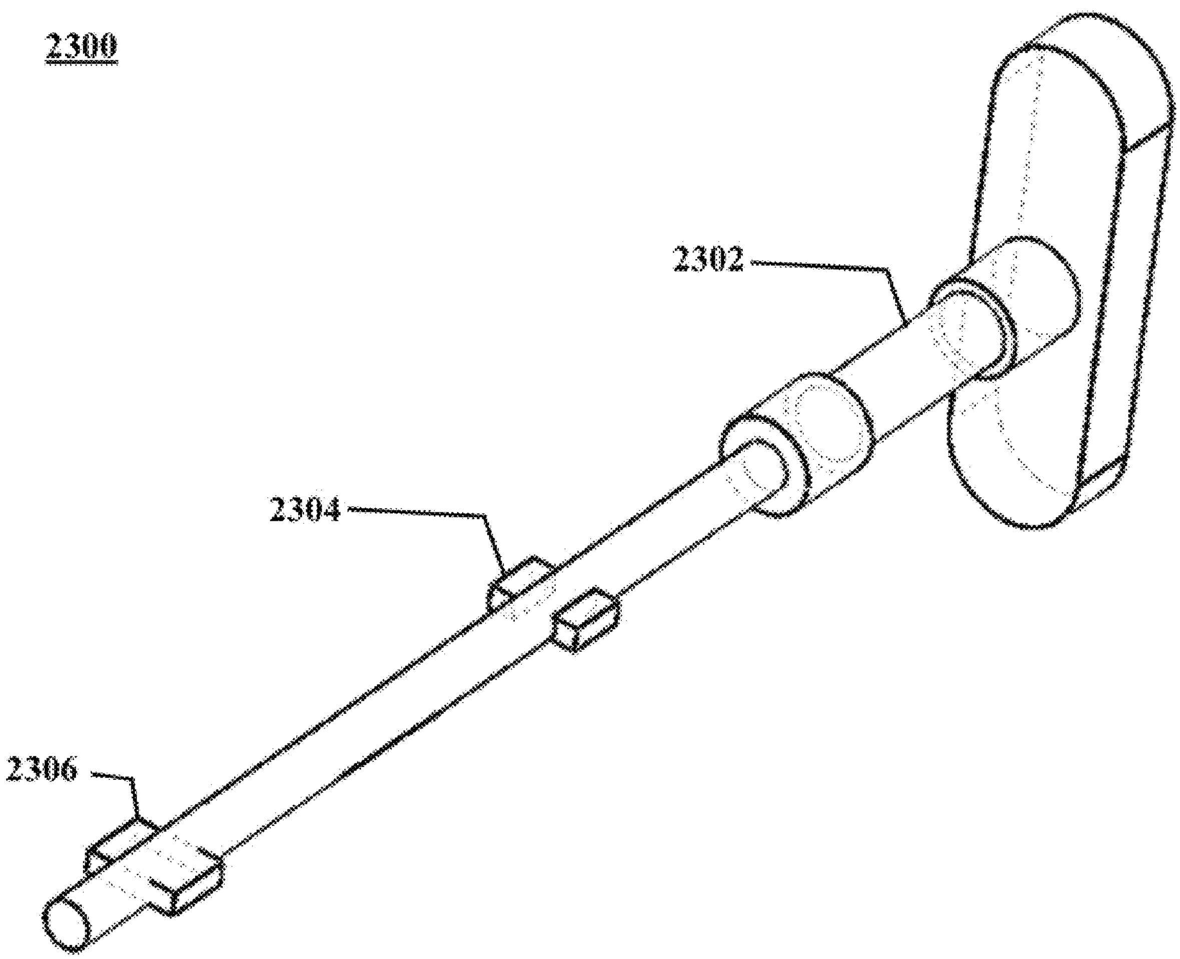
FIG. 23 illustrates a schematic view of a handle shaft, consistent with one or more exemplary embodiments of the present disclosure.
Figure 24:
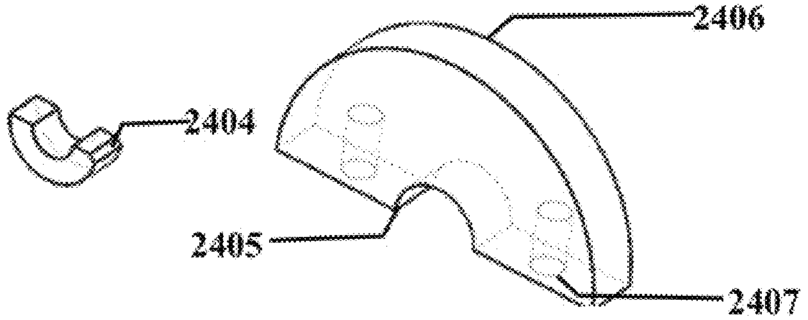
FIG. 24 illustrates a schematic view of a handle shaft holder, consistent with one or more exemplary embodiments of the present disclosure.

FIG. 23 illustrates a schematic view of a handle shaft 2300, consistent with one or more exemplary embodiments of the present disclosure. In an exemplary embodiment, handle shaft 2300 may be used in an exemplary two-way handle lockset. FIG. 24 illustrates a schematic view of a handle shaft holder 2400, consistent with one or more exemplary embodiments of the present disclosure. In an exemplary embodiment, half ring 2406 may be placed in a slit 2215 of cover 2214. In an exemplary embodiment, an edge 2405 of a half ring 2406 may prevent exiting of handle shaft 2300. In an exemplary embodiment, half ring 2404 may be placed on slit 2215 of cover 2214. In an exemplary embodiment, a protrusion 2304 and protrusion 3606 may be engaged with first cylinder portion 115 and an exemplary cam. In an exemplary embodiment, part 2302 of handle shaft 2300 may limit handle shaft 2300 movement. In an exemplary embodiment, a keyhole 408 may be used for a key needle 1900 and a key needle 1904. In an exemplary embodiment, a central hole 406 may be used for a key shaft 1700, key shaft 2100, two-way shaft 1706, and a handle shaft 2300.

Figure 25:
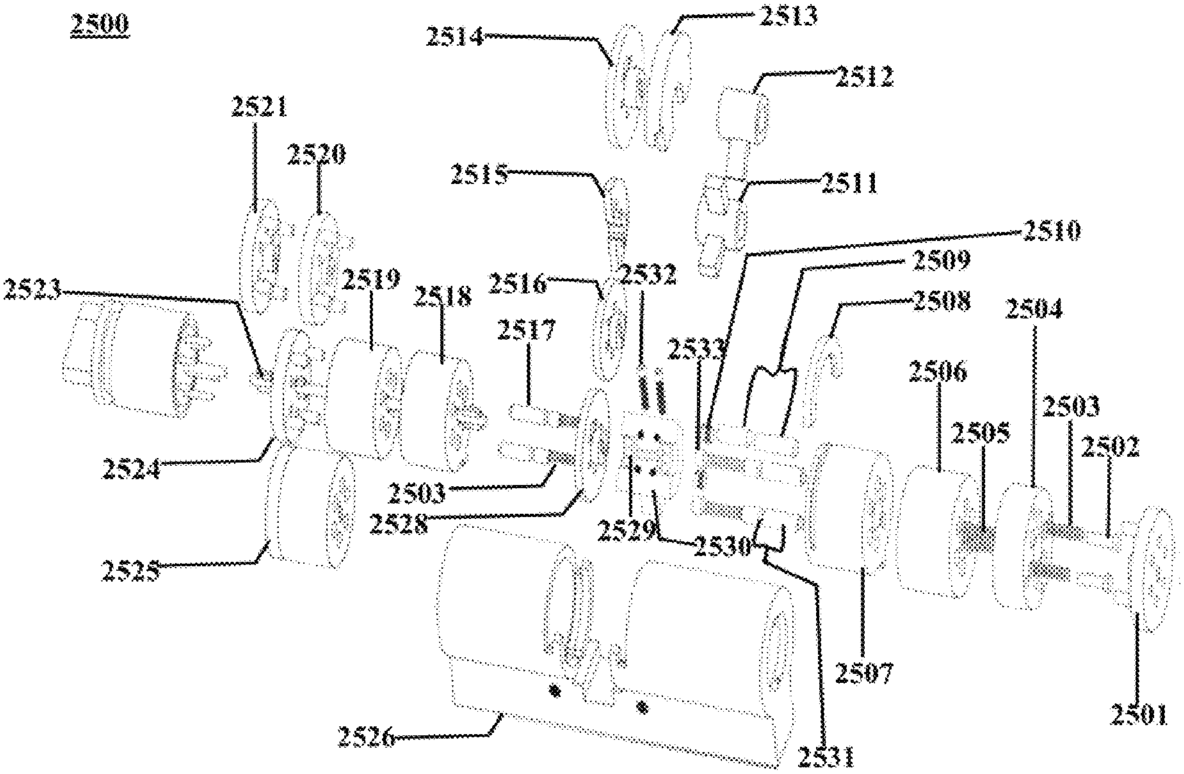
FIG. 25 illustrates a schematic view of components of a two-way super safe locking system, consistent with one or more exemplary embodiments of the present disclosure.

FIG. 25 illustrates a schematic view of components of a two-way super safe locking system 2500, consistent with one or more exemplary embodiments of the present disclosure. In an exemplary embodiment, to implement exemplary components of two-way super safe locking system 2500, a two-way super safe cover 2526 may be used. In an exemplary embodiment, to prepare two-way super safe locking system 2500, a front plate 2501, a plurality of pin springs 2503, a plurality of safety pin 2502, a safety-booster cylinder 2504, a shaft spring 2505, a first cylinder portion 2506, and a second cylinder portion 2507 may be used. In an exemplary embodiment, code pins may include a code pin 2509 and a code pin 2531. In an exemplary embodiment, code pin 2509 and code pin 2531 may make an exemplary code of two-way super safe locking system 2500. In an exemplary embodiment, after inserting code pin 2509 or code pin 2531, a cap 2533 or a cap 2510 may block exemplary second plurality of pin bores of second cylinder portion 2517. In an exemplary embodiment, half ring 2508 may be placed on a cover 2526 in a slit above second cylinder portion 2507.

In an exemplary embodiment, for an exemplary second locking system of two-way super safe locking system 2500, a front plate, first cylinder portion 2519, and second cylinder portion 2518 may be placed inside cover 2526. In an exemplary embodiment, an exemplary front plate may include a front plate 2524, a front plate 2521, and a front plate 2520. A cam holder plate 2528, a cam holder plate 2516, or a cam holder plate 2515 may be mounted on a main shaft 2523 to fix a cam 2530. A cam holder plate 2514 may be used for an integrated cam 2512 or an integrated cam 2511. A cam movement limiter 2513 may be implemented on cover 2526. However, first cylinder portion 2525 may be used instead of front plate 2524 and first cylinder portion 2519. In an exemplary embodiment, two-way shaft 2523 may pass through front plate 2524, first cylinder portion 2519, and second cylinder portion 2518, respectively. In an exemplary embodiment, after passing two-way shaft 2523 through cam holder plate 2528, two-way shaft 2523 may enter second cylinder portion 2507 and first cylinder portion 2506 on an exemplary opposite side. In an exemplary embodiment, after inserting two-way shaft 2523, cam 2530 may be implemented on two-way shaft 2523. In an exemplary embodiment, to fix cam 2530 on two-way shaft 2523, cam clamps 2529 may be placed inside cam 2530. In an exemplary embodiment, two pieces of cam 2530 may be tightened on each other, utilizing at least a screw 2532.

In an exemplary embodiment, according to FIG. 25, front plate 2501 may be similar to front plate 413. In an exemplary embodiment, pin spring 2503 may be similar to pin spring 700. In an exemplary embodiment, safety pin 2502 may be similar to safety pin 600. In an exemplary embodiment, safety-booster cylinder 2504 may be similar to safety-booster cylinder 500. In an exemplary embodiment, shaft spring 2505 may be similar to shaft spring 800. In an exemplary embodiment, first cylinder portion 2506 may be similar to first cylinder portion 219. In an exemplary embodiment, second cylinder portion 2507 may be similar to second cylinder portion 911. In an exemplary embodiment, code pin 2509 and code pin 2517 may be similar to code pin 300 and code pin 303, respectively. In an exemplary embodiment, cap 2533 and cap 2510 may be similar to cap 1100 and cap 1104, respectively. In an exemplary embodiment, cover 2526 may be similar to cover 2000. In an exemplary embodiment, first cylinder portion 2519 may be similar to first cylinder portion 200. In an exemplary embodiment, second cylinder portion 2518 may be similar to second cylinder portion 900. In an exemplary embodiment, front plate 2524, 2521, and 2520 may be similar to front plate 400, 409, and 413, respectively. In an exemplary embodiment, cam holder plate 2530 may be similar to cam holder plate 1312. In an exemplary embodiment, first cylinder portion 2525 may be similar to first cylinder portion 217. In an exemplary embodiment, cam holder plate 2528, cam holder plate 2516, and cam holder plate 2515 may be similar to cam holder plate 1207, cam holder plate 1200, and cam holder plate 1209, respectively. In an exemplary embodiment, cam holder plate 2514 may be similar to cam holder plate 1210. In an exemplary embodiment, two-way shaft 2523 may be similar to two-way shaft 1706. In an exemplary embodiment, cam clamps 2529 may be similar to cam clamps 1400.

In an exemplary embodiment, main shaft 122 may be implanted by inserting main shaft 122 through third central hole 123, first central hole 121, second central hole 126, and central hole 1202 of cam holder plate 1200, respectively. In an exemplary embodiment, main shaft 122 may comprise of at least one of a handle shaft 2300, a two-piece shaft 1711, and a two-way shaft 1706. In an exemplary embodiment, handle shaft 2300, two-piece shaft 1711, and two-way shaft 1706 each may comprise of at least two protrusions extended along main shaft 122. In an exemplary embodiment, exemplary protrusions extended along main shaft 122 may be used to engage one of first cylinder portion 115 and second cylinder portion 117 for example, from engagement part 220 of first cylinder portion 219.

In an exemplary embodiment, locking system 100 may also include a cam. In an exemplary embodiment, an exemplary cam may be removably mounted on main shaft 122. In an exemplary embodiment, an exemplary cam may be configured to be driven by main shaft 122. In an exemplary embodiment, an exemplary cam may include a gear cam 1320 and a protruded cam. In an exemplary embodiment, an exemplary protruded cam may include a two-piece cam 1312 and an integrated cam. In an exemplary embodiment, an exemplary integrated cam may include integrated cam 1300 and an integrated cam 1310. In an exemplary embodiment, an exemplary gear cam 1320 may include an external-toothed ring 1322 and an external-toothed plate 1326. In an exemplary embodiment, an exemplary external-toothed ring 1322 may be engage with an exemplary external-toothed plate 1326. In an exemplary embodiment, an exemplary external-toothed plate 1326 may be used to transfer rotational energy of main shaft 122 to an exemplary external-toothed ring 1322. In an exemplary embodiment, an exemplary protruded cam may include an annular cylinder, such as annular cylinder 1306 and at least one protrusion on an exemplary annular cylinder perpendicular to main axis 105 of an exemplary annular cylinder, such as protrusion 1308. In an exemplary embodiment, protrusion 1308 may engage a locking tab of a door which is not illustrated for simplicity. In an exemplary embodiment, rotational movement of an exemplary protruded cam may actuate transitional movement of a locking tab which is not illustrated for simplicity. In an exemplary embodiment, to implement an exemplary two-piece cam 1312 on two-way shaft 1706, cam clamps 1400 may be required. In an exemplary embodiment, cam clamps 1400 may comprise at least two half rings to fix two-piece cam 1312 on two-way shaft 1706. In an exemplary embodiment, to implement an integrated cam 1300 and an integrated cam 1310 on main shaft 122, cam holder plate 1200 may be required. In an exemplary embodiment, cylindrical protrusion 1204 on cam holder plate 1200 may be used as a cam holder. In an exemplary embodiment, cylindrical protrusion 1204 of cam holder plate 1200 may be placed inside for example, an exemplary annular cylinder 1306 of integrated cam 1300.

Figure 26:
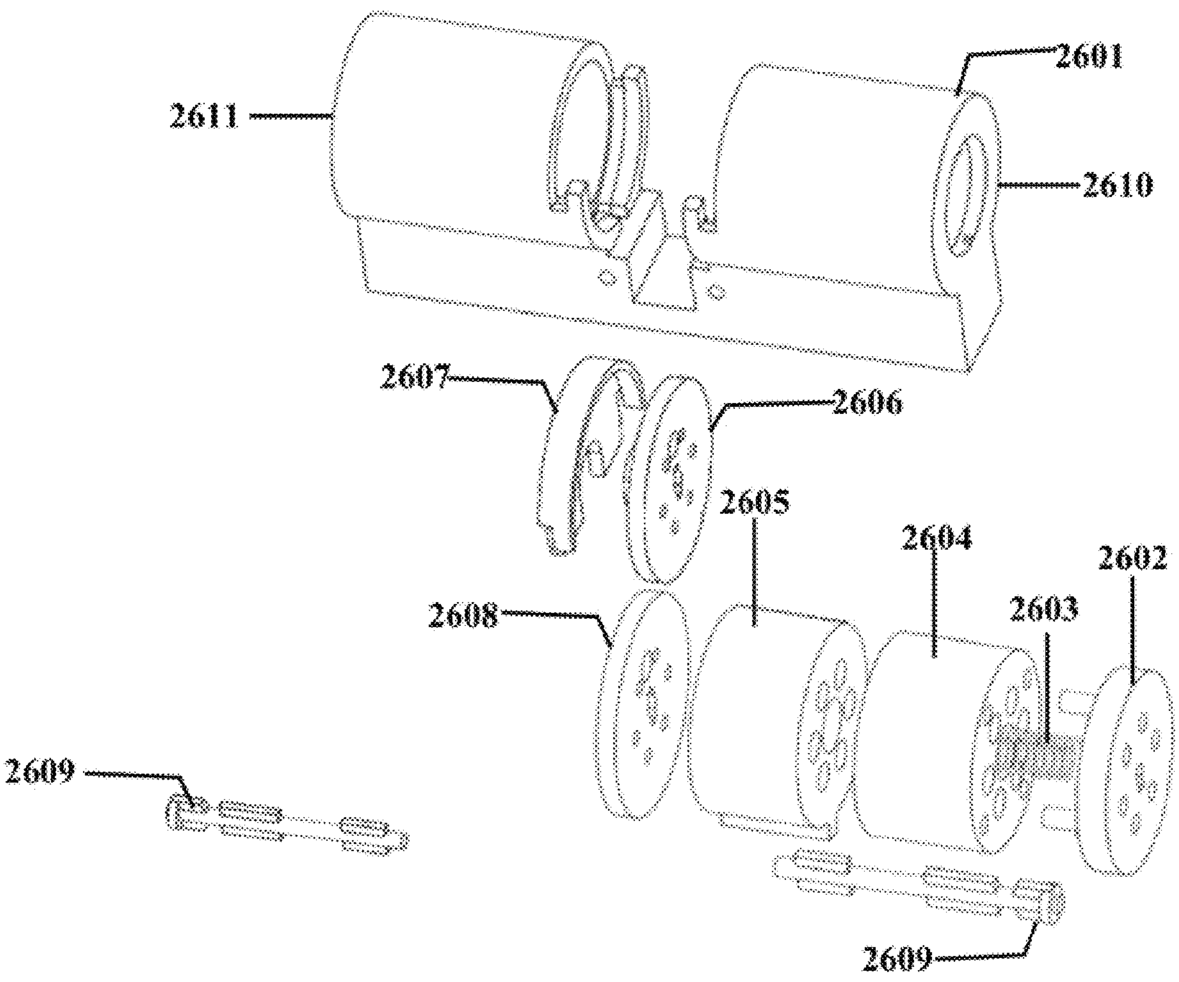
FIG. 26 illustrates a schematic view of components of a two-way lockset, consistent with one or more exemplary embodiments of the present disclosure.

FIG. 26 illustrates a schematic view of components of a two-way lockset 2600, consistent with one or more exemplary embodiments of the present disclosure. In an exemplary embodiment, two-way lockset 2600, may be implemented, utilizing a main shaft. In an exemplary embodiment, an exemplary main shaft may include two-way shaft 1706 and a two-piece shaft 2609. In an exemplary embodiment, to prepare two-way lockset 2600, a cover 2601 may be used. In an exemplary embodiment, in a case of using two-piece shaft 2609, an exemplary safety-booster cylinder, exemplary pin springs, and exemplary safety pins may be eliminated. In an exemplary embodiment, to prepare two-way lockset 2600, a first cylinder portion 2604 may be used. In an exemplary embodiment, preparing two-way lockset 2600, utilizing two-piece shaft 2609 may be different from utilizing an exemplary two-way shaft. In an exemplary embodiment, front plate 2602, shaft spring 2603, a half of two-piece shaft 2609, first cylinder portion 2604, and second cylinder portion 2605 may be placed in cover 2601. In an exemplary embodiment, exemplary code pins may be disposed within an exemplary first plurality of pin bores of first cylinder portion 2604, and an exemplary plurality of spring-loaded driver pins may be disposed within an exemplary second plurality of pin bores of second cylinder portion 2605 before assembling two-way lockset 2600. In an exemplary embodiment, an exemplary same procedure may be applied to prepare an exemplary other part of two-way lockset 2600. In an exemplary embodiment, one shaft spring 2603 may be required when using two-piece shaft 2609 in assembling an exemplary other side of two-way lockset 2600. In an exemplary embodiment, an exemplary cam without exemplary cam clamps may be installed in a middle of two-piece shaft 2609. In an exemplary embodiment, cam holder plate 2606 and cam holder plate 2608 may be used to fix an exemplary cam. In an exemplary embodiment, cam movement limiter 2707 may be placed on cover 2601 to hinder horizontal movement of an exemplary two-piece shaft.

In an exemplary embodiment, according to FIG. 26, cover 2601 may be similar to cover 2220. In an exemplary embodiment, first cylinder portion 2604 may be similar to first cylinder portion 200. In an exemplary embodiment, two-piece shaft 2609 may be similar to two-piece shaft 1711. In an exemplary embodiment, shaft spring 2603 may be similar to shaft spring 800. In an exemplary embodiment, second cylinder portion 2605 may be similar to second cylinder portion 900. In an exemplary embodiment, front plate 2602 may be similar to front plate 409. In an exemplary embodiment, cam holder plate 2606 and cam holder plate 2608 may be similar to cam holder plate 1207 and cam holder plate 1210, respectively. In an exemplary embodiment, cam movement limiter 2607 may be similar to cam movement limiter 1600.

Figure 27:
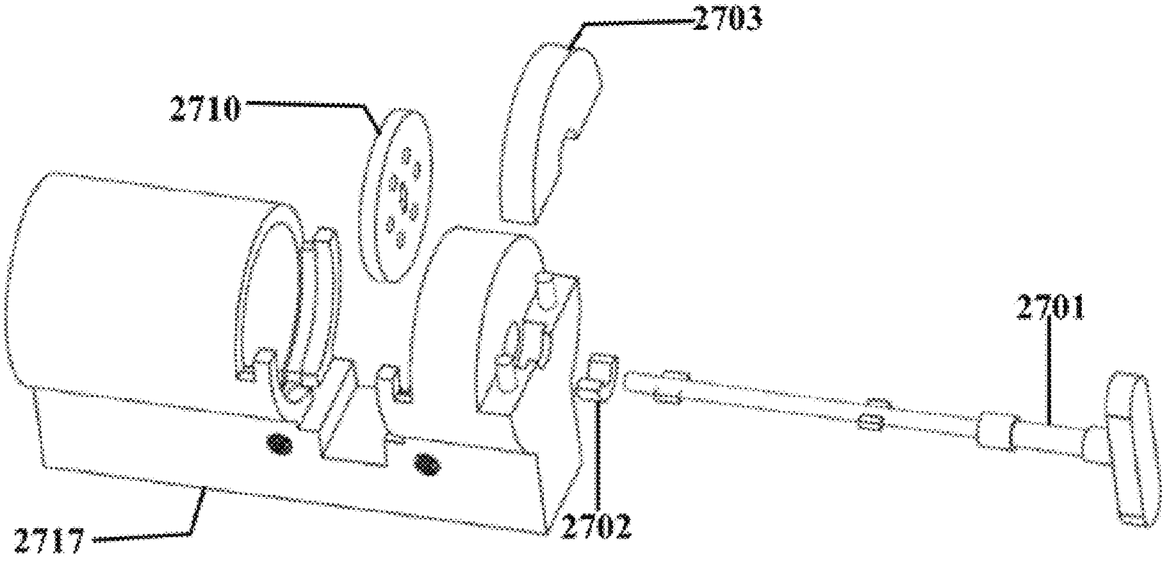
FIG. 27 illustrates a schematic view of components of a two-way handle lockset, consistent with one or more exemplary embodiments of the present disclosure.

FIG. 27 illustrates a schematic view of components of a two-way handle lockset 2700, consistent with one or more exemplary embodiments of the present disclosure. In an exemplary embodiment, a cam holder plate 2710 may be used to fix exemplary code pins. In an exemplary embodiment, half ring 2702 and half ring 2703 may be used to fix a handle shaft 2701. In an exemplary embodiment, a cover 2717 may be used to prepare a two-way handle lockset. In an exemplary embodiment, components of two-way lockset 2600 except two-piece shaft 2609 may be used for two-way handle lockset 2700.

In an exemplary embodiment, according to FIG. 27, cam holder plate 2710 may be similar to cam holder plate 1200. In an exemplary embodiment, half ring 2702 and half ring 2703 may be similar to half ring 2404 and half ring 2406, respectively. In an exemplary embodiment, handle shaft 2701 may be similar to handle shaft 2300. In an exemplary embodiment, cover 2717 may be similar to cover 2214.

Figure 28:
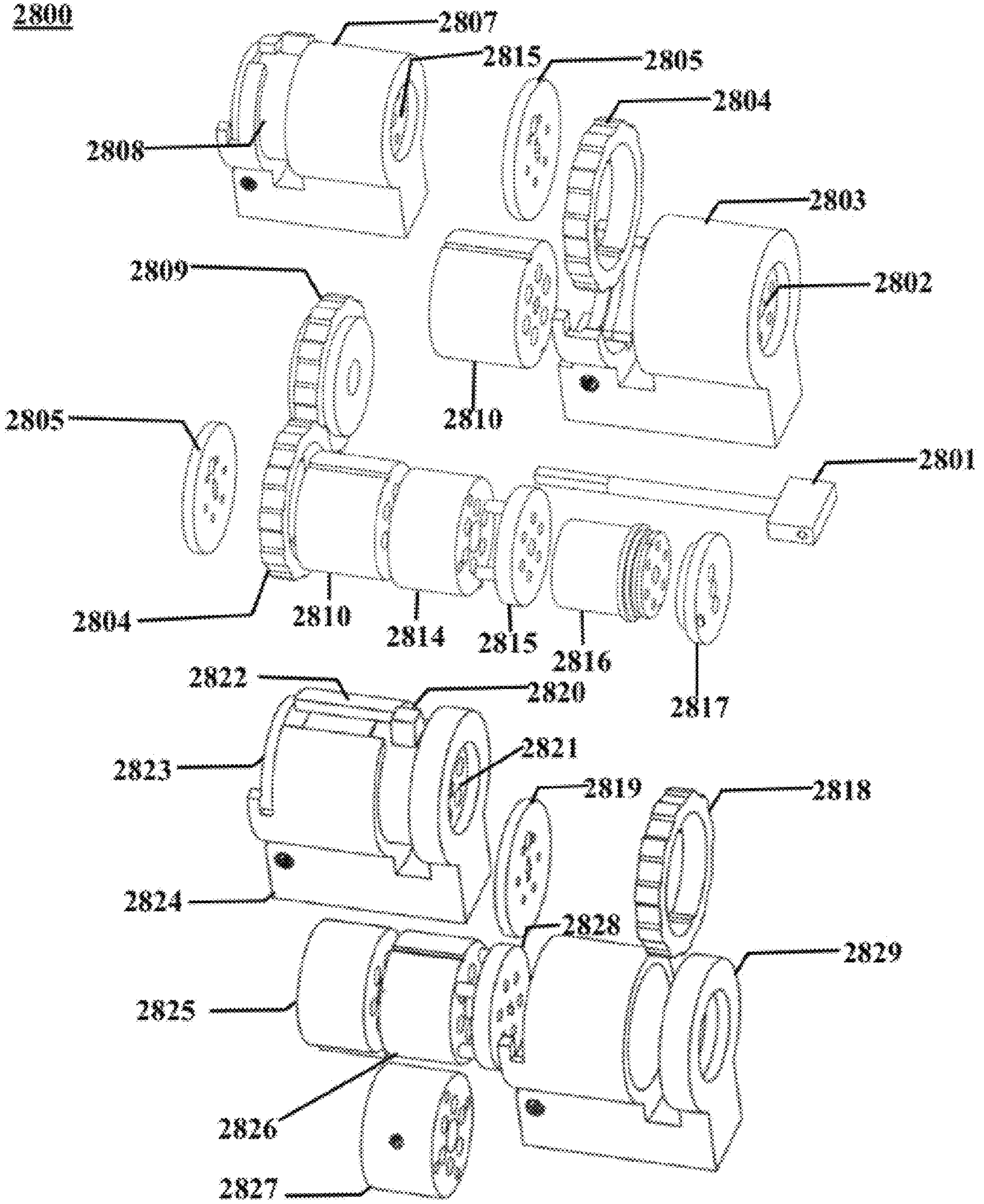
FIG. 28 illustrates a schematic view of components of a one-way lockset, consistent with one or more exemplary embodiments of the present disclosure.

FIG. 28 illustrates a schematic view of components of a one-way lockset 2800, consistent with one or more exemplary embodiments of the present disclosure. In an exemplary embodiment, one of second cylinder portion 2810 and second cylinder portion 2808 may rotate as key shaft 2801 may rotate. In an exemplary embodiment, front plate 2815 and first cylinder portion 2814 may be implemented when key shaft 2801 may be used. In an exemplary embodiment, a part of key shaft 2801 may include a multi-faceted part on an exemplary end of key shaft 2801 which may engage second cylinder portion 2810. In an exemplary embodiment, first cylinder portion 2814 may not engage with key shaft 2801 due to an annular design of key shaft 2801 in an exemplary beginning part of key shaft 2801. In an exemplary embodiment, an exemplary multi-faceted design of key shaft 2801 may engage second cylinder portion 2810 and second cylinder portion 2808. In an exemplary embodiment, a cover may be used to hold exemplary components of one-way lockset 2800. In an exemplary embodiment, an exemplary cover may include cover 2807 and cover 2803. In an exemplary embodiment, a front plate 2815 may be attached to first cylinder portion 2814. In an exemplary embodiment, an external-toothed ring 2804 and an external-toothed plate 2809 may be used to move a locking tab. In an exemplary embodiment, a cam holder plate 2805 may be placed in contact with second cylinder portion 2810 to prevent removal of exemplary spring-loaded driver pins of an exemplary second plurality of pin bores. In an exemplary embodiment, key cylinder 2816 and plate 2817 may be used to implement key shaft 2801. In an exemplary embodiment, to prepare one-way lockset 2800 a cover 2824 and first cylinder portion 2820 may be used. In an exemplary embodiment, first cylinder portion 2820 may be prepared by adding a protrusion to first cylinder portion 2604. In an exemplary embodiment, to reduce an exemplary cost of production, first cylinder portion 2827 may be used. In an exemplary embodiment, first cylinder portion 2827 may be prepared by adding a protrusion on first cylinder portion 2604. In an exemplary embodiment, first cylinder portion 2827 may be implemented in a cover 2829. In an exemplary embodiment, a second cylinder portion 2825 may be used. In an exemplary embodiment, an exemplary cam may include an external-toothed ring 2818 and an exemplary protruded cam. In an exemplary embodiment, a first cylinder portion 2826 may be used when external-toothed ring 2818 may be passed through an exemplary slit of cover 2829. In an exemplary embodiment, first cylinder portion 2826 may be obtained by creating a slit on first cylinder portion 2604. In an exemplary embodiment, exemplary protrusions of external-toothed ring 2818 may be placed into exemplary slits of first cylinder portion 2826. In an exemplary embodiment, front plate 2828 may be attached to first cylinder portion 2826.

In an exemplary embodiment, according to FIG. 28, second cylinder portion 2810 may be similar to second cylinder portion 917. In an exemplary embodiment, key shaft 2801 may be similar to key shaft 1700. In an exemplary embodiment, front plate 2802 may be similar to front plate 415. In an exemplary embodiment, first cylinder portion 2814 may be similar to first cylinder portion 215. In an exemplary embodiment, second cylinder portion 2813 may be similar to second cylinder portion 917. In an exemplary embodiment, second cylinder portion 2808 may be similar to second cylinder portion 919. In an exemplary embodiment, cover 2807 and cover 2803 may be similar to cover 2208 and cover 2200, respectively. In an exemplary embodiment, front plate 2815 may be similar to front plate 415. In an exemplary embodiment, cam holder plate 2805 may be similar to cam holder plate 1207. In an exemplary embodiment, external-toothed ring 2804 and external-toothed plate 2809 may be similar to external-toothed ring 1322 and external-toothed plate 1326. Cover 2824 may be similar to cover 2010. In an exemplary embodiment, first cylinder portion 2820 may be similar to first cylinder portion 211. In an exemplary embodiment, first cylinder portion 2827 may be similar to first cylinder portion 213. In an exemplary embodiment, cover 2716 may be similar to cover 2208. In an exemplary embodiment, external-toothed ring 2818 may be similar to external-toothed ring 1322. In an exemplary embodiment, first cylinder portion 2826 may be similar to first cylinder portion 209. In an exemplary embodiment, front plate 2828 may be similar to front plate 409. In an exemplary embodiment, cam holder plate 2819 may be similar to cam holder plate 1207. In an exemplary embodiment, second cylinder portion 2825 may be similar to second cylinder portion 900.

Figure 29:
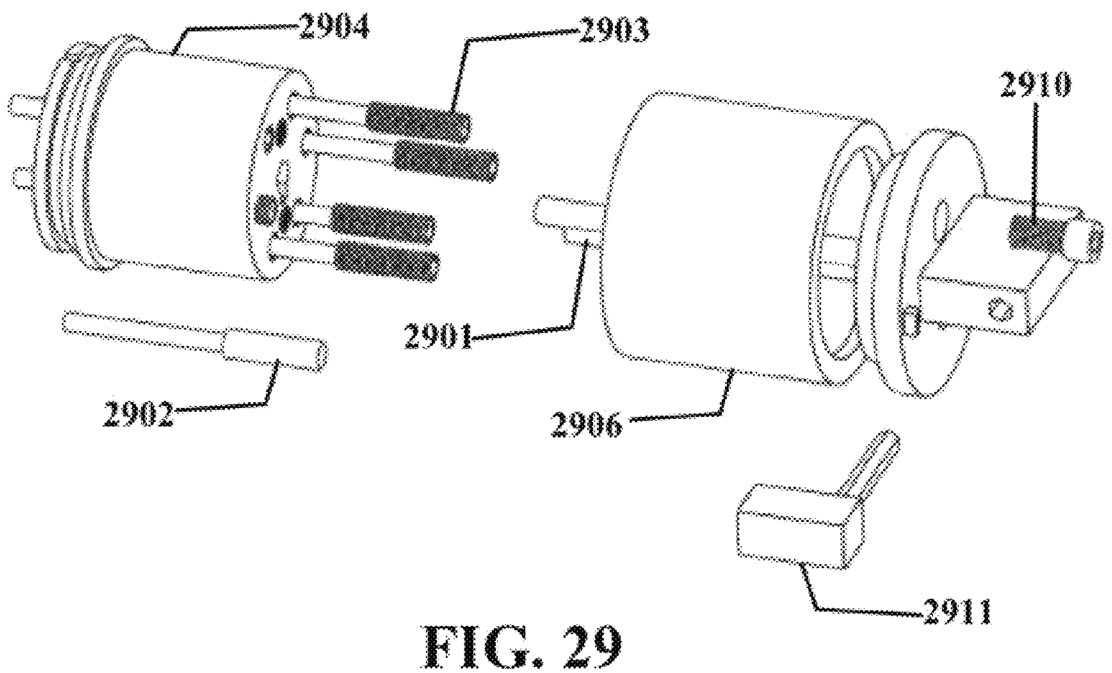
FIG. 29 illustrates a schematic view of a key, consistent with one or more exemplary embodiments of the present disclosure.

FIG. 29 illustrates a schematic view of a key 2900, consistent with one or more exemplary embodiments of the present disclosure. In an exemplary embodiment, after determining a lock code for an exemplary lock, a similar code may also be determined for an exemplary key. In an exemplary embodiment, key 2900 may include key shaft 2901. In an exemplary embodiment, when using key shaft 2901, two-way shaft 1706 or an exemplary two-piece shaft may also be used. In an exemplary embodiment, key needle 2902 and key needle 2903 may be coupled to key cylinder 2904. In an exemplary embodiment, an exemplary key cylinder of an exemplary key 2900 may include key cylinder 2904. In an exemplary embodiment, key 2900 may also include a cover 2906, key cylinder 2904, and key shaft 2901. In an exemplary embodiment, screw 2910 may be used to fix an exemplary cam. In an exemplary embodiment, wrench 2911 may be used to open and close exemplary screws. In an exemplary embodiment, wrench 2911 may also be used to resize exemplary key needles and fix an exemplary cam. In an exemplary embodiment, an exemplary wrench may be an allen wrench.

In an exemplary embodiment, according to FIG. 29, key shaft 2901 may be similar to key shaft 2100. In an exemplary embodiment, key needle 2902 and key needle 2903 may be similar to key needle 1900 and key needle 1904, respectively. In an exemplary embodiment, key cylinder 2904 may be similar to key cylinder 1816. In an exemplary embodiment, cover 2906 may be similar to cover 2000. In an exemplary embodiment, screw 2910 may be similar to screw 2110. In an exemplary embodiment, wrench 2911 may be similar to wrench 2112. In an exemplary embodiment, key shaft 2801 may be similar to key shaft 1700.

In an exemplary embodiment, key 104 may include a key cylinder 1800 with a central hole 1806 and a plurality of key needles 106 with a first length extended along main axis 105 of key cylinder 1800. In an exemplary embodiment, an exemplary plurality of key needles 106 may include key needles 1900 and key needles 1904. In an exemplary embodiment, an exemplary plurality of key needles 1904 may be mounted on an exemplary key cylinder 1800. In an exemplary embodiment, an exemplary plurality of key needles 1904 may be threaded. In an exemplary embodiment, an exemplary plurality of threaded key needles 1904 may include adjustable length. In an exemplary embodiment, an exemplary length of each key needle of an exemplary plurality of key needles 106 may determine a code of an exemplary locking system.

In an exemplary embodiment, an exemplary locking system may be used as a two-way lockset 2600, a one-way lockset 2800, and a two-way handle lockset 2700. In an exemplary embodiment, two-way lockset 2600 may be used for locking for example, doors, which a key may be used to open two-way lockset 2600 from both sides of an exemplary door. In an exemplary embodiment, one-way lockset 2800 may be used for a closet, in which a door of an exemplary closet may be locked from one side. In an exemplary embodiment, one-way lockset 2800 may be similar to locking system 100. In an exemplary embodiment, two-way handle lockset 2700 may include a lockset from one end and a handle from an opposing end which may be used for example, for doors. In an exemplary embodiment, to enhance safety, a safety-booster cylinder 500 may be added to each of exemplary locksets.

In an exemplary embodiment, two-way handle lockset 2700 may include a first cylinder portion 120, a second cylinder portion 117, a cam, handle 2701, and key 2900. In an exemplary embodiment, an exemplary cam may include a gear cam 1320 and a protruded cam. In an exemplary embodiment, an exemplary protruded cam may include a two-piece cam 1312 and an integrated cam. In an exemplary embodiment, an exemplary integrated cam may include integrated cam 1300 and an integrated cam 1310. In an exemplary embodiment, an exemplary first cylinder portion 120, an exemplary second cylinder portion 117, an exemplary cam, and key 2900 of two-way handle lockset 2700 may be similar to locking system 100. In an exemplary embodiment, to implement handle 2701, handle 2701 may be inserted into second central hole 126, first central hole 121, and third central hole 123, respectively. In an exemplary embodiment, an exemplary cam may be mounted on handle 2701 in which an exemplary cam may be coupled to second end 103 of second cylinder portion 117. In an exemplary embodiment, handle 2701 may work as a shaft to engage one of first cylinder portion 115 and second cylinder portion 117. In an exemplary embodiment, two-way handle lockset 2700 may be opened from a first end, utilizing handle 2701 and may be locked from a second opposing end, utilizing key 2900. In an exemplary embodiment, two-way handle lockset 2700 may also include a safety-booster cylinder 500 which may enhance safety of two-way handle lockset 2700. In an exemplary embodiment, safety-booster cylinder 500 may be coupled/attached to an exemplary second end 101 of first cylinder portion 115. In an exemplary embodiment, first cylinder portion 115, an exemplary cam, second cylinder portion 117, and handle 2701 may all be placed inside a cover.

In an exemplary embodiment, two-way lockset 2600 may include two exemplary locking systems. In an exemplary embodiment, two-way lockset 2600 may be locked from a first end 2610 and a second opposing end 2611 of two-way lockset 2600. In an exemplary embodiment, an exemplary locking system of two-way lockset 2600 may be similar to locking system 100. In an exemplary embodiment, an exemplary second locking system may be placed symmetrically to an exemplary first locking system on main shaft 122. As used herein, symmetrically may refer to a manner in which an exemplary first cylinder portion 115 may be placed on two opposing ends of two-way lockset 2600 for an entrance of key 2900.

In an exemplary embodiment, two-way lockset 2600 may also include a safety-booster cylinder 500 to form a two-way super safe locking system. In an exemplary embodiment, an exemplary two-way super safe locking system may be used when one side of two-way super safe locking system may be placed outside for example, a door where safety may be more required. In an exemplary embodiment, an exemplary two-way super safe locking system may include a safety-booster cylinder 500 in at least one of exemplary locking systems. In an exemplary embodiment, two-way shaft 1706 may be used for two-way lockset 2600.

Example 1: Possible Designs of Locking Systems

Figure 30:
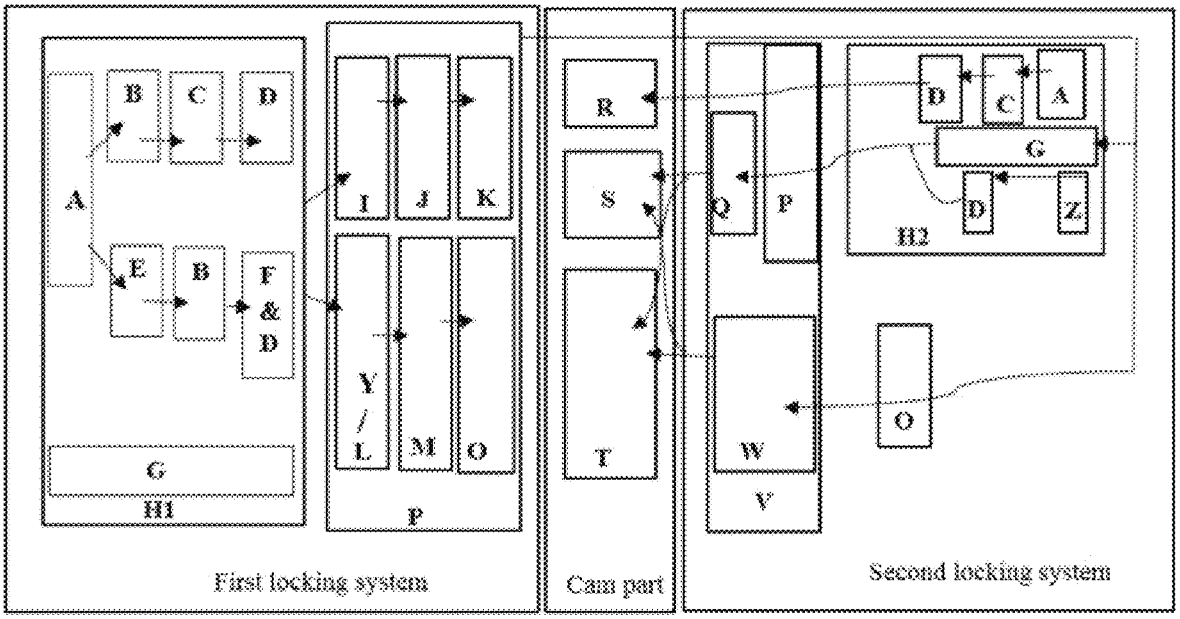
FIG. 30 illustrates a flowchart of all possible choices for assembling locking systems, consistent with one or more exemplary embodiments of the present disclosure.

A locking system may be assembled utilizing different exemplary components. FIG. 30 illustrates a flowchart of all possible choices for assembling exemplary locking systems, consistent with one or more exemplary embodiments of the present disclosure. In an exemplary embodiment, FIG. 30 may show all possible choices of assembling an exemplary two-way lockset, an exemplary one-way lockset, and an exemplary two-way handle lockset. Table 3000 may show exemplary components of each letter inside FIG. 30. FIG. 31 illustrates seven possible structures of exemplary locking systems, consistent with one or more exemplary embodiments of the present disclosure. To clarifying the possible choices, examples of different layouts may be analyzed.

Example 2: A Two-Way Lockset with a Two-Way Shaft

Figure 32:
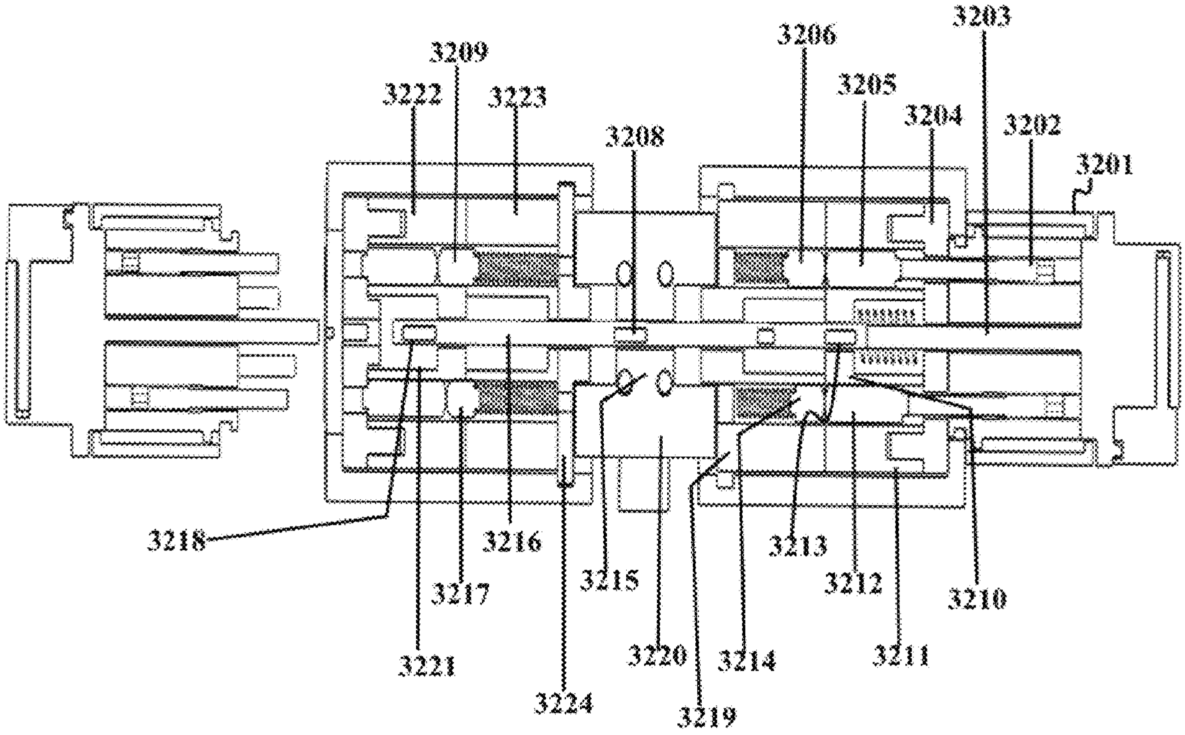
FIG. 32 illustrates a two-way lockset with a two-way shaft, consistent with one or more exemplary embodiments of the present disclosure.

FIG. 32 illustrates a two-way lockset 3200 with a two-way shaft 3216, consistent with one or more exemplary embodiments of the present disclosure. In an exemplary two-way shaft model, when a key 3201 may be entered from one side, key needles 3202 may push first code pins 3205, first code pins 3212 and spring-loaded driver pins 3206, spring-loaded driver pins 3214 inside exemplary first pin bores of first cylinder portion 3211 and second cylinder portion 3219. After pushing exemplary code pins, an exemplary key shaft may move two-way shaft 3216 inside an exemplary lockset. An exemplary size of exemplary key needles may be such that first lock pins 3205 and 3212 may be located at the boundary of the first cylinder portion 3211 and second cylinder portion 3219. After inserting an exemplary key and pushing exemplary code pins utilizing exemplary key needles, two-way shaft 3216 may rotate due to an exemplary rotation of key 3201. A shaft protrusion 3213 may be located in engaged part 3210 of first cylinder portion 3211 and a shaft protrusion 3208 may be located in a slit 3215 of two-piece cam 3220. An exemplary two-way shaft may easily rotate as a shaft protrusion 3218 may not engage a center part 3221 of the second cylinder portion. In FIG. 32 when key shaft 3203 rotates, a front plate 3204 and first cylinder portion 3211 may also rotate. Due to the rotation of key shaft 3203, two-way shaft 3216 may also transmit this rotation to a two-piece cam 3220 and may force two-piece cam 3220 to rotate. On the opposite side of the lockset, code pins 3317 and code pins 3309 may be located in first cylinder portion 3222 and second cylinder portion 3223. Second cylinder portion 3223 may be locked in a cover, therefore, second cylinder portion 3223 and first cylinder portion 3222 may be locked and may not move. In an exemplary embodiment, cam holder plate 3224 may be rotated after installing two-way shaft 3216 to block protrusion 3208 of two-way shaft 3216 behind cam holder plate 3224. In an exemplary embodiment, spring-loaded driver pins 116 may include at least one of spring-loaded driver pins 3206 and spring-loaded driver pins 3214.

In this example, key 3201 may be similar to key 2900. Key needle 3202 may be similar to key needle 1904. Code pin 3205, 3206, 3212, and 3214 may be similar to code pin 303. First cylinder portion 3211 may be similar to first cylinder portion 200. Second cylinder portion 3219 may be similar to second cylinder portion 911. Two-way shaft 3216 may be similar to two-way shaft 1706. Two-piece cam 3220 may be similar to two-piece cam 1312. Key shaft 3203 may be similar to key shaft 2100. Front plate 3204 may be similar to front plate 400. Second cylinder portion 3223 may be similar to second cylinder portion 911. First cylinder portion 3222 may be similar to first cylinder portion 200. Cam holder plate 3224 may be similar to cam holder plate 1207.

Example 3: A Two-Way Lockset with a Two-Piece Shaft

Figure 33:
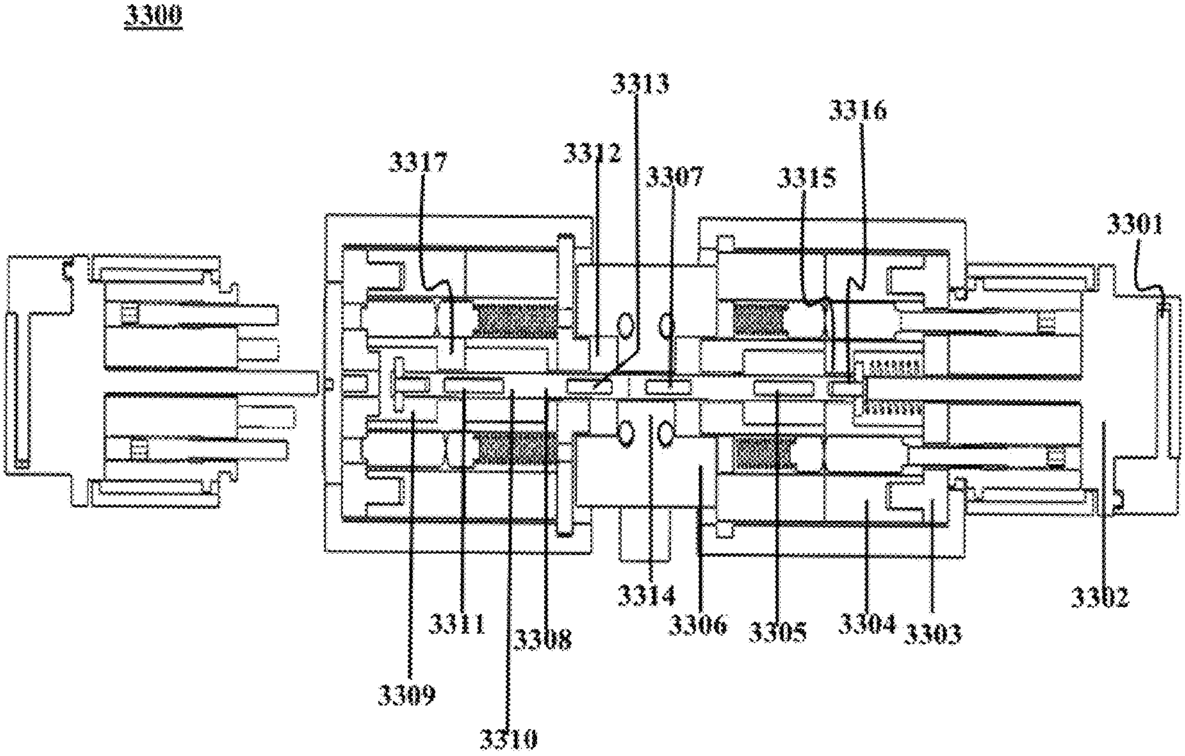
FIG. 33 illustrates a two-way lockset with a two-piece shaft, consistent with one or more exemplary embodiments of the present disclosure.

FIG. 33 illustrates a two-way lockset 3300 with a two-piece shaft 3310, consistent with one or more exemplary embodiments of the present disclosure. In this example to implement two-piece shaft 3310, a cover 2220 may be used. In this case, cam holder 1200 may not be applicable. In this example, key 3301 may be inserted from one side of an exemplary two-way lockset. The mechanism of moving code pins with a two-piece shaft 3310 may be the same as an exemplary two-way lockset with an exemplary two-way shaft. In this example as a key shaft 3302 may be inserted into an exemplary two-way lockset, a first two-piece shaft 3305 and a second two-piece shaft 3308 may move backward. In this example first two-piece shaft 3305 may be positioned so that by rotating key 3301, front plate 3303, first cylinder portion 3304, and two-piece cam 3306 may rotate due to the engagement of first two-piece shaft protrusion 3316 to first cylinder portion 3304 from an engaging part 3315, and the first two-piece shaft protrusion 3307 may be engaged in cam 3306 from an engaging part 3314. On the other side of an exemplary two-way lockset, second two-piece shaft protrusion 3313 of second two-piece shaft 3308 may be located in a free part of cam 3312 which may not prevent the movement of cam 3306. Moreover, second two-piece shaft protrusion 3311 of second two-piece shaft 3308 may be located in engaging part 3317. Entering key 3301 from the other side of an exemplary locking system may cause second two-piece shaft 3308 be guided to an appropriate position in an exemplary locking system.

In this example, two-piece shaft 3310 may be similar to two-piece shaft 1711. Key 3301 may be similar to key 2900. Key shaft 3302 may be similar to key shaft 2100. Front plate 3303 may be similar to front plate 400. First cylinder portion 3304 may be similar to first cylinder portion 200. Two-piece cam 3306 may be similar to two-piece cam 1312.

Example 4: A One-Way Lockset

Figure 34:
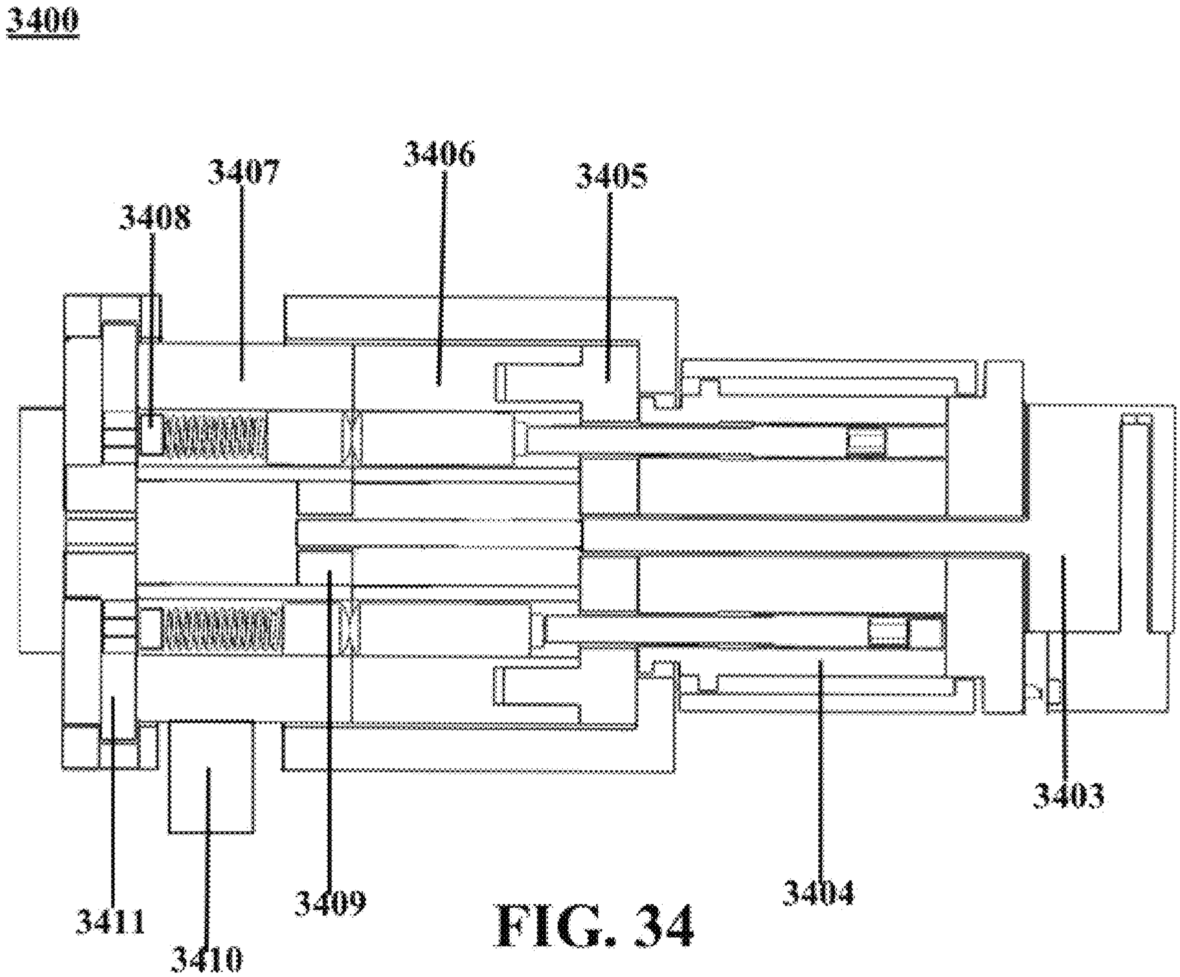
FIG. 34 illustrates a one-way lockset, consistent with one or more exemplary embodiments of the present disclosure.

FIG. 34 illustrates a one-way lockset 3400, consistent with one or more exemplary embodiments of the present disclosure. To prepare one-way lockset 3400, cover 3404 may be used. In this case, first cylinder portion 3406 and front plate 3405 may be used. To move second cylinder portion 3407, key shaft 3403 may be used. Second cylinder portion 3407 may include a protrusion 3410 for cam and a slit 3409 to get engaged with key shaft 3403. Cap 3408 may be placed on an exemplary pin spring. A cam holder plate 3411 may be used to fix an exemplary cam.

In this example, cover 3404 may be similar to cover 2200 and cover 2204. First cylinder portion 3406 may be similar to first cylinder portion 215. Front plate 3405 may be similar to front plate 415. Second cylinder portion 3407 may be similar to second cylinder portion 919. Key shaft 3403 may be similar to key shaft 1700.

Example 5: A Two-Way Handle Lockset

Figure 35:
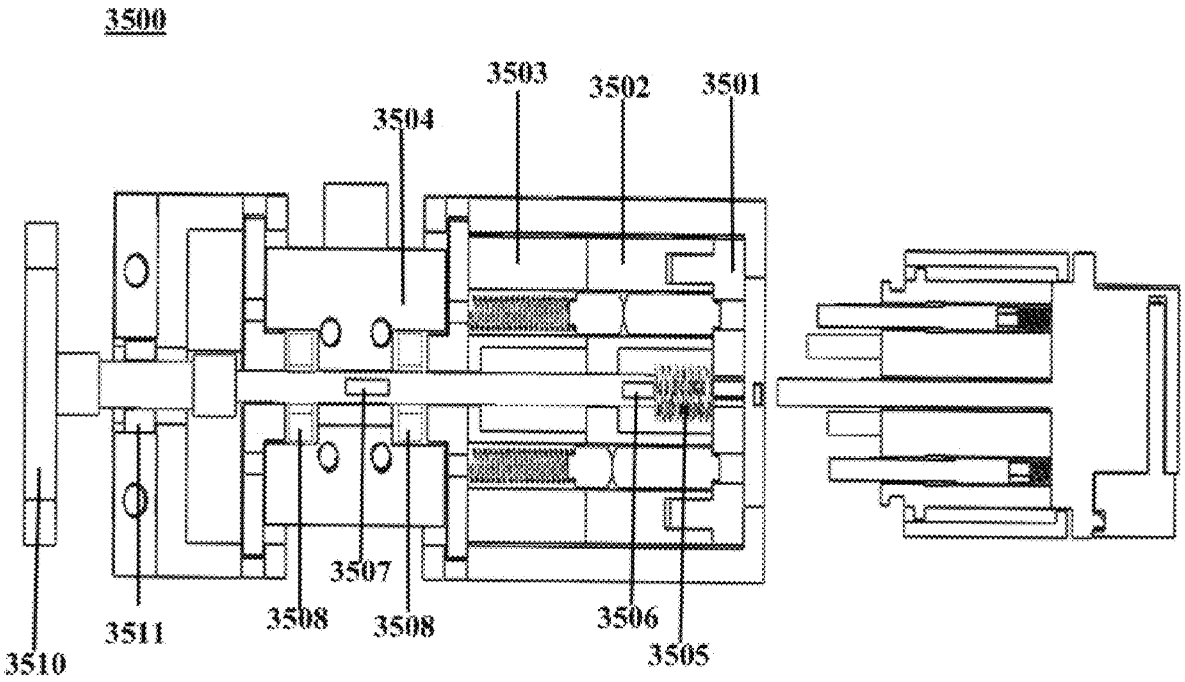
FIG. 35 illustrates a two-way handle lockset, consistent with one or more exemplary embodiments of the present disclosure.

FIG. 35 illustrates a two-way handle lockset 3500, consistent with one or more exemplary embodiments of the present disclosure. In this example, two-way handle lockset 3500 may be opened utilizing a handle. In this case first cylinder portion 3502 and front plate 3501 may be used. To move second cylinder portion 3503, handle shaft 3510 may be used. In this example, after inserting handle shaft 3510 into an exemplary lockset, shaft spring 3505 may squeeze and protrusion 3507 may be engaged with two-piece cam 3504. Two-piece cam 3504 may be installed, utilizing cam clamps 3508. When handle shaft 3510 may squeeze shaft spring 3505, protrusion 3506 may be in a free area of first cylinder portion 3502. In this example, cam 3504 may rotate by rotating handle shaft 3510.

In this example, first cylinder portion 3502 may be similar to first cylinder portion 200. Second cylinder portion 3503 may be similar to second cylinder portion 900. Handle shaft 3510 may be similar to handle shaft 2300. Two-piece cam 3504 may be similar to two-piece cam 1312. Half ring 3508 may be similar to half ring 1000. Shaft spring 3505 may be similar to shaft spring 800. Cam clamps 3508 may be similar to cam clamps 1400.

Figure 36:
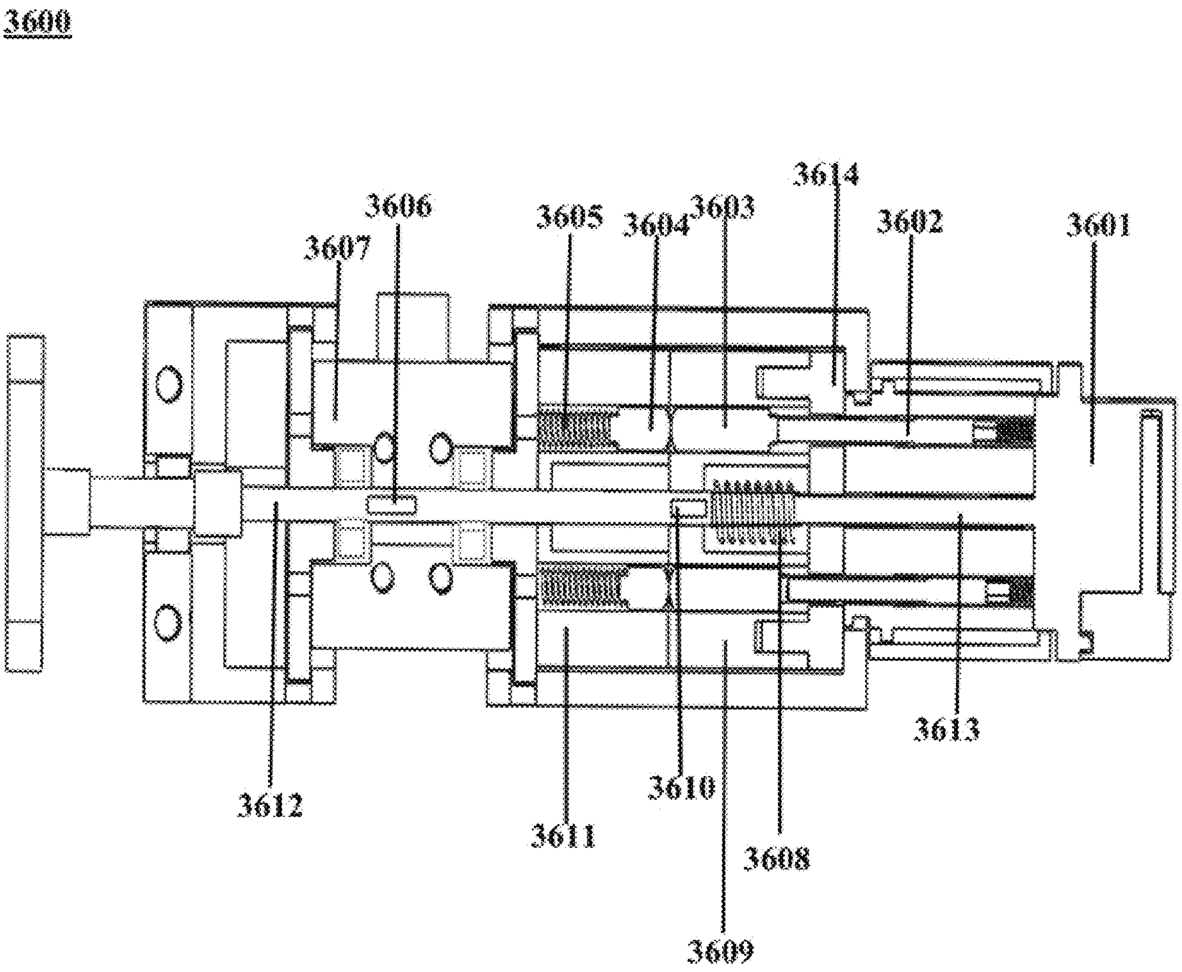
FIG. 36 illustrates a two-way handle lockset, consistent with one or more exemplary embodiments of the present disclosure.

FIG. 36 illustrates a two-way handle lockset 3600, consistent with one or more exemplary embodiments of the present disclosure. In this example, an exemplary two-way handle lockset may be opened, utilizing key 3601. By releasing handle shaft 3612, Shaft spring 3608 may push handle shaft 3612 and protrusion 3610 and protrusion 3606 may be engaged with first cylinder portion 3609 and two-piece cam 3607. When key 3601 may be inserted into an exemplary lockset, key shaft 3613 may be engaged with front plate 3614 which may be coupled with first cylinder portion 3609. When key 3601 may be inserted into an exemplary lockset, key needle 3602 may push code pin 3603, code pin 3604, and pin spring 3605. Shaft spring 3608 may also squeeze by inserting key 3601. The boundary between code pin 3603 and code pin 3604 may be in the common shear plane of first cylinder portion 3609 and second cylinder portion 3611. Handle shaft 3612 may include a protrusion 3610 and a protrusion 3606. By inserting key 3601, protrusion 3610 and protrusion 3606 may be engaged with first cylinder portion 3609 and two-piece cam 3607.

In this example, key 3601 may be similar to key 2900. Key needle 3602 may be similar to key needle 1900. Code pin 3603 and code pin 3604 may be similar to code pin 300. Pin spring 3605 may be similar to pin spring 700. Shaft spring 3608 may be similar to shaft spring 800. First cylinder portion 3609 may be similar to first cylinder portion 200. Second cylinder portion 3611 may be similar to second cylinder portion 900. Two-piece cam 3607 may be similar to two-piece cam 1312. Handle shaft 3612 may be similar to handle shaft 2300.

Example 6: A Two-Way Super Safe Locking System

Figure 37:
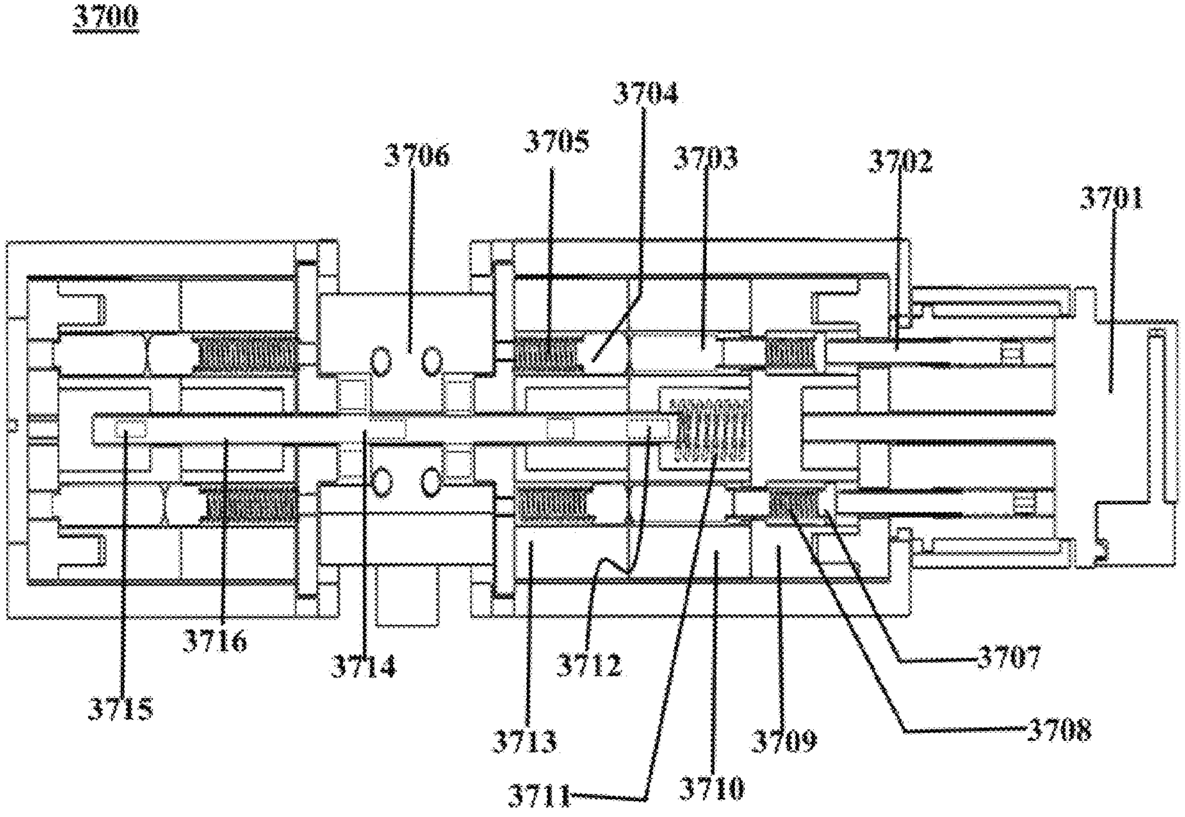
FIG. 37 illustrates a two-way super safe locking system, consistent with one or more exemplary embodiments of the present disclosure.

FIG. 37 illustrates a two-way super safe locking system 3700, consistent with one or more exemplary embodiments of the present disclosure. FIG. 37 may show two-way super safe locking system 3700 which may include a two-way super safe locking system in one side and an exemplary locking system on an exemplary other side. In this example, an exemplary two-way super safe locking system may be opened, utilizing key 3701. When key 3701 may be inserted into an exemplary super safe locking system, key needle 3702 may push safety pin 3707 and squeeze pin spring 3708 and engage safety-booster cylinder 3709 with first cylinder portion 3710 and move code pin 3703, and code pin 3704. When code pin 3703 and code pin 3704 may be placed in a boundary of first cylinder portion 3710 and second cylinder portion 3713, protrusion 3712 of two-way shaft 3716 may engage first cylinder portion 3710. When key 3701 may rotate, first cylinder portion 3710 and safety-booster cylinder 3709 may rotate. When key 3701 may be inserted into an exemplary locking system, protrusion 3712 may engage with first cylinder portion 3710, protrusion 3714 may engage with cam 3706, and protrusion 3715 may be free to rotate.

In this example, key 3701 may be similar to key 2900. Key needle 3702 may be similar to key needle 1900. Pin spring 3708 may be similar to pin spring 700. Safety pin 3707 may be similar to safety pin 600. Code pin 3703 and code pin 3704 may be similar to code pin 300. First cylinder portion 3710 may be similar to first cylinder portion 219. Second cylinder portion 3713 may be similar to second cylinder portion 900. Cam 3706 may be similar to two-piece cam 1312.

The embodiments have been described above with the aid of functional building blocks illustrating the implementation of specified functions and relationships thereof. The boundaries of these functional building blocks have been arbitrarily defined herein for the convenience of the description.

Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

Moreover, the word "substantially" when used with an adjective or adverb is intended to enhance the scope of the particular characteristic; e.g., substantially planar is intended to mean planar, nearly planar and/or exhibiting characteristics associated with a planar element. Further use of relative terms such as "vertical", "horizontal", "up", "down", and "side-to-side" are used in a relative sense to the normal orientation of the apparatus.

What is claimed is:

1. A locking system, comprising:

a first cylinder portion extending along a main axis, the first cylinder comprising:

a first central hole extending along the main axis;

a first plurality of pin bores, each pin bore of the first plurality of pin bores axially extending along the main axis, the first plurality of pin bores annularly arranged and spaced around the first central hole;

a second cylinder portion extending along the main axis, the second cylinder portion rotatably coupled with the first cylinder portion with a common shear plane between the first cylinder and the second cylinder, the common shear plane perpendicular to the main axis, the second cylinder portion comprising:

a second central hole extending along the main axis, the second central hole aligned with the first central hole;

a second plurality of pin bores, each pin bore of the second plurality of pin bores axially extending along the main axis, the second plurality of pin bores annularly arranged and spaced around the second central hole, each pin bore of the second plurality of pin bores aligned with a corresponding pin bore of the first plurality of pin bores;

a front plate coupled and rotatable with the first cylinder portion, the front plate perpendicular to the main axis, the front plate comprising:

a third central hole extending along the main axis, the third central hole aligned with the first central hole;

a plurality of keyholes, each keyhole of the plurality of keyholes axially extending along the main axis, the plurality of keyholes annularly arranged and spaced around the third central hole, each keyhole of the plurality of keyholes aligned with a corresponding pin bore of the first plurality of pin bores;

a plurality of code pins, each code pin of the plurality of code pins slidably disposed within a corresponding pin bore of the first plurality of pin bores;

a plurality of spring-loaded driver pins, each spring-loaded driver pin of the plurality of spring-loaded driver pins mounted in a corresponding pin bore of the second plurality of pin bores, each spring-loaded driver pin of the plurality of spring-loaded driver pins configured to contact a corresponding code pin of the plurality of code pins at a common junction, each spring-loaded driver pin of the plurality of spring-loaded driver pins configured to push a corresponding code pin of the plurality of code pins towards a corresponding keyhole of the plurality of keyholes; and a main shaft disposed within the first central hole and the second central hole, the main shaft extended along the main axis, the main shaft slidable within the first central hole and the second central hole along the main axis; and a key comprising:

an elongated key shaft, the elongated key shaft configured to be insertable into the third central hole; and a plurality of key needles extended parallel with the elongated key shaft, the plurality of key needles arranged and spaced annularly around the elongated key shaft, each key needle of the plurality of key needles configured to be insertable into a corresponding keyhole of the plurality of keyholes, wherein the main shaft configured to be coupled to and rotatable with one of the first cylinder portion and the second cylinder portion responsive to the elongated key shaft being inserted into the first central hole via the third central hole, wherein the spring-loaded driver pin of the plurality of spring-loaded driver pins comprises a driver pin and a pin spring, the driver pin coupled to the pin spring from one end along the main axis, wherein the driver pin is coupled to a first code pin from a second opposing end of the driver pin.

2. The locking system of claim 1, wherein the key further comprises a key cylinder, the key cylinder comprises a cylinder with a central hole and a plurality of holes around the central hole axillary extending along the main axis, the plurality of holes configured to hold the plurality of key needles.

3. The locking system of claim 1, wherein the locking system further comprises a shaft spring extending along the main axis of the main shaft, the shaft spring engaged with the main shaft from one end of the main shaft, the shaft spring placed inside the first plurality of pin bores, the shaft spring configured to actuate a transition movement of the main shaft.

4. The locking system of claim 3, wherein the main shaft comprises at least three protrusions extended along the main axis of the main shaft, the at least two protrusions configured to engage one of the first cylinder portion and the second cylinder portion.

5. The locking system of claim 1, wherein the locking system further comprises a cam holder plate, the cam holder plate comprises a plate and a cylindrical protrusion coupled to a first end of the plate, a central hole of the plate and a central hole of the cylindrical protrusion aligned with a second central hole along the longitudinal axis of the second central hole, the cam holder plate coupled with the cam from a first end of the cam holder plate, the cam holder plate coupled with a second end of the second cylinder portion from a second opposing end of the cam holder plate, the cam holder plate configured to hold the cam and keep the plurality of spring-loaded driver pins inside the second plurality of pin bores.

6. The locking system of claim 1, wherein the locking system further comprises at least a cam movement limiter, the cam movement limiter comprising a half plate mounted on the main shaft, the cam movement limiter coupled with the second opposing end of the second cylinder portion and the cam to fill a free space between the second cylinder portion and the cam.

7. The locking system of claim 1, wherein the locking system further comprises a freewheeling safety-booster cylinder removably coupled to the second base end of the first cylinder portion, the safety-booster cylinder comprises a cylinder with a fourth central hole extended along a main axis of the safety-booster cylinder and a fourth plurality of pin bores extended axillary along the main axis of the safety-booster cylinder, the safety-booster cylinder comprises a plurality of spring-loaded safety pins, wherein each spring-loaded safety pin of the plurality of spring-loaded safety pins disposed within the fourth pin bore of the plurality of fourth pin bores.

8. The locking system of claim 7, wherein the spring-loaded safety pin composes a safety pin and a pin spring, the safety pin disposed within the pin spring, wherein a length of the safety pin is equal to a length of the third pin bore along the main axis of the safety-booster cylinder.

9. A locking system, comprising:
- a first cylinder portion extending along a main axis, the first cylinder comprising:
  - a first central hole extending along the main axis;
  - a first plurality of pin bores, each pin bore of the first plurality of pin bores axially extending along the main axis, the first plurality of pin bores annularly arranged and spaced around the first central hole;
- a second cylinder portion extending along the main axis, the second cylinder portion rotatably coupled with the first cylinder portion with a common shear plane between the first cylinder and the second cylinder, the common shear plane perpendicular to the main axis, the second cylinder portion comprising:
  - a second central hole extending along the main axis, the second central hole aligned with the first central hole;
  - a second plurality of pin bores, each pin bore of the second plurality of pin bores axially extending along the main axis, the second plurality of pin bores annularly arranged and spaced around the second central hole, each pin bore of the second plurality of pin bores aligned with a corresponding pin bore of the first plurality of pin bores;
- a front plate coupled and rotatable with the first cylinder portion, the front plate perpendicular to the main axis, the front plate comprising:
  - a third central hole extending along the main axis, the third central hole aligned with the first central hole;
  - a plurality of keyholes, each keyhole of the plurality of keyholes axially extending along the main axis, the plurality of keyholes annularly arranged and spaced around the third central hole, each keyhole of the plurality of keyholes aligned with a corresponding pin bore of the first plurality of pin bores;
- a plurality of code pins, each code pin of the plurality of code pins slidably disposed within a corresponding pin bore of the first plurality of pin bores;
- a plurality of spring-loaded driver pins, each spring-loaded driver pin of the plurality of spring-loaded driver pins mounted in a corresponding pin bore of the second plurality of pin bores, each spring-loaded driver pin of the plurality of spring-loaded driver pins configured to contact a corresponding code pin of the plurality of code pins at a common junction, each spring-loaded driver pin of the plurality of spring-loaded driver pins configured to push a corresponding code pin of the plurality of code pins towards a corresponding keyhole of the plurality of keyholes; and
- a main shaft disposed within the first central hole and the second central hole, the main shaft extended along the main axis, the main shaft slidable within the first central hole and the second central hole along the main axis; and
- a key comprising:
  - an elongated key shaft, the elongated key shaft configured to be insertable into the third central hole; and
  - a plurality of key needles extended parallel with the elongated key shaft, the plurality of key needles arranged and spaced annularly around the elongated key shaft, each key needle of the plurality of key needles configured to be insertable into a corresponding keyhole of the plurality of keyholes,
  - wherein the main shaft configured to be coupled to and rotatable with one of the first cylinder portion and the second cylinder portion responsive to the elongated key shaft being inserted into the first central hole via the third central hole, wherein the locking system further comprises a cover, the cover comprising a cylinder and a base, the cylinder portion, and wherein the cover comprises at least a screw on the base of the cover to be attached to a door.

10. The locking system of claim 9, wherein the cover comprises at least a tenon to fit into at least a slit on the key cylinder, the at least a tenon configured to direct the plurality of key needles to fit into the first plurality of pin bores.

11. A locking system, comprising:
- a first cylinder portion extending along a main axis, the first cylinder comprising:
  - a first central hole extending along the main axis;
  - a first plurality of pin bores, each pin bore of the first plurality of pin bores axially extending along the main axis, the first plurality of pin bores annularly arranged and spaced around the first central hole;
- a second cylinder portion extending along the main axis, the second cylinder portion rotatably coupled with the first cylinder portion with a common shear plane between the first cylinder and the second cylinder, the common shear plane perpendicular to the main axis, the second cylinder portion comprising:
  - a second central hole extending along the main axis, the second central hole aligned with the first central hole;
  - a second plurality of pin bores, each pin bore of the second plurality of pin bores axially extending along the main axis, the second plurality of pin bores annularly arranged and spaced around the second central hole, each pin bore of the second plurality of pin bores aligned with a corresponding pin bore of the first plurality of pin bores;

a front plate coupled and rotatable with the first cylinder portion, the front plate perpendicular to the main axis, the front plate comprising:

a third central hole extending along the main axis, the third central hole aligned with the first central hole;

a plurality of keyholes, each keyhole of the plurality of keyholes axially extending along the main axis, the plurality of keyholes annularly arranged and spaced around the third central hole, each keyhole of the plurality of keyholes aligned with a corresponding pin bore of the first plurality of pin bores;

a plurality of code pins, each code pin of the plurality of code pins slidably disposed within a corresponding pin bore of the first plurality of pin bores;

a plurality of spring-loaded driver pins, each spring-loaded driver pin of the plurality of spring-loaded driver pins mounted in a corresponding pin bore of the second plurality of pin bores, each spring-loaded driver pin of the plurality of spring-loaded driver pins configured to contact a corresponding code pin of the plurality of code pins at a common junction, each spring-loaded driver pin of the plurality of spring-loaded driver pins configured to push a corresponding code pin of the plurality of code pins towards a corresponding keyhole of the plurality of keyholes; and a main shaft disposed within the first central hole and the second central hole, the main shaft extended along the main axis, the main shaft slidable within the first central hole and the second central hole along the main axis; and a key comprising:

an elongated key shaft, the elongated key shaft configured to be insertable into the third central hole; and a plurality of key needles extended parallel with the elongated key shaft, the plurality of key needles arranged and spaced annularly around the elongated key shaft, each key needle of the plurality of key needles configured to be insertable into a corresponding keyhole of the plurality of keyholes, wherein the main shaft configured to be coupled to and rotatable with one of the first cylinder portion and the second cylinder portion responsive to the elongated key shaft being inserted into the first central hole via the third central hole, and wherein the locking system further comprises a cam, the cam comprises at least one of a gear cam and a protruded cam.

12. The locking system of claim 11, wherein the gear cam comprises an external-toothed ring with at least one protrusion inside the external-toothed ring and an external-toothed plate, the external-toothed ring configured to move a locking tab.

13. The locking system of claim 12, wherein one of the first cylinder portion and the second cylinder portion comprises at least a slit along the main axis of the first cylinder portion, the at least a slit engaged with the at least a protrusion inside the external-toothed ring to transfer rotational movement to the gear cam.

14. The locking system of claim 13, wherein the protruded cam comprises an annular cylinder and at least one protrusion mounted on the annular cylinder perpendicular to the main axis, the at least a protrusion configured to move a locking tab.

15. The locking system of claim 14, wherein the protruded cam coupled with the cam holder plate from at least one side of the annular cylinder of the protruded cam, wherein the cylindrical protrusion of the cam holder plate placed inside the annular cylinder of the protruded cam, the cam holder plate configured to hold the protruded cam.

* * * * *